US012633119B1

(12) United States Patent　　　　　　(10) Patent No.:　US 12,633,119 B1

Penner et al.　　　　　　　　　　　　　(45) Date of Patent:　　May 19, 2026

(54) AUTOMATED GENERATION AND USE OF BUILDING VIDEOS WITH ACCOMPANYING NARRATION FROM ANALYSIS OF ACQUIRED IMAGES AND OTHER BUILDING INFORMATION

(71) Applicant: MFTB Holdco, Inc., Seattle, WA (US)

(72) Inventors: Eric M. Penner, Centennial, CO (US); Ivaylo Boyadzhiev, Seattle, WA (US); Sing Bing Kang, Redmond, WA (US)

(73) Assignee: MFTB Holdco, Inc., Seattle, WA (US)

( * ) Notice:　Subject to any disclaimer, the term of this patent is extended or adjusted under 35 U.S.C. 154(b) by 669 days.

(21) Appl. No.: 17/892,427

(22) Filed:　Aug. 22, 2022

(51) Int. Cl.
　　G06V 20/00　　　(2022.01)
　　G06T 3/4038　　　(2024.01)
　　　　　(Continued)

(52) U.S. Cl.
　　CPC ............ G06V 20/36 (2022.01); G06T 3/4038 (2013.01); G06V 10/25 (2022.01); G06V 10/70 (2022.01); G06V 2201/07 (2022.01)

(58) Field of Classification Search
　　CPC ........ G06V 20/36; G06V 10/25; G06V 10/70; G06V 2201/07; G06T 3/4038
　　See application file for complete search history.

(56)　　　　　References Cited

U.S. PATENT DOCUMENTS 5,140,352 A　　8/1992　Moore et al.
6,031,540 A　　2/2000　Golin et al.
　　　　　(Continued)

FOREIGN PATENT DOCUMENTS

EP　　2413097 A2　　2/2012
EP　　2505961 A2　　10/2012
　　　　　(Continued)

OTHER PUBLICATIONS

Perez-Martin, J., Bustos, B., Guimaraes, S.J.F., Sipiran, I., Pérez, J. and Said, G.C., 2022. A comprehensive review of the video-to-text problem. Artificial Intelligence Review, pp. 1-75.*

(Continued)

*Primary Examiner* — Zhitong Chen
(74) *Attorney, Agent, or Firm* — VLP Law Group LLP; James A. D. White

(57)　　　　　ABSTRACT

Techniques are described for using computing devices to perform automated operations for automatically generating information about attributes of buildings from automated analysis of building information that includes floor plans and acquired building images and to subsequently using the generated building information in one or more further automated manners. In some situations, such automated generation of building information includes automatically determining objects in a building and other attributes of the building, and automatically generating descriptions about the determined building attributes. Information about such determined attributes and generated descriptions may be used in various automated manners, including for updating and/or validating information in existing building descriptions, for determining matching buildings that have similarities to indicated building descriptions or other specified criteria, for controlling device navigation (e.g., autonomous vehicles), for display on client devices in corresponding graphical user interfaces, etc.

31 Claims, 25 Drawing Sheets

(51) Int. Cl.
  *G06V 10/25* (2022.01)
  *G06V 10/70* (2022.01)

(56) References Cited

U.S. PATENT DOCUMENTS

| | | | |
|---|---|---|---|
| 6,141,034 | A | 10/2000 | McCutchen |
| 6,317,166 | B1 | 11/2001 | McCutchen |
| 6,320,584 | B1 | 11/2001 | Golin et al. |
| 6,323,858 | B1 | 11/2001 | Gilbert et al. |
| 6,337,683 | B1 | 1/2002 | Gilbert et al. |
| 6,654,019 | B2 | 11/2003 | Gilbert et al. |
| 6,683,608 | B2 | 1/2004 | Golin et al. |
| 6,690,374 | B2 | 2/2004 | Park et al. |
| 6,731,305 | B1 | 5/2004 | Park et al. |
| 6,738,073 | B2 | 5/2004 | Park et al. |
| 7,050,085 | B1 | 5/2006 | Park et al. |
| 7,129,971 | B2 | 10/2006 | McCutchen |
| 7,196,722 | B2 | 3/2007 | White et al. |
| 7,525,567 | B2 | 4/2009 | McCutchen |
| 7,620,909 | B2 | 11/2009 | Park et al. |
| 7,627,235 | B2 | 12/2009 | McCutchen et al. |
| 7,782,319 | B2 | 8/2010 | Ghosh et al. |
| 7,791,638 | B2 | 9/2010 | McCutchen |
| 7,909,241 | B2 | 3/2011 | Stone et al. |
| 7,973,838 | B2 | 7/2011 | McCutchen |
| 8,072,455 | B2 | 12/2011 | Temesvari et al. |
| 8,094,182 | B2 | 1/2012 | Park et al. |
| RE43,786 | E | 11/2012 | Cooper |
| 8,463,020 | B1 | 6/2013 | Schuckmann et al. |
| 8,517,256 | B2 | 8/2013 | Stone et al. |
| 8,520,060 | B2 | 8/2013 | Zomet et al. |
| 8,523,066 | B2 | 9/2013 | Stone et al. |
| 8,523,067 | B2 | 9/2013 | Stone et al. |
| 8,528,816 | B2 | 9/2013 | Stone et al. |
| 8,540,153 | B2 | 9/2013 | Stone et al. |
| 8,594,428 | B2 | 11/2013 | Aharoni et al. |
| 8,654,180 | B2 | 2/2014 | Zomet et al. |
| 8,666,815 | B1 | 3/2014 | Chau |
| 8,699,005 | B2 | 4/2014 | Likholyot |
| 8,705,892 | B2 | 4/2014 | Aguilera et al. |
| RE44,924 | E | 6/2014 | Cooper et al. |
| 8,854,684 | B2 | 10/2014 | Zomet |
| 8,861,840 | B2 | 10/2014 | Bell et al. |
| 8,861,841 | B2 | 10/2014 | Bell et al. |
| 8,879,828 | B2 | 11/2014 | Bell et al. |
| 8,953,871 | B2 | 2/2015 | Zomet |
| 8,989,440 | B2 | 3/2015 | Klusza et al. |
| 8,996,336 | B2 | 3/2015 | Malka et al. |
| 9,021,947 | B2 | 5/2015 | Landa |
| 9,026,947 | B2 | 5/2015 | Lee et al. |
| 9,035,968 | B2 | 5/2015 | Zomet |
| 9,041,796 | B2 | 5/2015 | Malka et al. |
| 9,071,714 | B2 | 6/2015 | Zomet |
| 9,129,438 | B2 | 9/2015 | Aarts et al. |
| 9,151,608 | B2 | 10/2015 | Malka et al. |
| 9,165,410 | B1 | 10/2015 | Bell et al. |
| 9,171,405 | B1 | 10/2015 | Bell et al. |
| 9,324,190 | B2 | 4/2016 | Bell et al. |
| 9,361,717 | B2 | 6/2016 | Zomet |
| 9,396,586 | B2 | 7/2016 | Bell et al. |
| 9,438,759 | B2 | 9/2016 | Zomet |
| 9,438,775 | B2 | 9/2016 | Powers et al. |
| 9,489,775 | B1 | 11/2016 | Bell et al. |
| 9,495,783 | B1 | 11/2016 | Samarasekera et al. |
| 9,576,401 | B2 | 2/2017 | Zomet |
| 9,619,933 | B2 | 4/2017 | Spinella-Marno et al. |
| 9,635,252 | B2 | 4/2017 | Accardo et al. |
| 9,641,702 | B2 | 5/2017 | Bin-Nun et al. |
| 9,760,994 | B1 | 9/2017 | Bell et al. |
| 9,786,097 | B2 | 10/2017 | Bell et al. |
| 9,787,904 | B2 | 10/2017 | Birkler et al. |
| 9,836,885 | B1 | 12/2017 | Eraker et al. |
| 9,852,351 | B2 | 12/2017 | Aguilera Perez et al. |
| 9,953,111 | B2 | 4/2018 | Bell et al. |
| 9,953,430 | B1 | 4/2018 | Zakhor |
| 9,990,760 | B2 | 6/2018 | Aguilera Perez et al. |
| 9,990,767 | B1 | 6/2018 | Sheffield et al. |
| 10,026,224 | B2 | 7/2018 | Bell et al. |
| 10,030,979 | B2 | 7/2018 | Bjorke et al. |
| 10,055,876 | B2 | 8/2018 | Ford et al. |
| 10,068,344 | B2 | 9/2018 | Jovanovic et al. |
| 10,083,522 | B2 | 9/2018 | Jovanovic et al. |
| 10,102,639 | B2 | 10/2018 | Bell et al. |
| 10,102,673 | B2 | 10/2018 | Eraker et al. |
| 10,120,397 | B1 | 11/2018 | Zakhor et al. |
| 10,122,997 | B1 | 11/2018 | Sheffield et al. |
| 10,127,718 | B2 | 11/2018 | Zakhor et al. |
| 10,127,722 | B2 | 11/2018 | Shakib et al. |
| 10,139,985 | B2 | 11/2018 | Mildrew et al. |
| 10,163,261 | B2 | 12/2018 | Bell et al. |
| 10,163,271 | B1 | 12/2018 | Powers et al. |
| 10,181,215 | B2 | 1/2019 | Sedeffow |
| 10,192,115 | B1 | 1/2019 | Sheffield et al. |
| 10,204,185 | B2 | 2/2019 | Mrowca et al. |
| 10,210,285 | B2 | 2/2019 | Wong et al. |
| 10,235,797 | B1 | 3/2019 | Sheffield et al. |
| 10,242,400 | B1 | 3/2019 | Eraker et al. |
| 10,339,716 | B1 | 7/2019 | Powers et al. |
| 10,366,531 | B2 | 7/2019 | Sheffield |
| 10,375,306 | B2 | 8/2019 | Shan et al. |
| 10,395,435 | B2 | 8/2019 | Powers et al. |
| 10,530,997 | B2 | 1/2020 | Shan et al. |
| 10,643,386 | B2 | 5/2020 | Li et al. |
| 10,708,507 | B1 | 7/2020 | Dawson et al. |
| 10,809,066 | B2 | 10/2020 | Colburn et al. |
| 10,825,247 | B1 | 11/2020 | Vincent et al. |
| 10,834,317 | B2 | 11/2020 | Shan et al. |
| 11,030,709 | B2 | 6/2021 | McLinden et al. |
| 11,057,561 | B2 | 7/2021 | Shan et al. |
| 11,164,361 | B2 | 11/2021 | Moulon et al. |
| 11,164,368 | B2 | 11/2021 | Vincent et al. |
| 11,165,959 | B2 | 11/2021 | Shan et al. |
| 11,217,019 | B2 | 1/2022 | Li et al. |
| 11,238,652 | B2 | 2/2022 | Impas et al. |
| 11,243,656 | B2 | 2/2022 | Li et al. |
| 11,252,329 | B1 | 2/2022 | Cier et al. |
| 11,284,006 | B2 | 3/2022 | Dawson et al. |
| 11,405,549 | B2 | 8/2022 | Cier et al. |
| 11,405,558 | B2 | 8/2022 | Dawson et al. |
| 11,408,738 | B2 | 8/2022 | Colburn et al. |
| 2006/0256109 | A1 | 11/2006 | Acker et al. |
| 2010/0232709 | A1 | 9/2010 | Zhang et al. |
| 2012/0075414 | A1 | 3/2012 | Park et al. |
| 2012/0162253 | A1* | 6/2012 | Collins ..................... G06T 9/00 |
| | | | 375/E7.026 |
| 2012/0293613 | A1 | 11/2012 | Powers et al. |
| 2013/0050407 | A1 | 2/2013 | Brinda et al. |
| 2013/0342533 | A1 | 12/2013 | Bell et al. |
| 2014/0043436 | A1 | 2/2014 | Bell et al. |
| 2014/0044343 | A1 | 2/2014 | Bell et al. |
| 2014/0044344 | A1 | 2/2014 | Bell et al. |
| 2014/0125658 | A1 | 5/2014 | Bell et al. |
| 2014/0125767 | A1 | 5/2014 | Bell et al. |
| 2014/0125768 | A1 | 5/2014 | Bell et al. |
| 2014/0125769 | A1 | 5/2014 | Bell et al. |
| 2014/0125770 | A1 | 5/2014 | Bell et al. |
| 2014/0236482 | A1 | 8/2014 | Dorum et al. |
| 2014/0267631 | A1 | 9/2014 | Powers et al. |
| 2014/0307100 | A1 | 10/2014 | Myllykoski et al. |
| 2014/0320674 | A1 | 10/2014 | Kuang |
| 2015/0116691 | A1 | 4/2015 | Likholyot |
| 2015/0189165 | A1 | 7/2015 | Milosevski et al. |
| 2015/0262421 | A1 | 9/2015 | Bell et al. |
| 2015/0269785 | A1 | 9/2015 | Bell et al. |
| 2015/0302636 | A1 | 10/2015 | Arnoldus et al. |
| 2015/0310596 | A1 | 10/2015 | Sheridan et al. |
| 2015/0332464 | A1 | 11/2015 | O'Keefe et al. |
| 2016/0055268 | A1 | 2/2016 | Bell et al. |
| 2016/0134860 | A1 | 5/2016 | Jovanovic et al. |
| 2016/0140676 | A1 | 5/2016 | Fritze et al. |
| 2016/0217225 | A1 | 7/2016 | Bell et al. |
| 2016/0260250 | A1 | 9/2016 | Jovanovic et al. |
| 2016/0286119 | A1 | 9/2016 | Rondinelli |
| 2016/0300385 | A1 | 10/2016 | Bell et al. |

(56) References Cited

U.S. PATENT DOCUMENTS

| | | |
|---|---|---|
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0044760 A1 | 2/2021 | Dawson et al. |
| 2021/0073449 A1 | 3/2021 | Segev et al. |
| 2021/0117071 A1 | 4/2021 | Gharpuray |
| 2021/0142564 A1* | 5/2021 | Impas ................. G06F 3/04815 |
| 2021/0150088 A1 | 5/2021 | Gallo et al. |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |
| 2023/0384924 A1* | 11/2023 | Al-Sharieh ......... G06F 3/04847 |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |
| WO | 2020076880 A1 | 4/2020 |

OTHER PUBLICATIONS

Sun, Y., Wang, S., Feng, S., Ding, S., Pang, C., Shang, J., Liu, J., Chen, X., Zhao, Y., Lu, Y. and Liu, W., 2021. Ernie 3.0: Large-scale knowledge enhanced pre-training for language understanding and generation. arXiv preprint arXiv:2107.02137.*

Pintore et al., "State-of-the-Art in Automatic 3D Reconstruction of Structured Indoor Environments", Eurographics 2020 39:2 pp. 667-699, Jul. 13, 2020, 33 pages.

Kara Van Horn, "How to Create a Teaser Video From Matterport", accessed Aug. 1, 2024 from https://support.homevisit.com/hc/en-us/articles/115005302363-How-to-Create-a-Teaser-Video-from-Matterport, 4 pages.

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGUIDE: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform For Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 6 pages.

(56) References Cited

OTHER PUBLICATIONS

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

Pintore et al., "AtlantaNet: Inferring the 3D Indoor Layout from a Single 360 Image beyond the Manhattan World Assumption", ECCV 2020, 16 pages.

Cowles, Jeremy, "Differentiable Rendering", Aug. 19, 2018, accessed Dec. 7, 2020 at https://towardsdatascience.com/differentiable-rendering-d00a4b0f14be, 3 pages.

Yang et al., "DuLa-Net: a Dual-Projection Network for Estimating Room Layouts from a Single RGB Panorama", in arXiv:1811.11977[cs.v2], submitted Apr. 2, 2019, 14 pages.

Sun et al., "HoHoNet: 360 Indoor Holistic Understanding with Latent Horizontal Features", in arXiv:2011.11498[cs.v2], submitted Nov. 24, 2020, 15 pages.

Nguyen-Phuoc et al., "RenderNet: a deep convolutional network for differentiable rendering from 3D shapes", in arXiv:1806.06575[cs.v3], submitted Apr. 1, 2019, 17 pages.

Convolutional neural network, Wikipedia, retrieved from https://en.wikipedia.org/wiki/Convolutional_neural_network, on Dec. 7, 2020, 25 pages.

Hamilton et al., "Inductive Representation Learning on Large Graphs", in 31st Conference on Neural Information Processing Systems (NIPS 2017), 2017, 19 pages.

Kipf et al., "Variational Graph Auto-Encoders", in arXiv:1611.07308v1 [stat.ML], submitted Nov. 21, 2016, 3 pages.

Cao et al., "MolGAN: an Implicit Generative Model for Small Molecular Graphs", in arXiv:1805.11973v1 [stat.ML], submitted May 30, 2018, 11 pages.

Chen et al., "Intelligent Home 3D: Automatic 3D-House Design from Linguistic Descriptions Only", in arXiv:2003.00397v1 [cs.CV], submitted Mar. 1, 2020, 14 pages.

Cucurull et al., "Context-Aware Visual Compatibility Prediction", in arXiv:1902.03646v2 [cs.CV], submitted Feb. 12, 2019, 10 pages.

Fan et al., "Labeled Graph Generative Adversarial Networks", in arXiv:1906.03220v1 [cs.LG], submitted Jun. 7, 2019, 14 pages.

Gong et al., "Exploiting Edge Features in Graph Neural Networks", in arXiv:1809.02709v2 [cs.LG], submitted Jan. 28, 2019, 10 pages.

Genghis Goodman, "A Machine Learning Approach to Artificial Floorplan Generation", University of Kentucky Theses and Dissertations-Computer Science, 2019, accessible at https://uknowledge.uky.edu/cs_etds/89, 40 pages.

Grover et al., "node2vec: Scalable Feature Learning for Networks", in arXiv:1607.00653v1 [cs.SI], submitted Jul. 3, 2016, 10 pages.

Nauata et al., "House-GAN: Relational Generative Adversarial Networks for Graph-constrained House Layout Generation", in arXiv:2003.06988v1 [cs.CV], submitted Mar. 16, 2020, 17 pages.

Kang et al., "A Review of Techniques for 3D Reconstruction of Indoor Environments", in ISPRS International Journal of Geo-Information 2020, May 19, 2020, 31 pages.

Kipf et al., "Semi-Supervised Classification With Graph Convolutional Networks", in arXiv:1609.02907v4 [cs.LG], submitted Feb. 22, 2017, 14 pages.

Li et al., "Graph Matching Networks for Learning the Similarity of Graph Structured Objects", in Proceedings of the 36th International Conference on Machine Learning (PMLR 97), 2019, 18 pages.

Liu et al., "Hyperbolic Graph Neural Networks", in 33rd Conference on Neural Information Processing Systems (NeurIPS 2019), 2019, 12 pages.

Merrell et al., "Computer-Generated Residential Building Layouts", in ACM Transactions on Graphics, Dec. 2010, 13 pages.

Lando Loic, "The 9 Best AI Video Generators (Text-to-Video)", accessed May 23, 2022 at https://www.makeuseof.com/best-ai-video-generators-text-to-video/, Nov. 19, 2021, 8 pages.

* cited by examiner

Figure 1B:
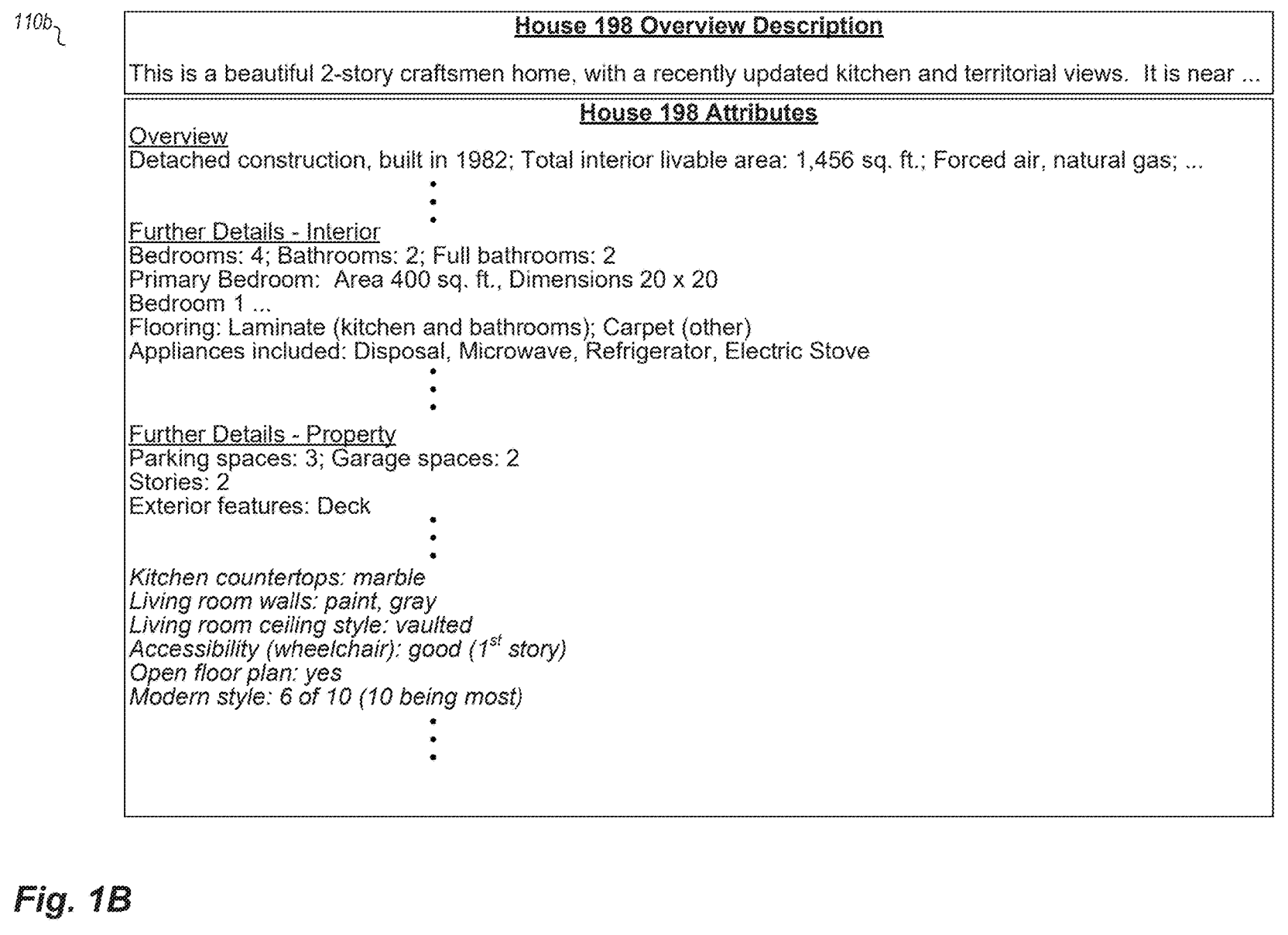

House 198 Overview Description

This is a beautiful 2-story craftsmen home, with a recently updated kitchen and territorial views.  It is near ...

House 198 Attributes

Overview
Detached construction, built in 1982; Total interior livable area: 1,456 sq. ft.; Forced air, natural gas; ...

• • •

Further Details – Interior
Bedrooms: 4; Bathrooms: 2; Full bathrooms: 2
Primary Bedroom:  Area 400 sq. ft., Dimensions 20 x 20
Bedroom 1 ...
Flooring: Laminate (kitchen and bathrooms); Carpet (other)
Appliances included: Disposal, Microwave, Refrigerator, Electric Stove

• • •

Further Details – Property
Parking spaces: 3; Garage spaces: 2
Stories: 2
Exterior features: Deck

• • •

Kitchen countertops: marble
Living room walls: paint, gray
Living room ceiling style: vaulted
Accessibility (wheelchair): good (1st story)
Open floor plan: yes
Modern style: 6 of 10 (10 being most)

*Fig. 2F*
250f3
250f2
250f1
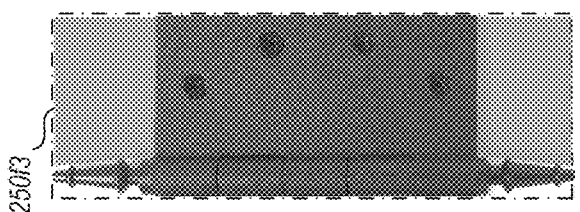
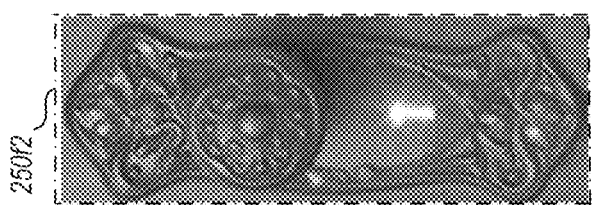
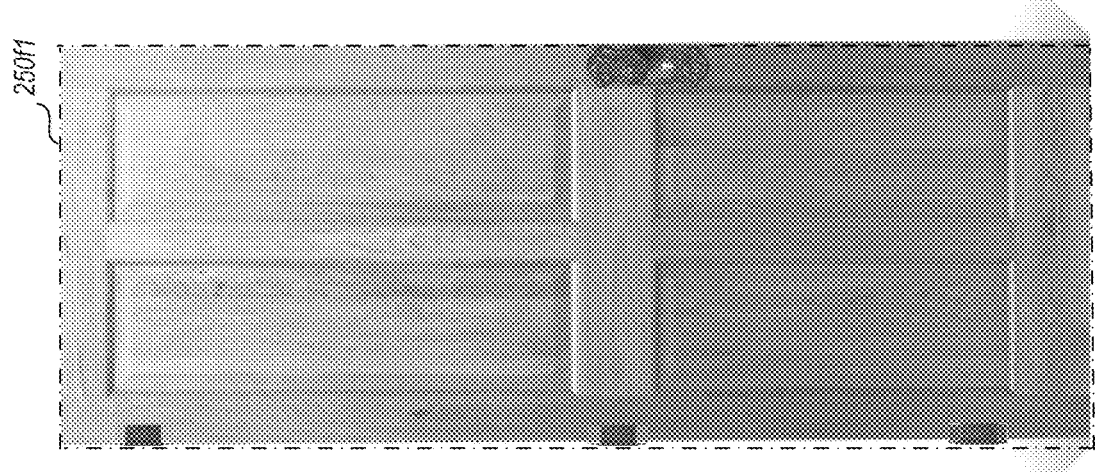

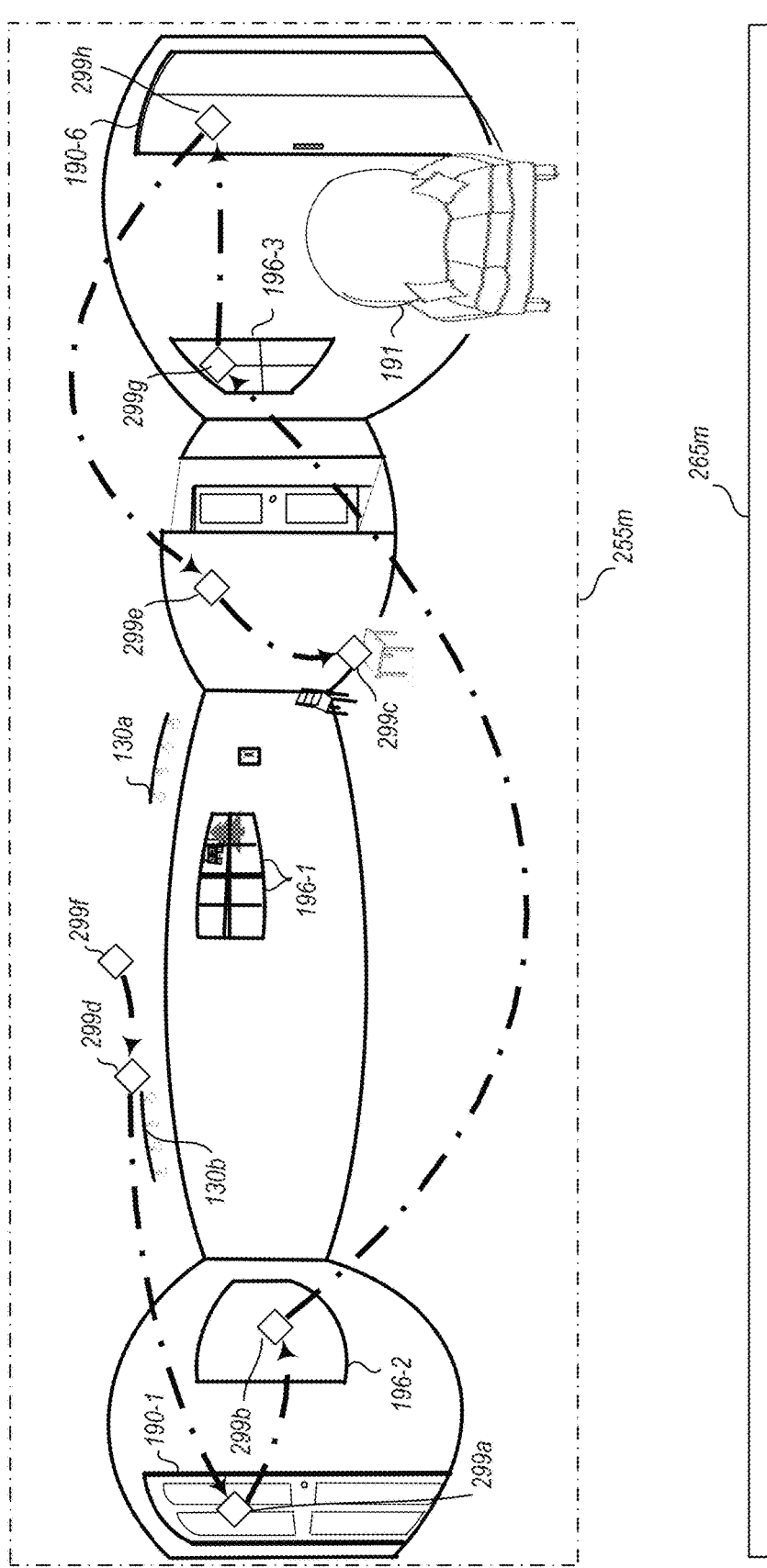

As you enter the living room from the front porch, the first thing that you will notice is the vaulted ceiling, providing a sense of welcome. There is lots of light, including built-in track lighting on the ceiling, and natural light for windows facing west, south and north. The front door is solid wood with paneled inserts and vintage hardware. The west window provides a view of the charming neighborhood, with a filtered view of the distant XXX mountain range. . . .

*Fig. 2M*

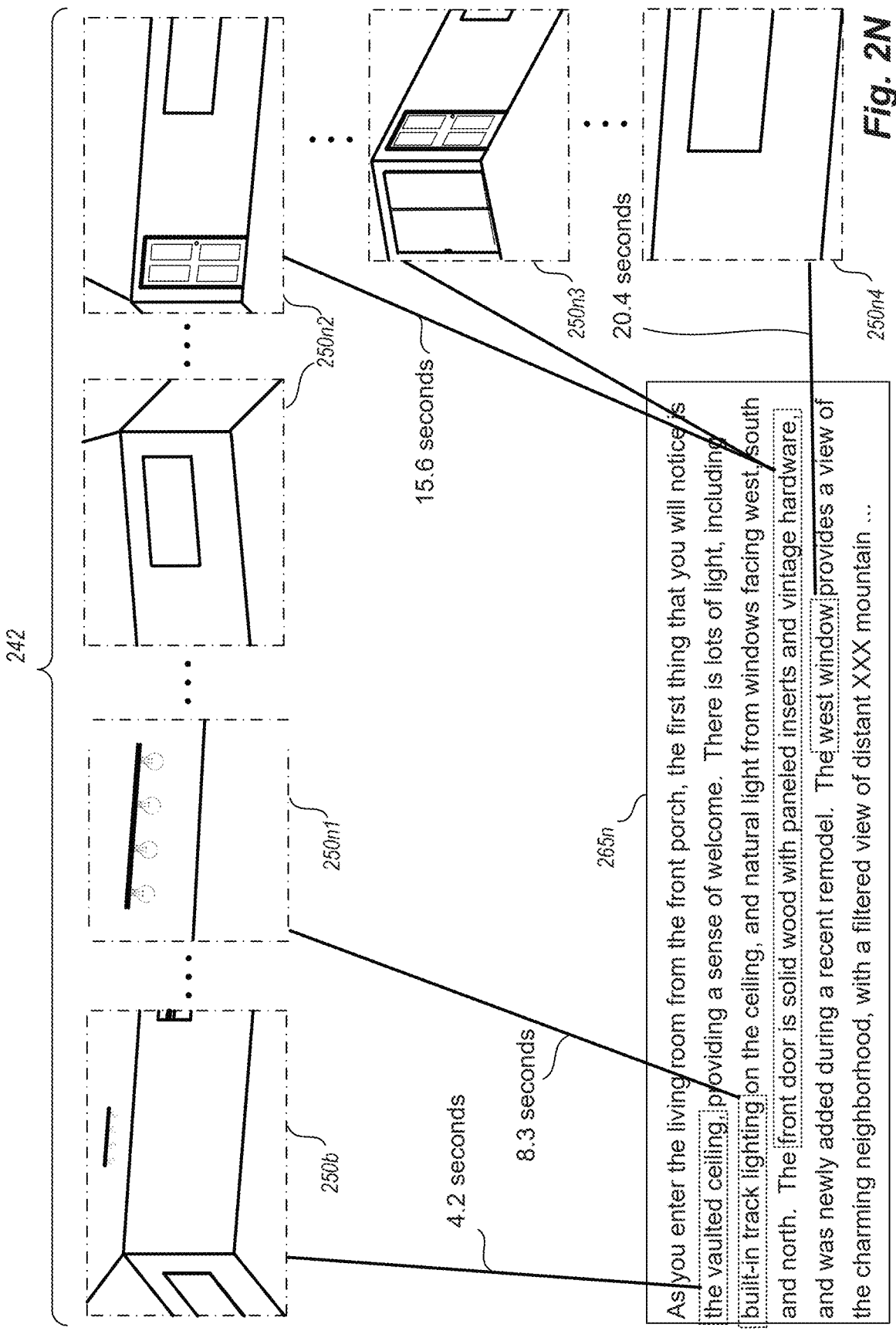

242

250b

250n1

250n2

250n3

250n4

265n 4.2 seconds 8.3 seconds 15.6 seconds 20.4 seconds

As you enter the living room from the front porch, the first thing that you will notice is the vaulted ceiling, providing a sense of welcome. There is lots of light, including built-in track lighting on the ceiling, and natural light from windows facing west, south and north. The front door is solid wood with paneled inserts and vintage hardware, and was newly added during a recent remodel. The west window provides a view of the charming neighborhood, with a filtered view of distant XXX mountain ...

*Fig. 2N*

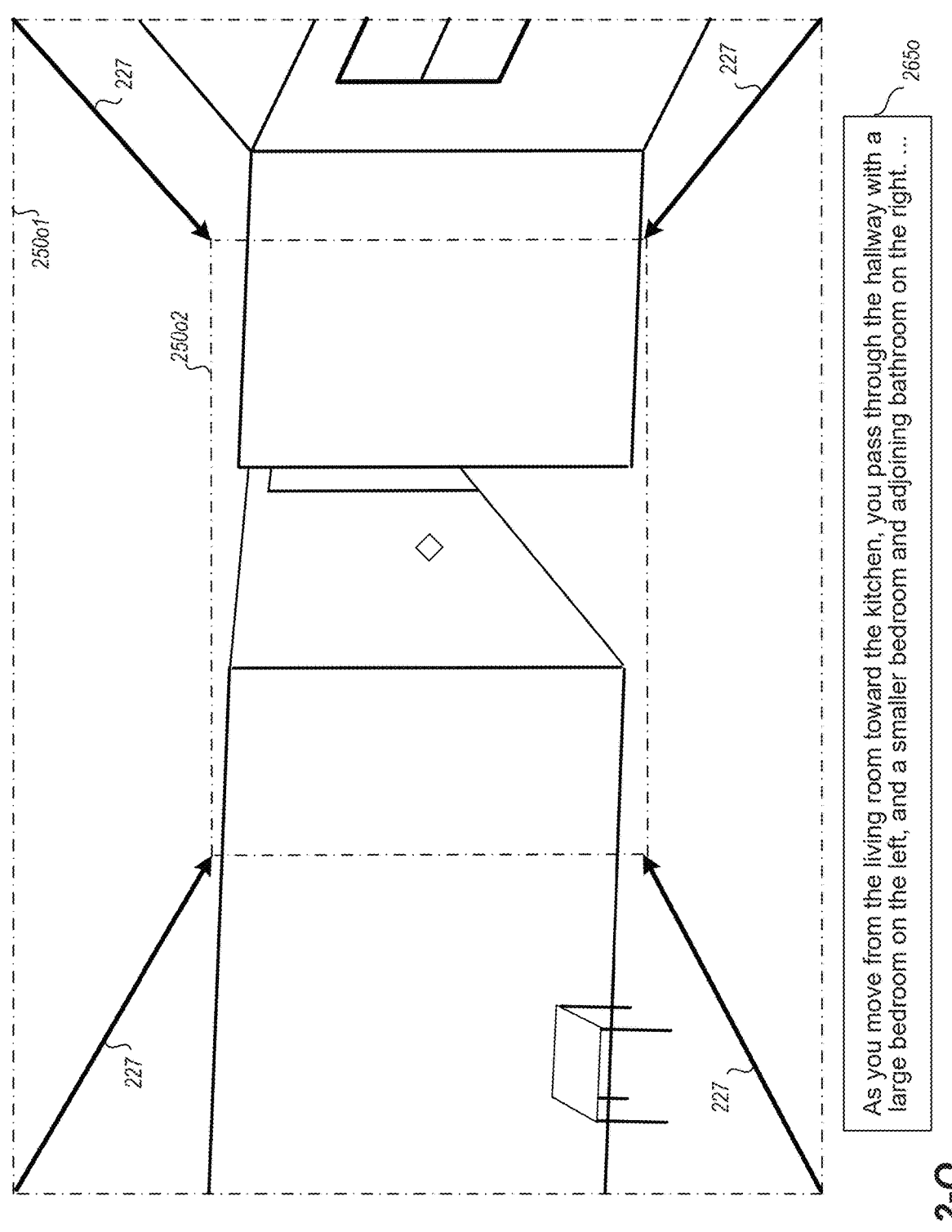
As you move from the living room toward the kitchen, you pass through the hallway with a large bedroom on the left, and a smaller bedroom and adjoining bathroom on the right. ...
*Fig. 2-O*

Fig. 4A

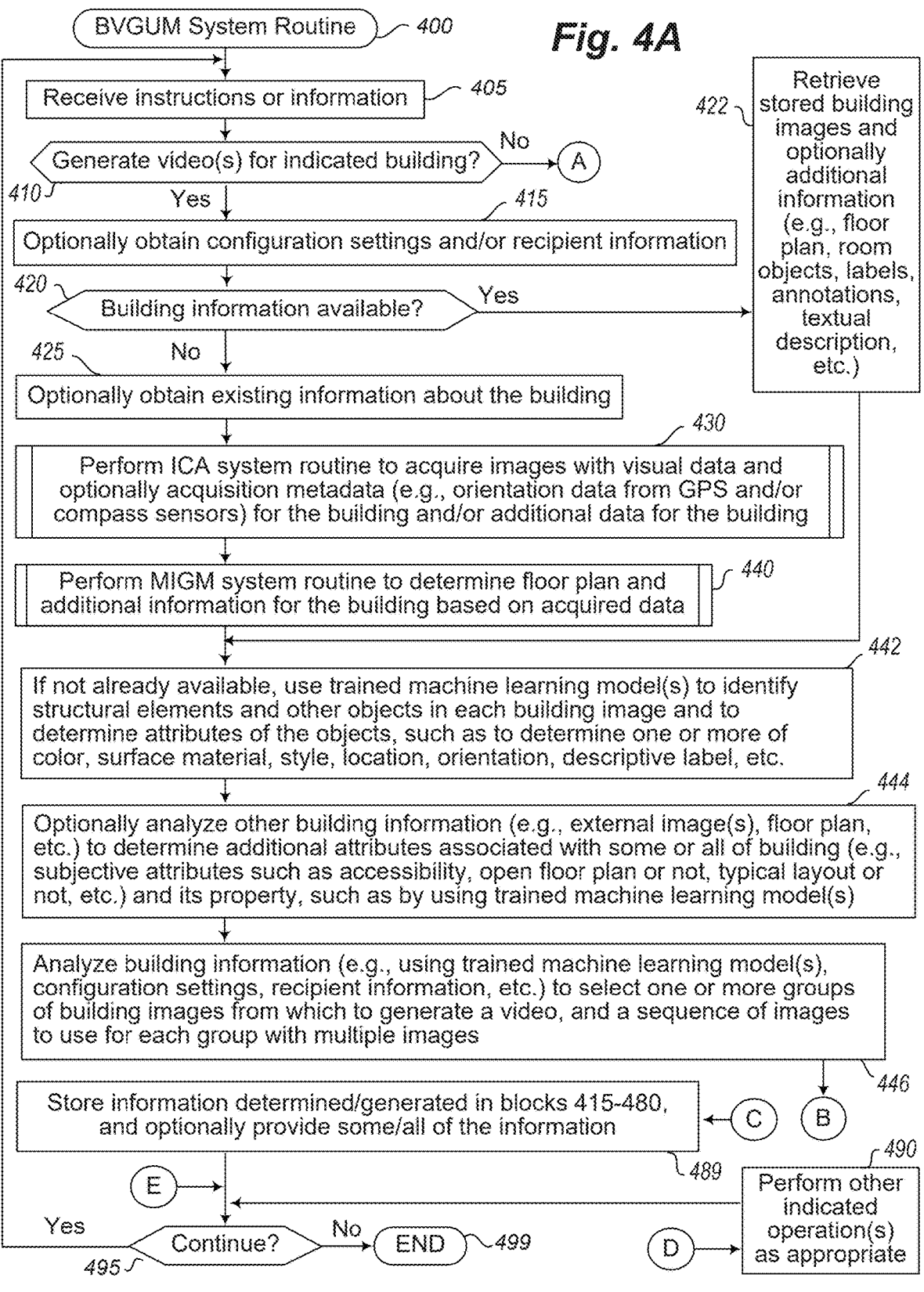

BVGUM System Routine — 400

Receive instructions or information — 405

Generate video(s) for indicated building? — No → A
410 — Yes

Optionally obtain configuration settings and/or recipient information — 415

420 — Building information available? — Yes →

422 — Retrieve stored building images and optionally additional information (e.g., floor plan, room objects, labels, annotations, textual description, etc.)

425 — No

Optionally obtain existing information about the building

430 — Perform ICA system routine to acquire images with visual data and optionally acquisition metadata (e.g., orientation data from GPS and/or compass sensors) for the building and/or additional data for the building 440 — Perform MIGM system routine to determine floor plan and additional information for the building based on acquired data 442 — If not already available, use trained machine learning model(s) to identify structural elements and other objects in each building image and to determine attributes of the objects, such as to determine one or more of color, surface material, style, location, orientation, descriptive label, etc.

444 — Optionally analyze other building information (e.g., external image(s), floor plan, etc.) to determine additional attributes associated with some or all of building (e.g., subjective attributes such as accessibility, open floor plan or not, typical layout or not, etc.) and its property, such as by using trained machine learning model(s)

Analyze building information (e.g., using trained machine learning model(s), configuration settings, recipient information, etc.) to select one or more groups of building images from which to generate a video, and a sequence of images to use for each group with multiple images

446

Store information determined/generated in blocks 415-480, and optionally provide some/all of the information ← C    B

489

E →

490 — Perform other indicated operation(s) as appropriate

Yes
495 — Continue? — No → END — 499

Figure 4B:
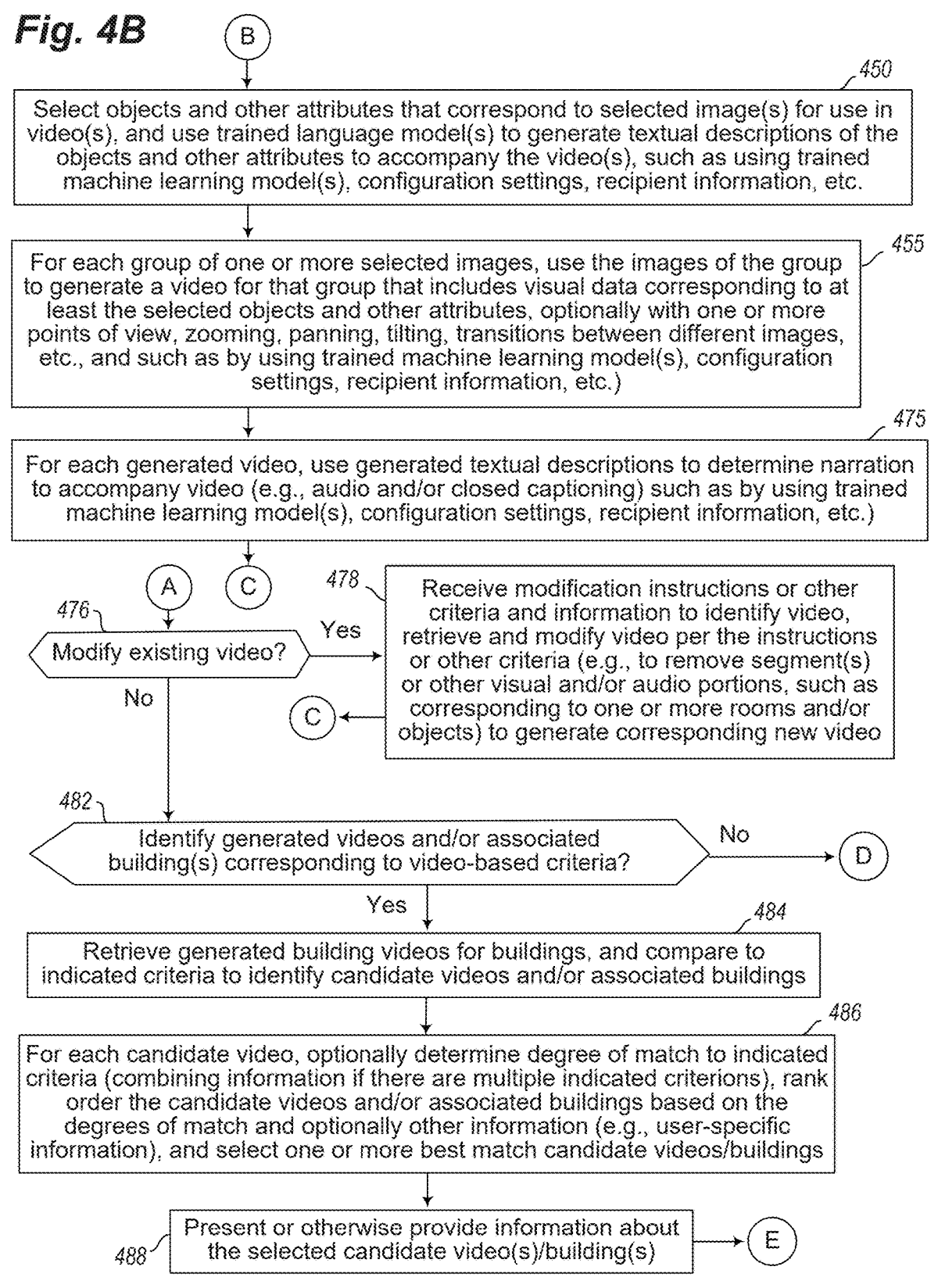

Select objects and other attributes that correspond to selected image(s) for use in video(s), and use trained language model(s) to generate textual descriptions of the objects and other attributes to accompany the video(s), such as using trained machine learning model(s), configuration settings, recipient information, etc.

455

For each group of one or more selected images, use the images of the group to generate a video for that group that includes visual data corresponding to at least the selected objects and other attributes, optionally with one or more points of view, zooming, panning, tilting, transitions between different images, etc., and such as by using trained machine learning model(s), configuration settings, recipient information, etc.)

475

For each generated video, use generated textual descriptions to determine narration to accompany video (e.g., audio and/or closed captioning) such as by using trained machine learning model(s), configuration settings, recipient information, etc.)

(A)  (C)    478

476

Modify existing video?    Yes    Receive modification instructions or other criteria and information to identify video, retrieve and modify video per the instructions or other criteria (e.g., to remove segment(s) or other visual and/or audio portions, such as corresponding to one or more rooms and/or objects) to generate corresponding new video No    (C)

482

Identify generated videos and/or associated building(s) corresponding to video-based criteria?    No    (D)

Yes    484

Retrieve generated building videos for buildings, and compare to indicated criteria to identify candidate videos and/or associated buildings

486

For each candidate video, optionally determine degree of match to indicated criteria (combining information if there are multiple indicated criterions), rank order the candidate videos and/or associated buildings based on the degrees of match and optionally other information (e.g., user-specific information), and select one or more best match candidate videos/buildings 488    Present or otherwise provide information about the selected candidate video(s)/building(s)    (E)

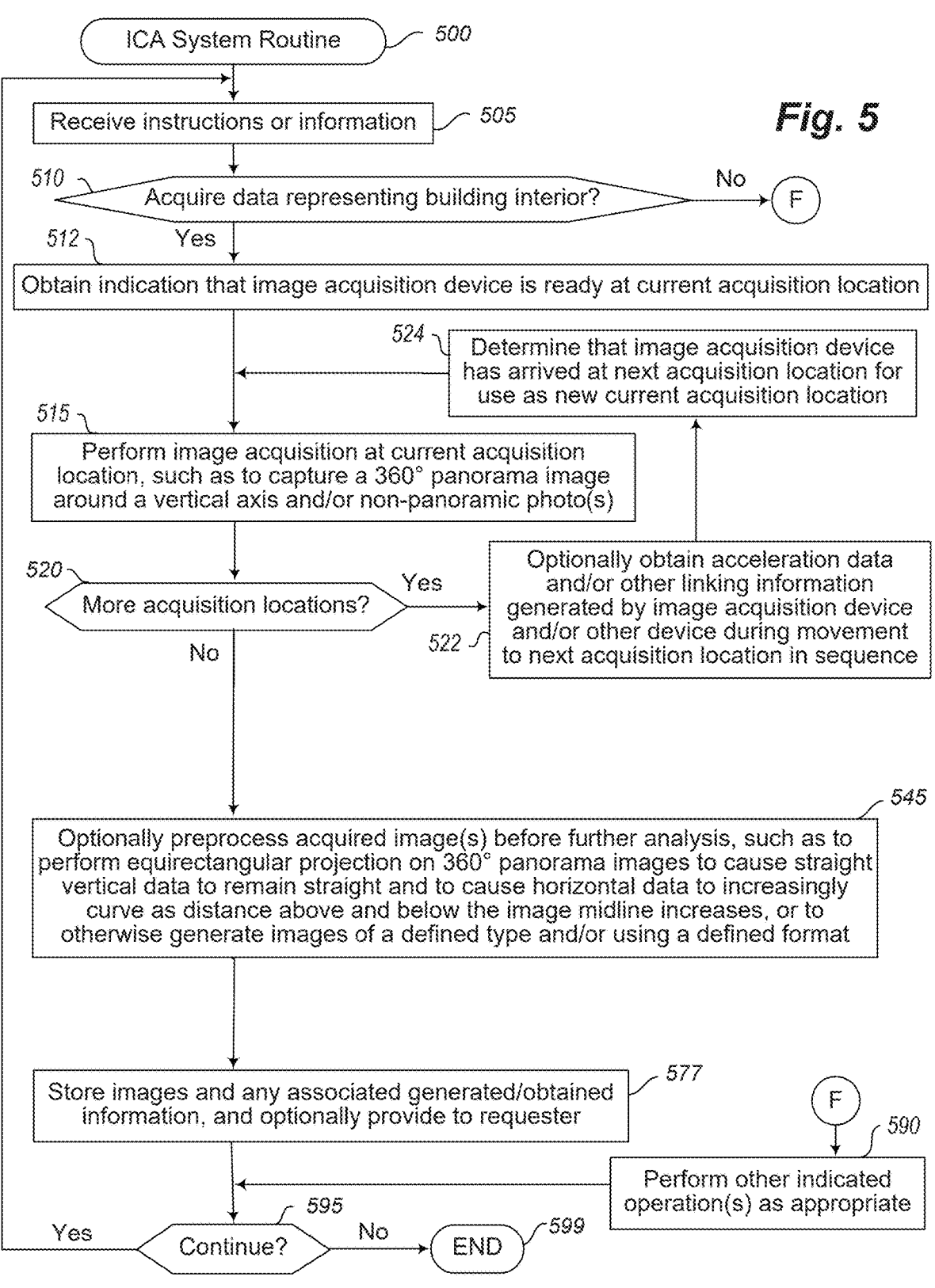

Fig. 5

ICA System Routine — 500

Receive instructions or information — 505

510 — Acquire data representing building interior? — No → F

512 — Yes

Obtain indication that image acquisition device is ready at current acquisition location 524 — Determine that image acquisition device has arrived at next acquisition location for use as new current acquisition location 515 — Perform image acquisition at current acquisition location, such as to capture a 360° panorama image around a vertical axis and/or non-panoramic photo(s)

520 — More acquisition locations? — Yes →

522 — Optionally obtain acceleration data and/or other linking information generated by image acquisition device and/or other device during movement to next acquisition location in sequence No 545 — Optionally preprocess acquired image(s) before further analysis, such as to perform equirectangular projection on 360° panorama images to cause straight vertical data to remain straight and to cause horizontal data to increasingly curve as distance above and below the image midline increases, or to otherwise generate images of a defined type and/or using a defined format 577 — Store images and any associated generated/obtained information, and optionally provide to requester

F

590 — Perform other indicated operation(s) as appropriate

595 — Continue? — Yes / No → END — 599

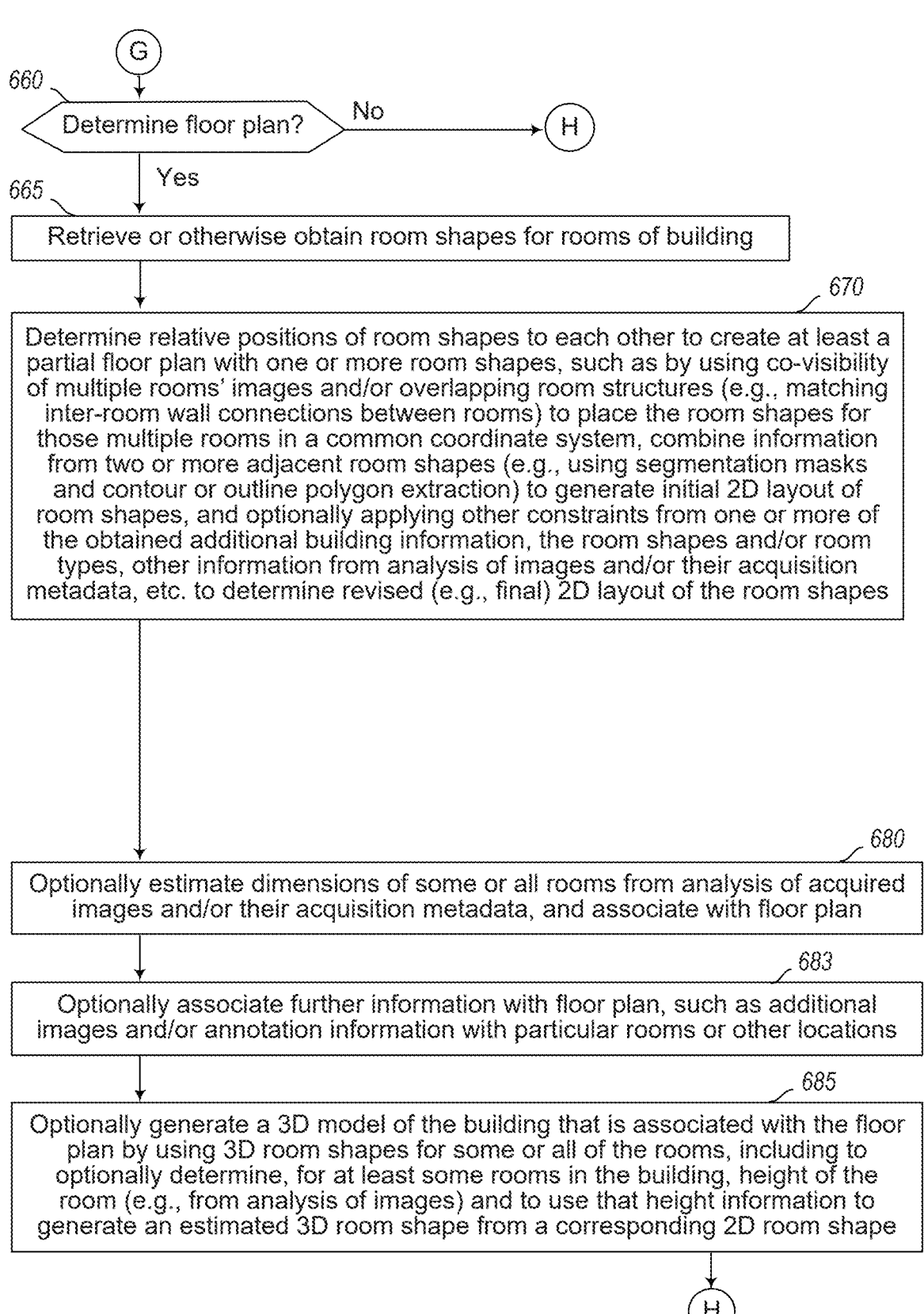

G

*660*

Determine floor plan?     No     →     H

*665*     Yes

Retrieve or otherwise obtain room shapes for rooms of building

*670*

Determine relative positions of room shapes to each other to create at least a partial floor plan with one or more room shapes, such as by using co-visibility of multiple rooms' images and/or overlapping room structures (e.g., matching inter-room wall connections between rooms) to place the room shapes for those multiple rooms in a common coordinate system, combine information from two or more adjacent room shapes (e.g., using segmentation masks and contour or outline polygon extraction) to generate initial 2D layout of room shapes, and optionally applying other constraints from one or more of the obtained additional building information, the room shapes and/or room types, other information from analysis of images and/or their acquisition metadata, etc. to determine revised (e.g., final) 2D layout of the room shapes

*680*

Optionally estimate dimensions of some or all rooms from analysis of acquired images and/or their acquisition metadata, and associate with floor plan

*683*

Optionally associate further information with floor plan, such as additional images and/or annotation information with particular rooms or other locations

*685*

Optionally generate a 3D model of the building that is associated with the floor plan by using 3D room shapes for some or all of the rooms, including to optionally determine, for at least some rooms in the building, height of the room (e.g., from analysis of images) and to use that height information to generate an estimated 3D room shape from a corresponding 2D room shape

AUTOMATED GENERATION AND USE OF BUILDING VIDEOS WITH ACCOMPANYING NARRATION FROM ANALYSIS OF ACQUIRED IMAGES AND OTHER BUILDING INFORMATION

TECHNICAL FIELD

The following disclosure relates generally to techniques for automatically generating building videos having automatically generated narrated descriptions based on automated analysis of acquired building information that includes building images, and for automatically using such generated building videos in further manners, such as for improved identification and navigation of buildings.

BACKGROUND

In various circumstances, such as architectural analysis, property inspection, real estate acquisition and development, general contracting, improvement cost estimation, etc., it may be desirable to know the interior of a house or other building without physically traveling to and entering the building. However, it can be difficult to effectively capture, represent and use such building interior information, including to identify buildings that satisfy criteria of interest, and to display visual information captured within building interiors to users at remote locations (e.g., to enable a user to understand the layout and other details of the interior, including to control the display in user-selected manners). Also, while a floor plan of a building may provide some information about layout and other details of a building interior, such use of floor plans has some drawbacks, including that floor plans can be difficult to construct and maintain, to accurately scale and populate with information about room interiors, to visualize and otherwise use, etc. Also, while textual descriptions of buildings may sometimes exist, they are often inaccurate and/or incomplete (e.g., lack details about various attributes of the buildings, include incorrect or misleading information, etc.).

BRIEF DESCRIPTION OF THE DRAWINGS

FIG. 1B illustrates examples of types of building description information.

FIGS. 4A-4B illustrate an example embodiment of a flow diagram for a Building Video Generation and Usage Manager (BVGUM) system routine in accordance with an embodiment of the present disclosure.

FIG. 5 illustrates an example embodiment of a flow diagram for an Image Capture and Analysis (ICA) system routine in accordance with an embodiment of the present disclosure.

FIGS. 6A-6B illustrate an example embodiment of a flow diagram for a Mapping Information Generation Manager (MIGM) system routine in accordance with an embodiment of the present disclosure.

DETAILED DESCRIPTION

Figure 1A:
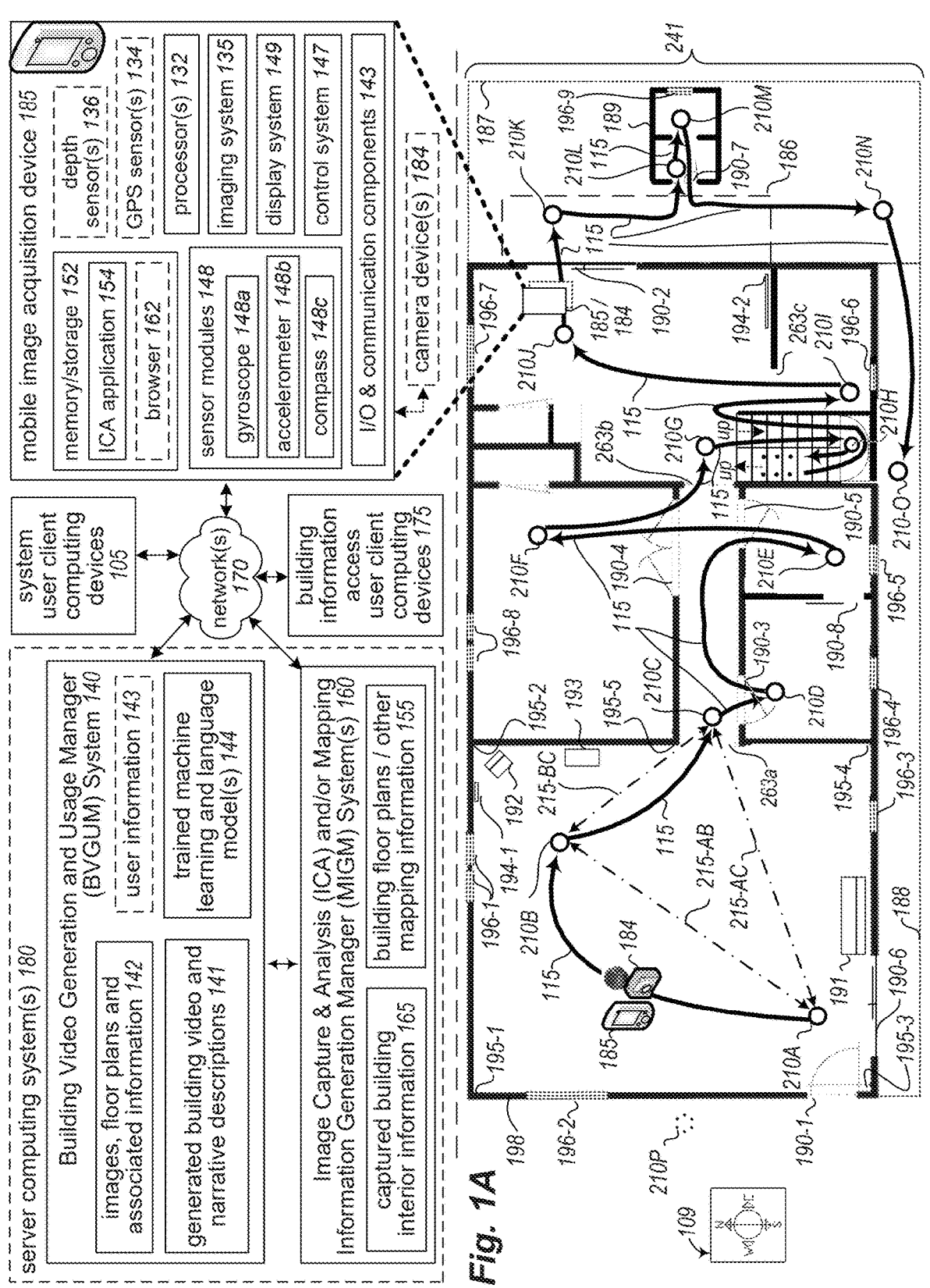
FIG. 1A includes diagrams depicting an exemplary building interior environment and computing system(s) for use in embodiments of the present disclosure, including to generate and use information representing the building, such as videos that are based on acquired building images and on determined attributes of the buildings.

The present disclosure describes techniques for using computing devices to perform automated operations involving generating information about buildings from analysis of acquired building images and optionally other building information (e.g., floor plans), such as automatically generating videos with accompanying automatically generated narration to describe selected building objects and other attributes shown in the visual data of the videos, and to subsequently using the generated building information in one or more further automated manners, such as for improved identification and navigation of buildings. The automated techniques may include automatically determining objects (e.g., structural elements) and other attributes of a building from automated analysis of information about the building (e.g., acquired images for the building, floor plans, etc.), such as by using one or more trained machine learning models (e.g., trained neural networks), and automatically generating textual descriptions about the determined building attributes, such as by using one or more trained language models-such building information may, in at least some embodiments, be for an as-built multi-room building (e.g., a house, office building, etc.) and include panorama images (e.g., with 360° of horizontal video coverage) and/or other images (e.g., rectilinear perspective images) acquired at acquisition locations in and around the building (e.g., without having or using information from any depth sensors or other distance-measuring devices about distances from an image's acquisition location to walls or other objects in the surrounding building). The automated techniques may further include selecting one or more groups of images for a building, and for each such image group, generating a video that includes visual coverage corresponding to selected building attributes of interest and that further includes audible narration based on automatically generated textual descriptions about the building attributes and optionally based on additional information (e.g., about the building as a whole, about transitions between multiple images of a group, etc.). In some cases, the automated techniques may further include using the generated videos in various manners, such as to assist in determining buildings that match specified criteria, for controlling navigation of mobile devices (e.g., autonomous vehicles), for display or other presentation on client device(s) in corresponding GUIs (graphical user interfaces) to enable virtual navigation of a building, etc. Additional details are included below regarding automated generation and use of video information about buildings from automated analysis of building information, and some or all techniques described herein may, in at least some embodiments, be performed via automated operations of a Building Video Generation and Usage Manager ("BVGUM") system, as discussed further below.

As noted above, automated operations of a BVGUM system may in at least some embodiments include automatically analyzing visual data of images acquired in and around a building, and optionally associated image acquisition metadata (e.g., orientation information for an image, such as using heading information from a compass sensor, location information from a GPS sensor, etc.), to generate one or more videos that describe the building. In at least some such embodiments, the automated operations include selecting one or more building images to use in generating a video for the building, including to determine a sequence of the images if multiple images are selected-such image selection may include, for example, selecting images corresponding to particular rooms or other areas, that highlight particular types of building attributes, that have particular types of characteristics, etc. Given a group of one or more selected images, a visual portion of a resulting video may be based on various types of manipulations of the visual data of such images, with non-exclusive examples including zooming, panning (e.g., within a panorama image), tilting, etc., including to highlight or emphasize particular attributes of the building that are of interest to describe, as well as using various types of transitions between the visual data of different images in a sequence. Narration to accompany the video may be further automatically generated and synchronized with the video, including to provide narrative descriptions of selected building attributes, as discussed further below. In at least some such embodiments, one or more machine learning models (e.g., one or more neural networks) may be used by the BVGUM system to perform such image selection and sequence determination, and may be trained via supervised learning (e.g., using labeled versions of user-generated videos, such as video house tours generated by professional photographers or videographers), while in other embodiments such machine learning models may instead be trained in an unsupervised manner (e.g., using unsupervised clustering). With respect to the building images that are used in video generation, some or all of the images acquired for a building and used in video generation may in at least some embodiments and situations be panorama images that are each acquired at one of multiple acquisition locations in or around the building, such as to generate a panorama image at each such acquisition location from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous capture of all the image information (e.g., using one or more fisheye lenses), etc. It will be appreciated that such a panorama image may in some situations be represented in a spherical coordinate system and provide up to 360° coverage around horizontal and/or vertical axes, such that a user viewing a starting panorama image may move the viewing direction within the starting panorama image to different orientations to cause different images (or "views") to be rendered within the starting panorama image (including, if the panorama image is represented in a spherical coordinate system, to convert the image being rendered into a planar coordinate system). Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations. Additional details are included below regarding automated generation of building videos from building images, including with respect to the examples of FIGS. 2D-2P and their associated descriptions.

As noted above, automated operations of a BVGUM system may in at least some embodiments include automatically determining attributes of interest for a building based at least in part on analyzing visual data of images acquired in and around a building and optionally associated image acquisition metadata, including in at least some situations by using one or more trained machine learning models (whether the same or different machine learning models used to select images to use in video generation and/or to perform the video generation)—in other embodiments, information about some or all of the building attributes may instead be determined in other manners, such as in part from an existing textual building description. Such determined attributes may reflect characteristics of individual rooms or other areas of the building, such as corresponding to structural elements and other objects identified in the rooms and/or visible characteristics or other attributes of the objects and the rooms—in particular, the automated analysis by the BVGUM system of building images may, in at least some embodiments and situations, include identifying structural elements or other objects of various types in rooms of the building or otherwise in areas associated with the building (e.g., external areas, additional accessory buildings or other structures, etc.), with non-exclusive examples of such objects including a floor, wall, ceiling, window, doorway, non-doorway wall opening, set of stairs, fixture (e.g., lighting or plumbing), appliance, cabinet, island, fireplace, countertop, other built-in structural element, furniture, etc. The automated analysis by the BVGUM system of acquired building images may further include determining particular attributes of each of some or all such identified objects, such as, for example, a color, type of material (e.g., surface material), estimated age, etc., as well as additional types of attributes in some embodiments such as directions that building objects face (e.g., for windows, doorways, etc.), natural lighting at particular positions (e.g., based on the geographical location and orientation of the building and the position of the sun at a specified time, such as a time-of-day, day-of-month, month-of-year, season-of-year, etc., and optionally corresponding to a particular object), views from particular windows or other locations, etc. Attributes determined for a particular room from one or more images acquired in the room (or otherwise from one or more images acquired at positions with a view of at least some of the room) may include, for example, one or more of the following non-exclusive examples: room types, room dimensions, room shape (e.g., two-dimensional, or '2D', such as relative positions of walls; three-dimensional, or '3D', such as a 3D point cloud and/or planar surfaces of walls and a floor and a ceiling; etc.), types of room usage (e.g., public versus private space) and/or functionality (e.g., recreation), locations in a room of windows and doorways and other inter-room openings, types of inter-room connections, dimensions of inter-room connections, etc. In at least some such embodiments, the BVGUM system may, for such automated analysis of images, use one or more machine learning models (e.g., classification neural network models) that are trained via supervised learning (e.g., using labeled data that identifies images having each of the possible objects and attributes), while in other embodiments such machine learning models may instead be trained in an unsupervised manner (e.g., using unsupervised clustering). Additional details are included below regarding automated analysis of acquired images and/or other environmental data associated with a building to determine attributes of the building and of its rooms, including with respect to the examples of FIGS. 2D-2P and their associated descriptions.

As noted above, automated operations of a BVGUM system may also in at least some embodiments include automatically analyzing types of building information other than acquired building images to determine additional attributes of the building, including in at least some situations by using one or more trained machine learning models (e.g., one or more trained neural networks, and whether the same or different from the machine learning models used to analyze images and/or to select images for videos and/or to generate vides from selected images) to determine attributes that reflect characteristics of some or all of the building (e.g., of two or more rooms of the building), such as corresponding to some or all of a layout of some or all rooms of the building (e.g., based at least in part on inter-connections between rooms and/or other inter-room adjacencies)—such other types of building information may include, for example, one or more of the following: a floor plan; a group of inter-linked images, such as for use in a virtual tour; an existing textual description of a building (e.g., listing information for a building, such as is included on a Multiple Listing Service, or MLS); etc. Such a floor plan of a building may include a 2D (two-dimensional) representation of various information about the building (e.g., the rooms, doorways between rooms and other inter-room connections, exterior doorways, windows, etc.), and may be further associated with various types of supplemental or otherwise additional information about the building (e.g., data for a plurality of other building-related attributes)—such additional building information may, for example, include one or more of the following: a 3D, or three-dimensional, model of the building that includes height information (e.g., for building walls and inter-room openings and other vertical areas); a 2.5D, or two-and-a-half dimensional, model of the building that when rendered includes visual representations of walls and/or other vertical surfaces without explicitly modeling measured heights of those walls and/or other vertical surfaces; images and/or other types of data captured in rooms of the building, including panoramic images (e.g., 360° panorama images); etc., as discussed in greater detail below. In some embodiments and situations, the floor plan and/or its associated information may further represent at least some information external to the building (e.g., for some or all of a property on which the building is located), such as exterior areas adjacent to doorways or other wall openings between the building and the exterior, or more generally some or all external areas of a property that includes one or more buildings or other structures (e.g., a house and one or more outbuildings or other accessory structures, such as a garage, shed, pool house, separate guest quarters, mother-in-law unit or other accessory dwelling unit, pool, patio, deck, sidewalk, etc.).

The automated analysis by the BVGUM system of a building floor plan and/or other building information may, in at least some embodiments and situations, include determining building attributes that are based on information about a building as a whole, such as objective attributes that can be independently verified and/or replicated (e.g., number of bedrooms, number of bathrooms, square footage, connectivity between rooms, etc.), and/or subjective attributes that have associated uncertainty (e.g., whether the building has an open floor plan; has a typical/normal layout versus atypical/odd/unusual layout; a standard versus nonstandard floor plan; a floor plan that is accessibility friendly, such as by being accessible with respect to one or more characteristics such as wheelchair or other disability and/or advanced age; etc.). The automated analysis by the BVGUM system of a building floor plan may, in at least some embodiments and situations, further include determining building attributes that are based at least in part on information about inter-room adjacencies (e.g., inter-room connections between two or more rooms or other areas), such as based at least in part on a layout of some or all rooms of a building (e.g., all rooms on the same story or that are otherwise part of a grouping of rooms), including some or all such subjective attributes, as well as other types of attributes such as a movement flow pattern of people through rooms. At least some such determined building attributes may be further based on information about a building's location and/or orientation (e.g., about views available from windows or other exterior openings of the building, about directions of windows or other structural elements or other objects of the building, about natural lighting information available at specified days and/or seasons and/or times, etc.). In at least some such embodiments, the BVGUM system may, for such automated analysis of building floor plans, use one or more machine learning models (e.g., classification neural network models) that are trained via supervised learning (e.g., using labeled data that identifies floor plans or other groups of rooms or other areas having each of the possible characteristics or other attributes), while in other embodiments such machine learning models may instead be trained in an unsupervised manner (e.g., using unsupervised clustering). Additional details are included below regarding automated analysis of a floor plan for a building to determine attributes of the building, including with respect to the examples of FIGS. 2D-2P and their associated descriptions.

As noted above, automated operations of a BVGUM system may also in at least some embodiments include automated generation of descriptions about a building based on automatically determined characteristics and other attributes, including, in at least some embodiments and situations, using one or more trained language models to generate a description for each of some or all such determined attributes. The generated descriptions for individual attributes may be further combined in various manners in various embodiments, such as by grouping attributes and their associated descriptions in various manners (e.g., by room or other area; by type of attribute, such as by object type and/or color and/or surface material; by degree of specificity or generality, such as to group building-wide attributes and include their generated descriptions, followed by generated descriptions for attributes that are grouped by room, followed by generated descriptions for attributes that correspond to individual structural elements and other objects; etc.). After attributes and/or building descriptions are generated or otherwise obtained for a building, such as based on analysis of information for a building (e.g., images of, a floor plan for, and optionally other associated information for a building), that generated building information may be used by the BVGUM system in various manners, including in some embodiments as part of generating a narration that accompanies the visual data of a generated video and describes information shown in the visual data. Such generation of a video narration may include, for example, using one or more trained language models that take input such as objects and/or other attributes, associated location information (e.g., one or more rooms, one or more stories or other groups of rooms, etc.), timing and/or sequence information (e.g., a series of objects and/or other attributes to be highlighted or otherwise shown in a video), etc., and generate corresponding textual descriptions. Additional details are included below regarding automatically generating descriptions of determined building attributes and of using such generated descriptions as part of video narrations, including with respect to the examples of FIGS. 2D-2P and their associated descriptions.

After videos are automatically generated for a building based on analysis of images and optionally other associated information of a building, that generated building information may also be used by the BVGUM system in some embodiments to automatically determine that the building matches one or more specified criteria (e.g., search criteria) in various manners in various embodiments, including to identify that a building is similar to or otherwise matches one or more other buildings based on their corresponding videos or other building information. Such criteria may include any one or more attributes or specified combinations of them, and/or more generally may match content of a building video narration, with examples including based on particular objects and/or other attributes, based on adjacency information about which rooms are inter-connected and related inter-room relationship information (e.g., with respect to overall building layout), based on particular rooms or other areas and/or to attributes of those rooms or other areas, etc. Non-exclusive and non-limiting illustrative examples of criteria may include a kitchen with a tile-covered island and dark-colored wood floor and a northward-facing view; a building having a bathroom adjacent to bedroom (i.e., without an intervening hall or other room); a deck adjacent to a family room (optionally with a particular type of connection between them, such as French doors); 2 bedrooms facing south; a master bedroom on a second story with a view of the ocean or more generally of water; any combination of such specified criteria; etc. Additional details are included below regarding using generated information for a building to assist in further identification of the building as matching specified criteria or otherwise being of use, including with respect to the examples of FIGS. 2D-2P and their associated description.

The described techniques provide various benefits in various embodiments, including to allow information about multi-room buildings and other structures to be identified and used more efficiently and rapidly and in manners not previously available, including to automatically identify buildings that match specified criteria based at least in part on automated analysis of various types of building information (e.g., images, floor plans, etc.)—such criteria may be based, for example, on one or more of the following: attributes of particular objects within the building (e.g., in particular rooms or other areas, or more generally attributes of those rooms or other areas), such as determined from analysis of one or more images acquired at the building; similarity to one or more other buildings; adjacency information about which rooms are inter-connected and related inter-room relationship information, such as with respect to overall building layout; similarity to particular building or other area characteristics or other attributes; similarity to subjective attributes regarding a floor plan's characteristics, etc. In addition, such automated techniques allow such identification of matching buildings to be determined by using information acquired from the actual building environment (rather than from plans on how the building should theoretically be constructed), as well as enabling the capture of changes to structural elements and/or visual appearance elements that occur after a building is initially constructed. Such described techniques further provide benefits in allowing improved automated navigation of a building by mobile devices (e.g., semi-autonomous or fully-autonomous vehicles), based at least in part on the identification of buildings that match specified criteria, including to significantly reduce computing power and time used to attempt to otherwise learn a building's layout. In addition, in some embodiments the described techniques may be used to provide an improved GUI in which a user may more accurately and quickly identify one or more buildings matching specified criteria, and obtain information about indicated buildings (e.g., for use in navigating an interior of the one or more buildings), including in response to search requests, as part of providing personalized information to the user, as part of providing value estimates and/or other information about a building to a user (e.g., after analysis of information about one or more target building floor plans that are similar to one or more initial floor plans or that otherwise match specified criteria), etc. Various other benefits are also provided by the described techniques, some of which are further described elsewhere herein.

In addition, in some embodiments, one or more target buildings are identified that are similar to specified criteria associated with a particular end-user (e.g., based on one or more initial buildings that are selected by the end-user and/or are identified as previously being of interest to the end-user, whether based on explicit and/or implicit activities of the end-user to specify such buildings; based on one or more search criteria specified by the end-user, whether explicitly and/or implicitly; etc.), and are used in further automated activities to personalize interactions with the end-user. Such further automated personalized interactions may be of various types in various embodiments, and in some embodiments may include displaying or otherwise presenting information to the end-user about the target building(s) and/or additional information associated with those buildings. Furthermore, in at least some embodiments, the videos that are generated or otherwise presented to an end-user may be personalized to that end-user in various manners, such as based on a video length, types of rooms shown, types of attributes shown, etc., including in some embodiments to dynamically generate a new building video for an end-user recipient based on information specific to that recipient, to select one of multiple available videos for a building to present to an end-user recipient based on information specific to that recipient, to customize an existing building video for an end-user recipient end-based on information specific to that recipient (e.g., to remove portions of the existing video), etc. Additional details are included below regarding end-user personalization and/or presentation with respect to indicated buildings, including with respect to the examples of FIGS. 2D-2P and their associated descriptions.

As noted above, automated operations of a BVGUM system may include using acquired building images and/or other building information, such as a floor plan. In at least some embodiments, such an BVGUM system may operate in conjunction with one or more separate ICA (Image Capture and Analysis) systems and/or with one or more separate MIGM (Mapping Information and Generation Manager) systems, such as to obtain and use images and floor plans and other associated information for buildings from the ICA and/or MIGM systems, while in other embodiments such an BVGUM system may incorporate some or all functionality of such ICA and/or MIGM systems as part of the BVGUM system. In yet other embodiments, the BVGUM system may operate without using some or all functionality of the ICA and/or MIGM systems, such as if the BVGUM system obtains building images, floor plans and/or other associated information from other sources (e.g., from manual creation or provision of such building images, floor plans and/or associated information by one or more users).

With respect to functionality of such an ICA system, it may perform automated operations in at least some embodiments to acquire images (e.g., panorama images) at various acquisition locations associated with a building (e.g., in the interior of multiple rooms of the building), and optionally further acquire metadata related to the image acquisition process (e.g., image pose information, such as using compass headings and/or GPS-based locations) and/or to movement of a capture device between acquisition locations—in at least some embodiments, such acquisition and subsequent use of acquired information may occur without having or using information from depth sensors or other distance-measuring devices about distances from images' acquisition locations to walls or other objects in a surrounding building or other structure. For example, in at least some such embodiments, such techniques may include using one or more mobile devices (e.g., a camera having one or more fisheye lenses and mounted on a rotatable tripod or otherwise having an automated rotation mechanism; a camera having one or more fisheye lenses sufficient to capture 360° horizontally without rotation; a smart phone held and moved by a user, such as to rotate the user's body and held smart phone in a 360° circle around a vertical axis; a camera held by or mounted on a user or the user's clothing; a camera mounted on an aerial and/or ground-based drone or other robotic device; etc.) to capture visual data from a sequence of multiple acquisition locations within multiple rooms of a house (or other building). Additional details are included elsewhere herein regarding operations of device(s) implementing an ICA system, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images (and optionally other images) that have been acquired for a building interior (and optionally an exterior of the building), and generate a corresponding floor plan for the building, such as by determining room shapes and locations of passages connecting rooms for some or all of those panorama images, as well as by determining structural wall elements and optionally other objects in some or all rooms of the building in at least some embodiments and situations. The types of structural wall elements corresponding to connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular objects and attributes (e.g., a color and/or material type and/or other characteristics of particular structural elements or other objects, such as a floor, wall, ceiling, countertop, furniture, fixture, appliance, cabinet, island, fireplace, etc.; the presence and/or absence of particular objects or other elements; etc.), or to otherwise determine relevant attributes (e.g., directions that building objects face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices-however, it will be understood that the described techniques may be used in other manners in other embodiments, and that the invention is thus not limited to the exemplary details provided. As one non-exclusive example, while specific types of data structures (e.g., videos, floor plans, virtual tours of inter-linked images, generated building descriptions, etc.) are generated and used in specific manners in some embodiments, it will be appreciated that other types of information to describe buildings may be similarly generated and used in other embodiments, including for buildings (or other structures or layouts) separate from houses, and that buildings identified as matching specified criteria may be used in other manners in other embodiments. In addition, the term "building" refers herein to any partially or fully enclosed structure, typically but not necessarily encompassing one or more rooms that visually or otherwise divide the interior space of the structure-non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1A includes an example block diagram of various computing devices and systems that may participate in the described techniques in some embodiments, such as with respect to the illustrated example building 198 (in this example, a house) and the example Building Video Generation and Usage Manager ("BVGUM") system 140 executing on one or more server computing systems 180 in this example embodiment. In the illustrated embodiment, the BVGUM system 140 analyzes obtained building information 142 (e.g., images, such as images 165 acquired by the ICA system; floor plans, such as floor plans 155 generated by the MIGM system; etc.) and uses that building information and information generated from its analysis to generate building videos 141 with accompanying narration, optionally using supporting information supplied by system operator users via computing devices 105 over intervening computer network(s) 170, and in some embodiments and situations by using one or more trained machine learning and/or language models 144 as part of the analysis of the building information 142 and/or generation of the videos 141—in some embodiments, the building information 142 that is analyzed by the BVGUM system may be obtained in manners other than via ICA and/or MIGM systems (e.g., if such ICA and/or MIGM systems are not part of the BVGUM system), such as to receive building images and/or floor plans from other sources. The BVGUM system may further use such generated building information in one or more further automated manners, including in some embodiments as part of identifying buildings that match each other or other indicated criteria-such criteria may in some embodiments and situations be supplied by or otherwise associated with particular users (e.g., objects or other attributes specified by users, floor plans or other building information indicated by those users, other building videos previously identified as being of interest to the users, etc.), and corresponding information 143 about various users may further optionally be stored and used in the identifying of the buildings that satisfy such criteria and the subsequent use of the identified buildings' information (e.g., use of the buildings' generated videos) in one or more further automated manners. In addition, in at least some embodiments and situations, one or more users of client computing devices 105 may further interact over the network(s) 170 with the BVGUM system 140, such as to assist with some of the automated operations of the BVGUM system for identifying buildings satisfying criteria and/or subsequent use of the identified floor plans in one or more further automated manners. Additional details related to the automated operations of the BVGUM system are included elsewhere herein, including with respect to FIGS. 2D-2P and FIGS. 4A-4B.

In addition, in this example, an Interior Capture and Analysis ("ICA") system (e.g., an ICA system 160 executing on the one or more server computing systems 180, such as part of the BVGUM system; an ICA system application 154 executing on a mobile image acquisition device 185; etc.) captures information 165 with respect to one or more buildings or other structures (e.g., by capturing one or more 360° panorama images and/or other images for multiple acquisition locations 210 in example house 198), and a MIGM (Mapping Information Generation Manager) system 160 executing on the one or more server computing systems 180 (e.g., as part of the BVGUM system) further uses that captured building information and optionally additional supporting information (e.g., supplied by system operator users via computing devices 105 over intervening computer network(s) 170) to generate and provide building floor plans 155 and/or other mapping-related information (not shown) for the building(s) or other structure(s). While the ICA and MIGM systems 160 are illustrated in this example embodiment as executing on the same server computing system(s) 180 as the BVGUM system (e.g., with all systems being operated by a single entity or otherwise being executed in coordination with each other, such as with some or all functionality of all the systems integrated together), in other embodiments the ICA system 160 and/or MIGM system 160 and/or BVGUM system 140 may operate on one or more other systems separate from the system(s) 180 (e.g., on mobile device 185; one or more other computing systems, not shown; etc.), whether instead of or in addition to the copies of those systems executing on the system(s) 180 (e.g., to have a copy of the MIGM system 160 executing on the device 185 to incrementally generate at least partial building floor plans as building images are acquired by the ICA system 160 executing on the device 185 and/or by that copy of the MIGM system, while another copy of the MIGM system optionally executes on one or more server computing systems to generate a final complete building floor plan after all images are acquired), and in yet other embodiments the BVGUM may instead operate without an ICA system and/or MIGM system and instead obtain panorama images (or other images) and/or building floor plans from one or more external sources. Additional details related to the automated operation of the ICA and MIGM systems are included elsewhere herein, including with respect to FIGS. 2A-2D and with respect to FIGS. 5 and 6A-6B, respectively.

Various components of the mobile image acquisition computing device 185 are also illustrated in FIG. 1A, including one or more hardware processors 132 (e.g., CPUs, GPUs, etc.) that execute software (e.g., ICA application 154, optional browser 162, etc.) using executable instructions stored and/or loaded on one or more memory/storage components 152 of the device 185, and optionally one or more imaging systems 135 of one or more types to acquire visual data of one or more panorama images 165 and/or other images (not shown, such as rectilinear perspective images)—some or all such images 165 may in some embodiments be supplied by one or more separate associated camera devices 184 (e.g., via a wired/cabled connection, via a Bluetooth or other inter-device wireless communications, etc.), whether in addition to or instead of images captured by the mobile device 185. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), one or more control systems 147 managing I/O (input/output) and/or communications and/or networking for the device 185 (e.g., to receive instructions from and present information to the user) such as for other device I/O and communication components 143 (e.g., network interfaces or other connections, keyboards, mice or other pointing devices, microphones, speakers, GPS receivers, etc.), a display system 149 (e.g., with a touch-sensitive screen), optionally one or more depth-sensing sensors or other distance-measuring components 136 of one or more types, optionally a GPS (or Global Positioning System) sensor 134 or other position determination sensor (not shown in this example), optionally other components (e.g., one or more lighting components), etc. Other computing devices/systems 105, 175 and 180 and/or camera devices 184 may include various hardware components and stored information in a manner analogous to mobile device 185, which are not shown in this example for the sake of brevity, and as discussed in greater detail below with respect to FIG. 3.

One or more users (e.g., end users, not shown) of one or more client computing devices 175 may further interact over one or more computer networks 170 with the BVGUM system 140 (and optionally the ICA system 160 and/or MIGM system 160), such as to participate in identifying buildings and/or building videos satisfying target criteria and in subsequently using information about the identified buildings (e.g., generated building videos) in one or more further automated manners-such client computing devices may each execute a building information access system (not shown) that is used by the users in the interactions, as discussed in greater detail elsewhere herein, including with respect to FIG. 7. Such interactions by the user(s) may include, for example, specifying criteria to use in searching for corresponding buildings or building videos or otherwise providing building information about criteria of interest to the users, or obtaining and optionally requesting information for one or more indicated buildings (e.g., to play or otherwise present a sequence of multiple videos for one or more buildings, such as in a playlist and/or by using auto-play functionality) and interacting with corresponding provided building information (e.g., to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed; to view generated textual building information or other generated building information; etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1A, in some embodiments the client computing devices 175 (or other devices, not shown) may receive and use information about buildings (e.g., identified floor plans and/or other mapping-related information) in additional manners, such as to control or assist automated navigation activities by those devices (e.g., by autonomous vehicles or other devices), whether instead of or in addition to display of the identified information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1A, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 185 and/or associated camera devices 184, and for use in generating and providing a representation of an interior of the building or other structure. For example, in at least some such embodiments, such techniques may include using one or more mobile devices (e.g., a camera having one or more fisheye lenses and mounted on a rotatable tripod or otherwise having an automated rotation mechanism, a camera having sufficient fisheye lenses to capture 360° horizontally without rotation, a smart phone held and moved by a user, a camera held by or mounted on a user or the user's clothing, etc.) to capture data from a sequence of multiple acquisition locations within multiple rooms of a house (or other building), and to optionally further capture data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is captured, the techniques may include producing a 360° panorama image from that acquisition location with 360° of horizontal information around a vertical axis (e.g., a 360° panorama image that shows the surrounding room in an equirectangular format), and then providing the panorama images for subsequent use by the MIGM and/or BVGUM systems. Additional details related to embodiments of a system providing at least some such functionality of an ICA system are included in U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Inter-Connected Images"; each of which is incorporated herein by reference in its entirety.

In addition, while not illustrated in FIG. 1A, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model floor plan rendering of the building and/or a 3D model floor plan rendering of the building, etc., and including for a floor plan of a multi-story or otherwise multi-level building to have multiple associated sub-floor plans for different stories or levels that are interlinked (e.g., via connecting stairway passages) or are part of a common 2.5D and/or 3D model. Accordingly, non-exclusive examples of an end user's inter-actions with a displayed or otherwise generated 2D floor plan of a building may include one or more of the following: to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D coordinate system to which a current user viewing direction is directed, and to render a corresponding planar image that illustrates that portion of the panorama image without the curvature or other distor-tions present in the original panorama image; etc. Additional details regarding a BIIP (Building Information Integrated Presentation) system and/or an ILTM (Image Locations Transition Manager) system, which are example embodi-ments of systems to provide or otherwise support at least some functionality of a building information access system and routine as discussed herein, are included in U.S. Non-Provisional patent application Ser. No. 16/681,787, filed Nov. 12, 2019 and entitled "Presenting Integrated Building Information Using Three-Dimensional Building Models," and in U.S. Non-Provisional patent application Ser. No. 15/950,881, filed Apr. 11, 2018 and entitled "Presenting Image Transition Sequences Between Acquisition Loca-tions," each of which is incorporated herein by reference in its entirety. In addition, while not illustrated in FIG. 1A, in some embodiments the client computing devices 175 (or other devices, not shown) may receive and use generated floor plans and/or other generated mapping-related informa-tion in additional manners, such as to control or assist automated navigation activities by those devices (e.g., by autonomous vehicles or other devices), whether instead of or in addition to display of the generated information.

FIG. 1A further depicts an exemplary building interior environment in which 360° panorama images and/or other images are acquired, such as by the ICA system and for use by the MIGM system (e.g., under control of the BVGUM system) to generate and provide one or more corresponding building floor plans (e.g., multiple incremental partial build-ing floor plans) and/or by the BVGUM system to further use such building information as part of automated building information generation operations. In particular, FIG. 1A illustrates one story of a multi-story house (or other build-ing) 198 with an interior that was captured at least in part via multiple panorama images, such as by a mobile image acquisition device 185 with image acquisition capabilities and/or one or more associated camera devices 184 as they are moved through the building interior to a sequence of multiple acquisition locations 210 (e.g., starting at acquisi-tion location 210A, moving to acquisition location 210B along travel path 115, etc., and ending at acquisition location 210-O or 210P outside of the building). An embodiment of the ICA system may automatically perform or assist in the capturing of the data representing the building interior (as well as to further analyze the captured data to generate 360° panorama images to provide a visual representation of the building interior), and an embodiment of the MIGM system may analyze the visual data of the acquired images to generate one or more building floor plans for the house 198 (e.g., multiple incremental building floor plans). While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations in such embodiments may be determined in part or in whole based on elements in different images but without using any data from any such depth sensors, while in other embodiments such depth data may be used. In addition, while directional indicator 109 is provided in FIG. 1A for reference of the reader relative to the example house 198, the mobile device and/or ICA system may not use such absolute directional information and/or absolute locations in at least some embodiments, such as to instead determine relative directions and distances between acquisition locations 210 without regard to actual geographical positions or directions in such embodiments, while in other embodiments such absolute directional information and/or absolute locations may be obtained and used.

In operation, the mobile device 185 and/or camera device(s) 184 arrive at a first acquisition location 210A within a first room of the building interior (in this example, in a living room accessible via an external door 190-1), and captures or acquires a view of a portion of the building interior that is visible from that acquisition location 210A (e.g., some or all of the first room, and optionally small portions of one or more other adjacent or nearby rooms, such as through doorway wall openings, non-doorway wall open-ings, hallways, stairways or other connecting passages from the first room). The view capture may be performed in various manners as discussed herein, and may include a number of structural elements or other objects that may be visible in images captured from the acquisition location—in the example of FIG. 1A, such objects within the building 198 include the walls, floors, ceilings, doorways 190 (in-cluding 190-1 through 190-6, such as with swinging and/or sliding doors), windows 196 (including 196-1 through 196-8), borders between walls and other walls/ceilings/floors such as for inter-wall corners or edges 195 (including corner 195-1 in the northwest corner of the building 198, corner 195-2 in the northeast corner of the first room, corner 195-3 in the southwest corner of the first room, corner 195-4 in the southeast corner of the first room, corner 195-5 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1A), various built-in appliances or other fixtures or other struc-tural elements (not shown in FIG. 1A), etc. The user may also optionally provide a textual or auditory label identifier to be associated with an acquisition location and/or a sur-rounding room, such as "living room" for one of acquisition locations 210A or 210B or for the room including acquisi-tion locations 210A and/or 210B, and/or a descriptive anno-tation with one or more phrases or sentences about a room and/or one or more objects in the room, while in other embodiments the ICA and/or MIGM system may automati-cally generate such identifiers and/or annotations (e.g., by automatically analyzing images and/or video and/or other recorded information for a building to perform a corresponding automated determination, such as by using machine learning; based at least in part on input from ICA and/or MIGM system operator users; etc.) or the identifiers may not be used.

After the first acquisition location 210A has been captured, the mobile device 185 and/or camera device(s) 184 may be moved or move under their own power to a next acquisition location (such as acquisition location 210B), optionally recording images and/or video and/or other data from the hardware components (e.g., from one or more IMUs, from the camera, etc.) during movement between the acquisition locations. At the next acquisition location, the mobile 185 and/or camera device(s) 184 may similarly capture a 360° panorama image and/or other type of image from that acquisition location. This process may repeat for some or all rooms of the building and in some cases external to the building, as illustrated for additional acquisition locations 210C-210P in this example, with the images from acquisition locations 210A to 210-O being captured in a single image acquisition session in this example (e.g., in a substantially continuous manner, such as within a total of 5 minutes or 15 minutes), and with the image from acquisition location 210P optionally being acquired at a different time (e.g., from a street adjacent to the building or front yard of the building). In this example, multiple of the acquisition locations 210K-210P are external to but associated with the building 198 on the surrounding property 241, including acquisition locations 210L and 210M in one or more additional structures on the same property (e.g., an ADU, or accessory dwelling unit; a garage; a shed; etc.), acquisition location 210K on an external deck or patio 186, and acquisition locations 210N-210P at multiple yard locations on the property 241 (e.g., backyard 187, side yard 188, front yard including acquisition location 210P, etc.). The acquired images for each acquisition location may be further analyzed, including in some embodiments to render or otherwise place each panorama image in an equirectangular format, whether at the time of image acquisition or later, as well as further analyzed by the MIGM and/or BVGUM systems in the manners described herein.

FIG. 1B illustrates examples of types of building description information 110b that may be available in some embodiments, such as existing building information that is subsequently analyzed and used by the BVGUM system. In the example of FIG. 1B, the building description information 110b includes an overview textual description, and well as various attribute data, such as may be used in part or in whole as listing information for an MLS system. In this example, the attribute data is grouped into sections (e.g., overview attributes, further interior detail attributes, further property detail attributes, etc.), but in other embodiments the attribute data may not be grouped or may be grouped in other manners, or more generally the building description information may not be separated into a list of attributes and a separate textual overview description. In this example, the separate textual overview description emphasizes characteristics that may be of interest to viewers, such as a house style type, information of interest about rooms and other building characteristics (e.g., have been recently updated or have other characteristics of interest), information of interest about the property and surrounding neighborhood or other environment, etc. In addition, in this example, the attribute data includes objective attributes of a variety of types about rooms and the building and limited information about appliances, but may lack details of various types shown in italics in this example (e.g., about subjective attributes, about inter-room connectivity and other adjacency, about other particular structural elements or objects and about attributes of such objects, etc.), such as may instead be determined by the BVGUM system via analysis of building images and/or other building information (e.g., floor plans).

Various details are provided with respect to FIGS. 1A and 1B, but it will be appreciated that the provided details are non-exclusive examples included for illustrative purposes, and other embodiments may be performed in other manners without some or all such details.

Figure 2A:
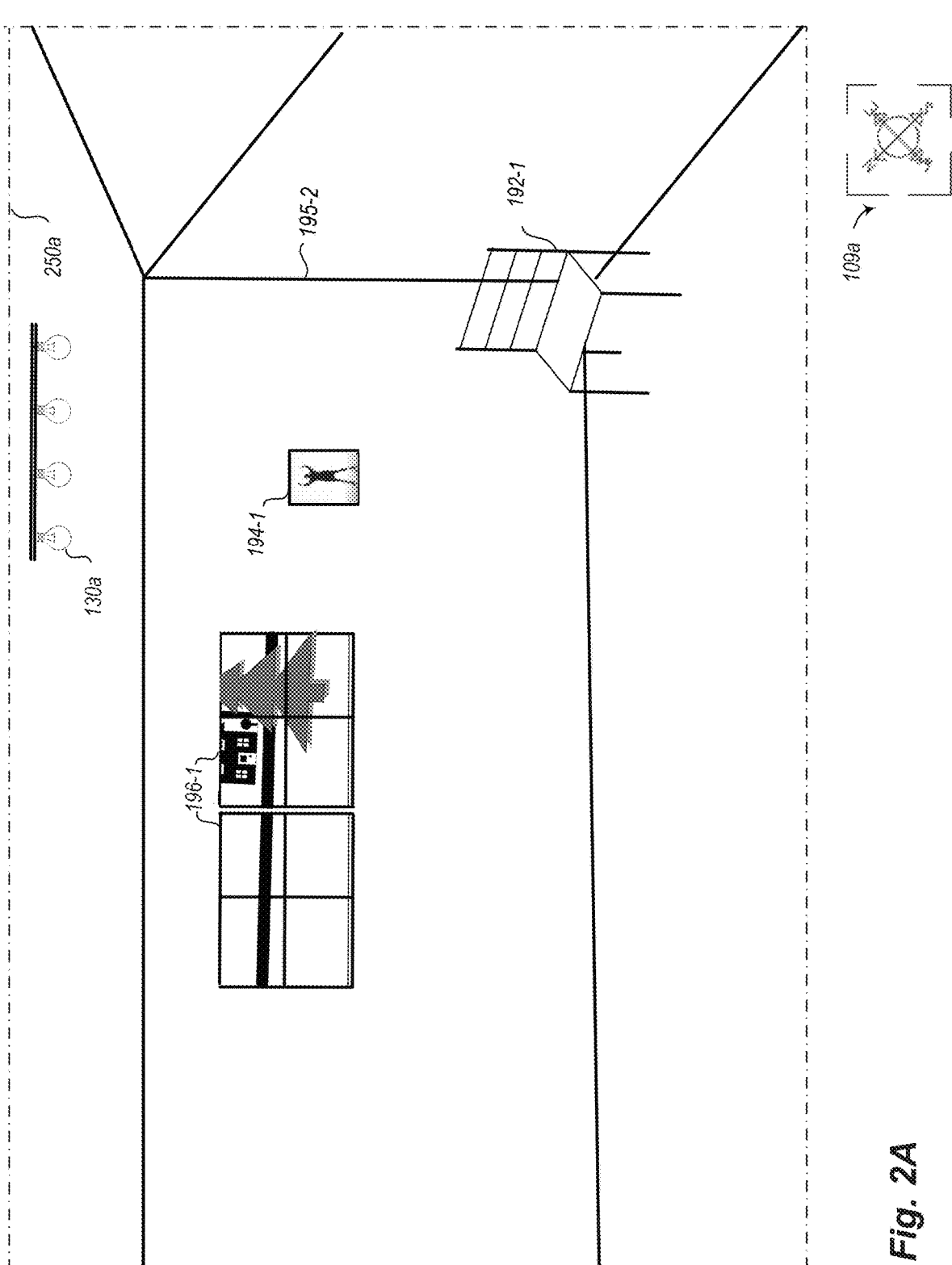
FIGS. 2A-2P illustrate examples of automatically generating videos with information about buildings from automated analysis of building images and other building information for subsequent use in one or more automated manners.
Figure 2B:
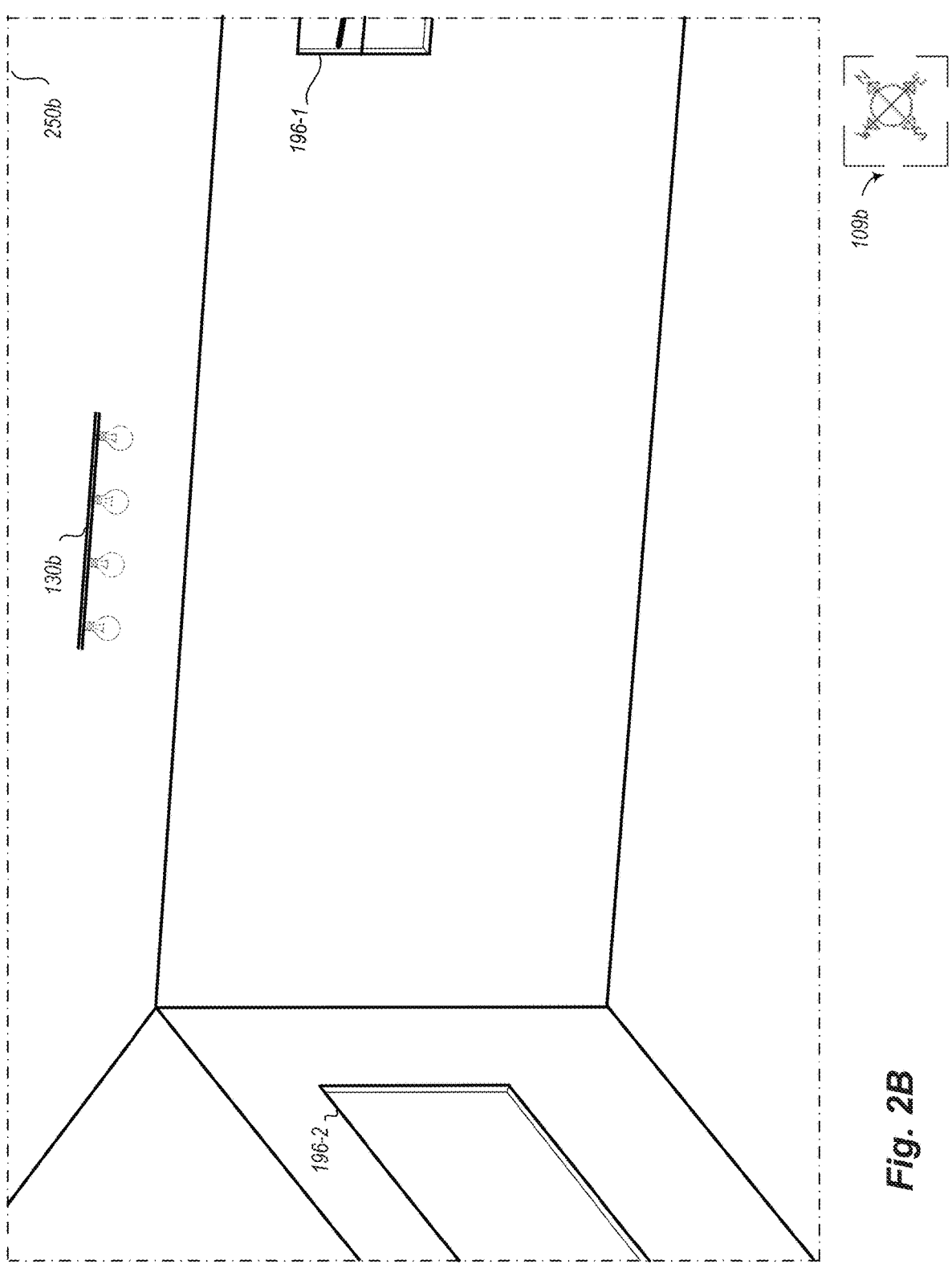
Figure 2C:
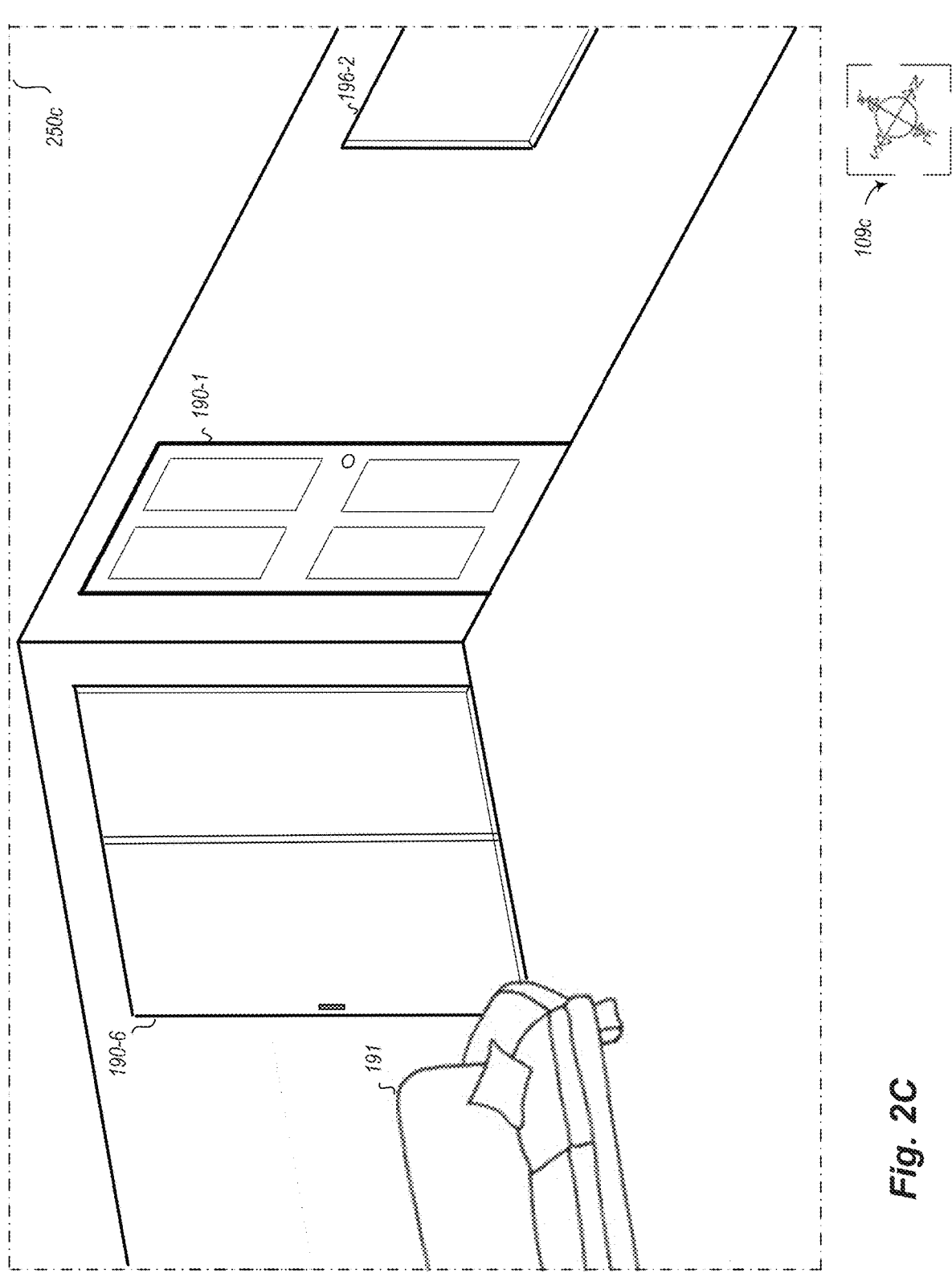
Figure 2D:
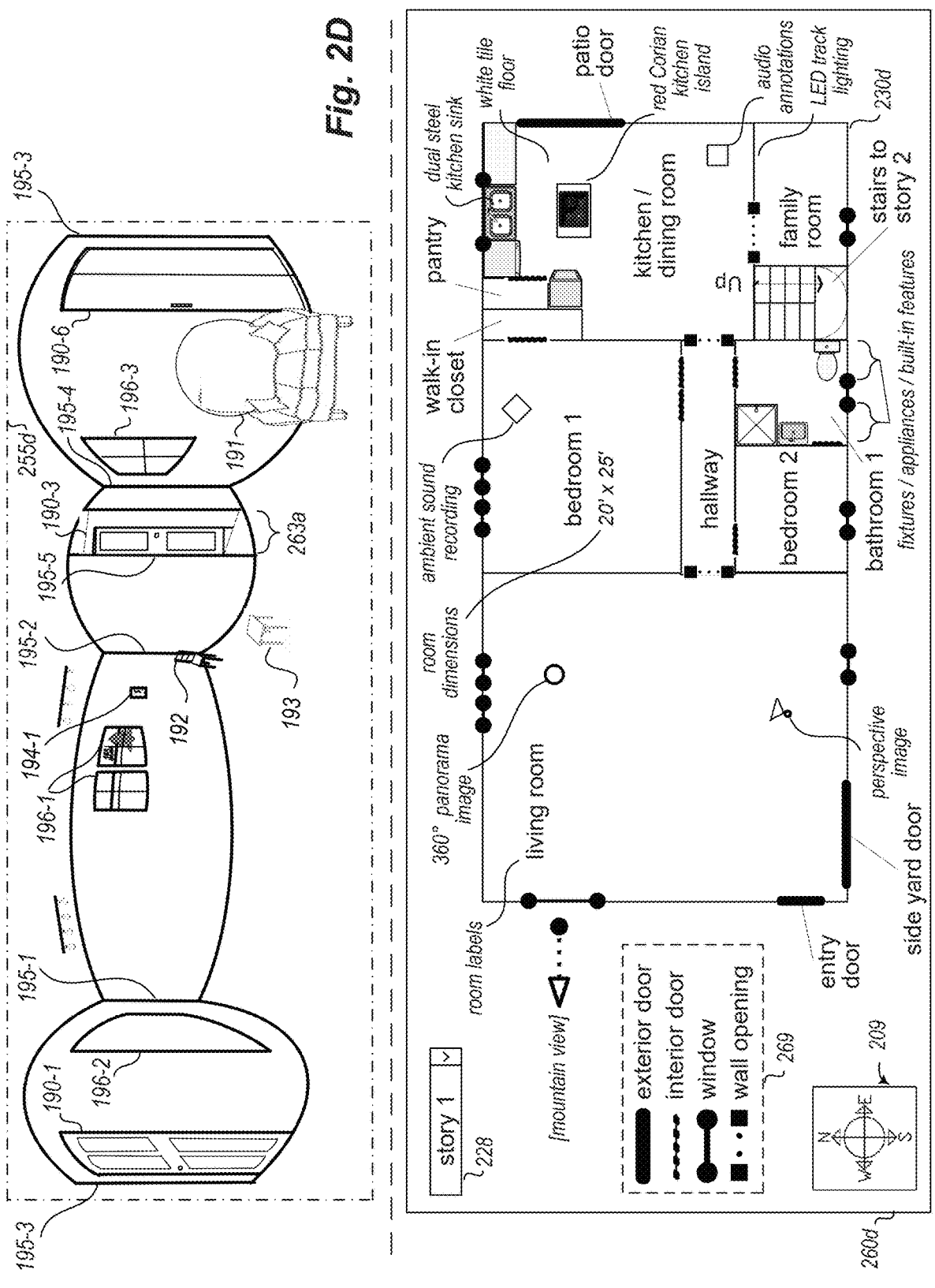
Figure 2E:
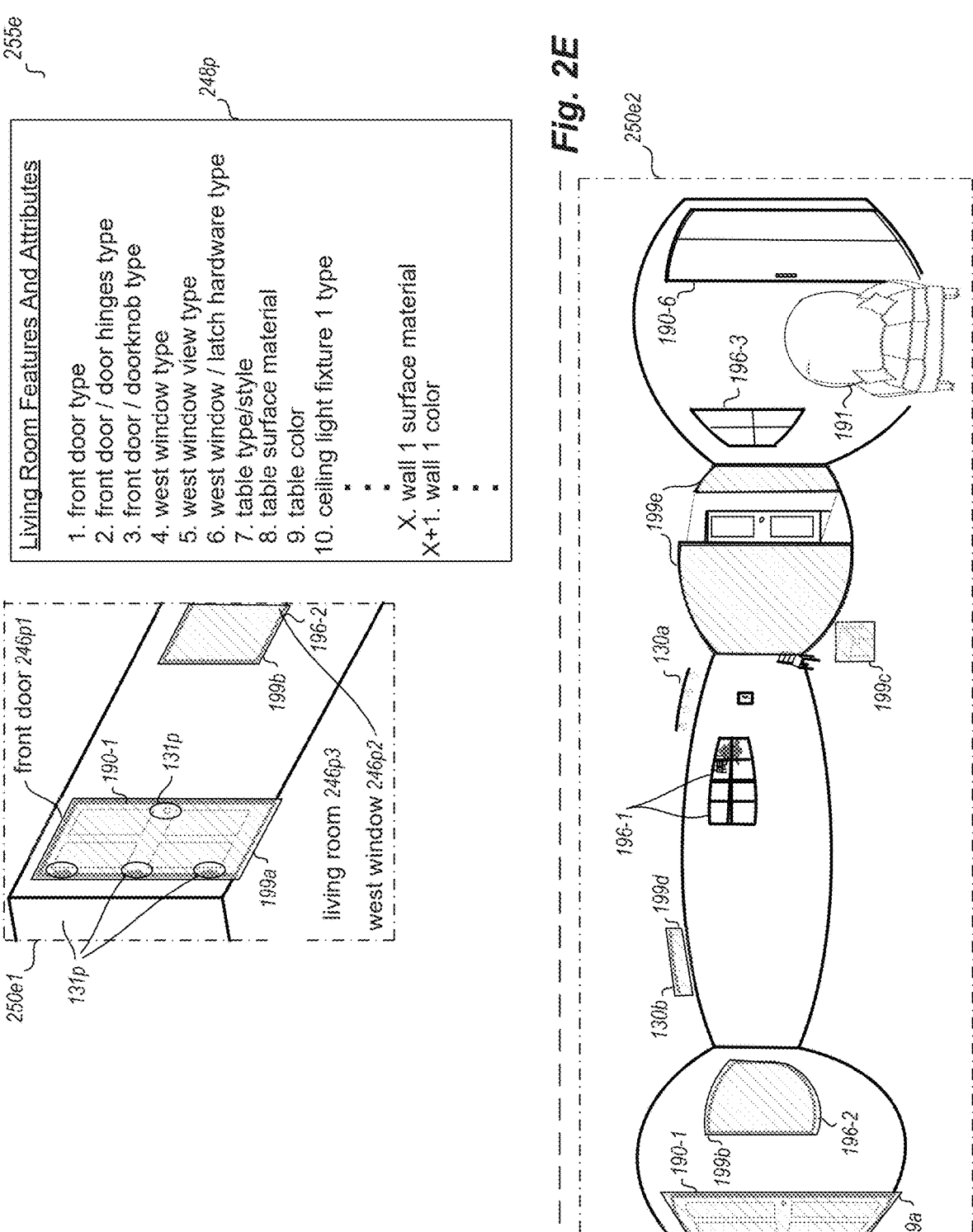
Figure 2G:
Figure 2H:
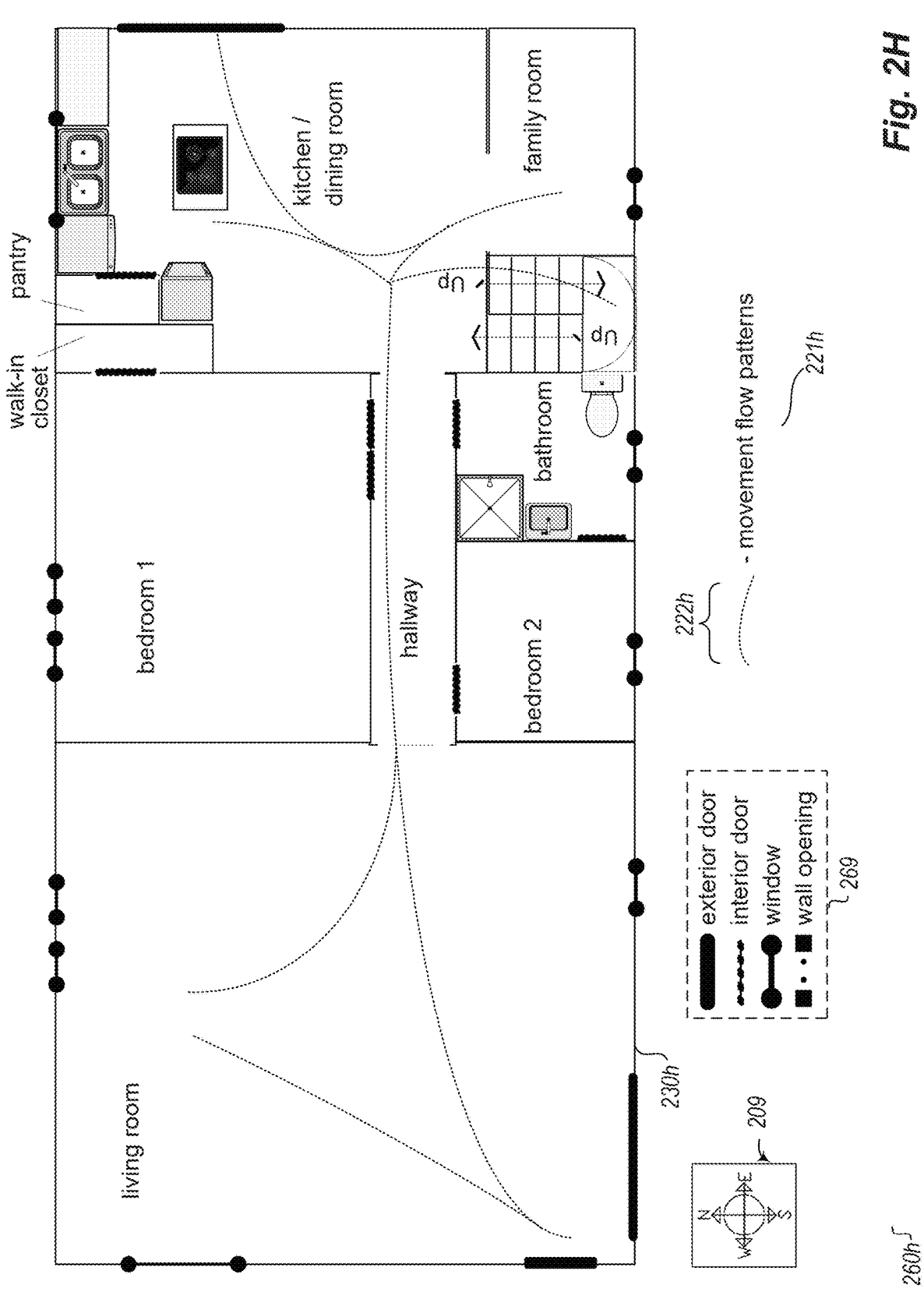
Figure 2I:
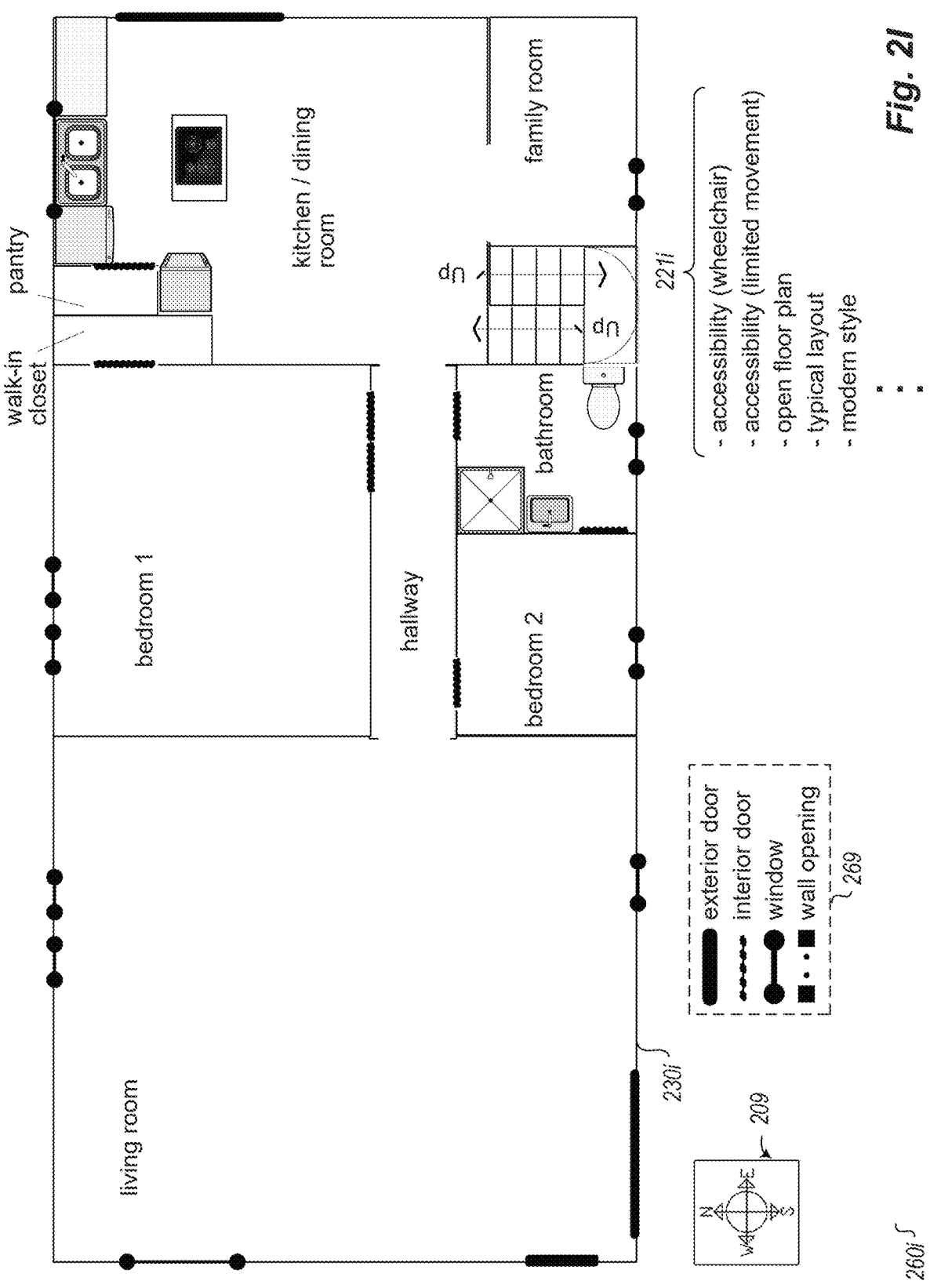
Figure 2J:
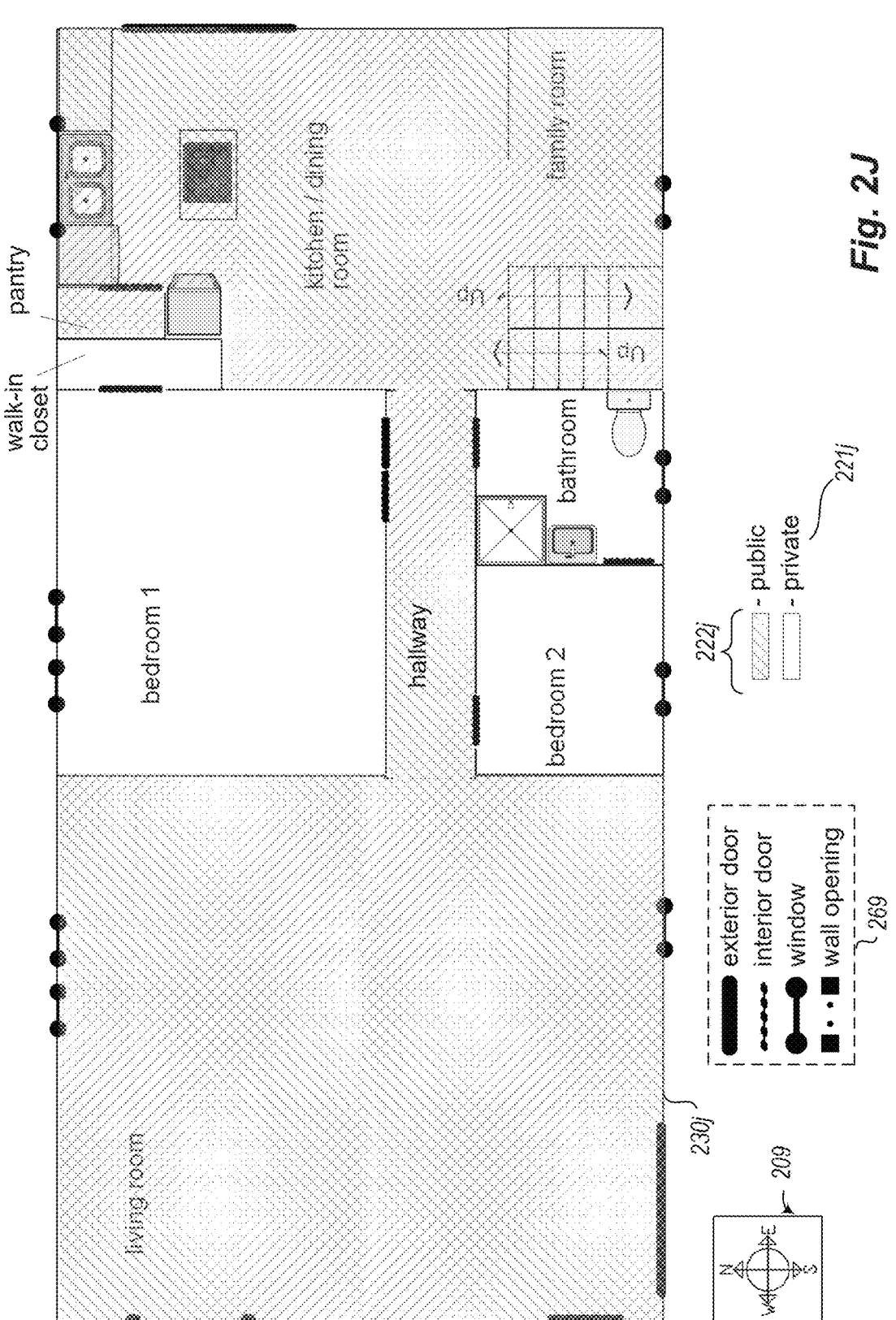
Figure 2K:
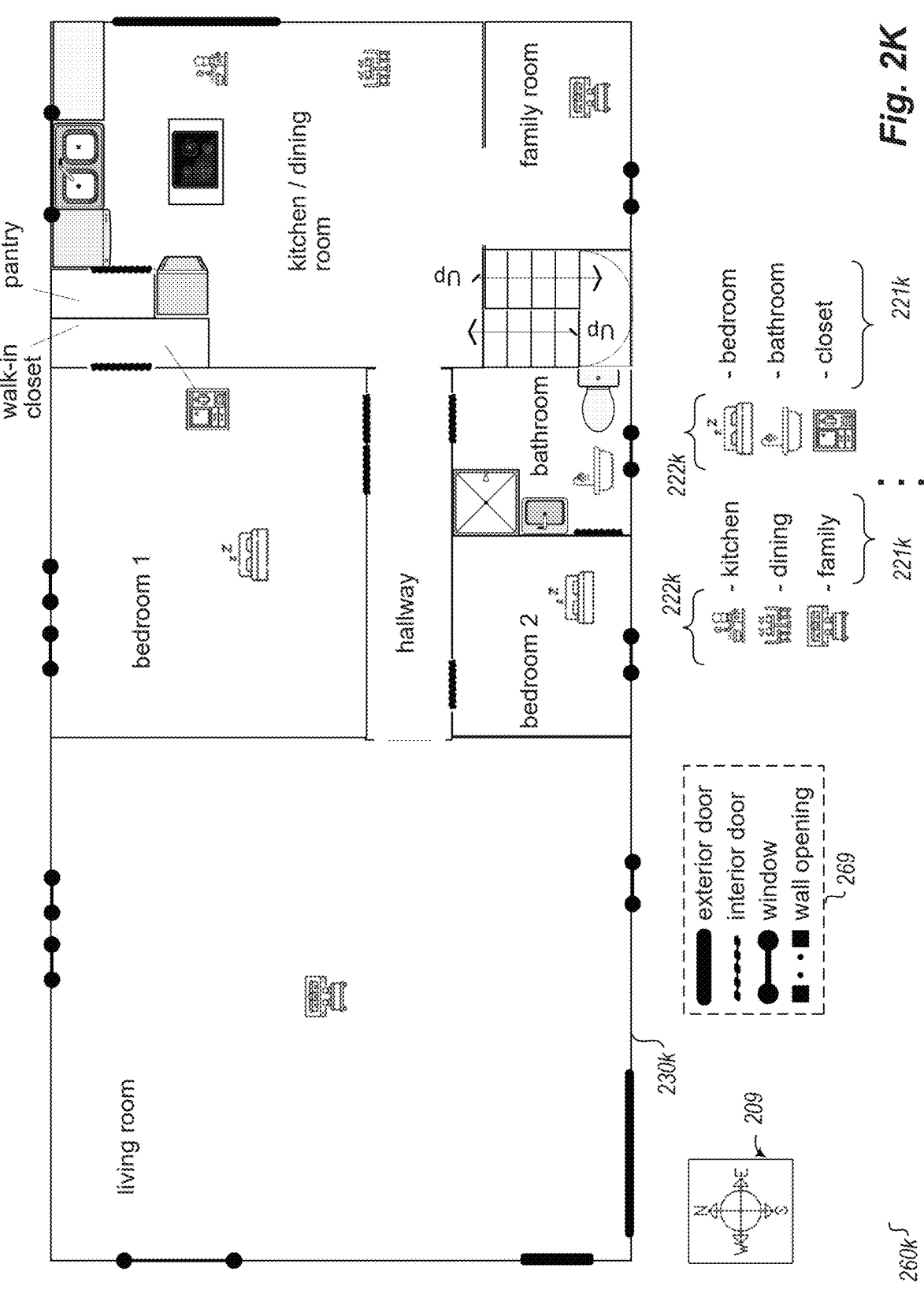
Figure 2L:
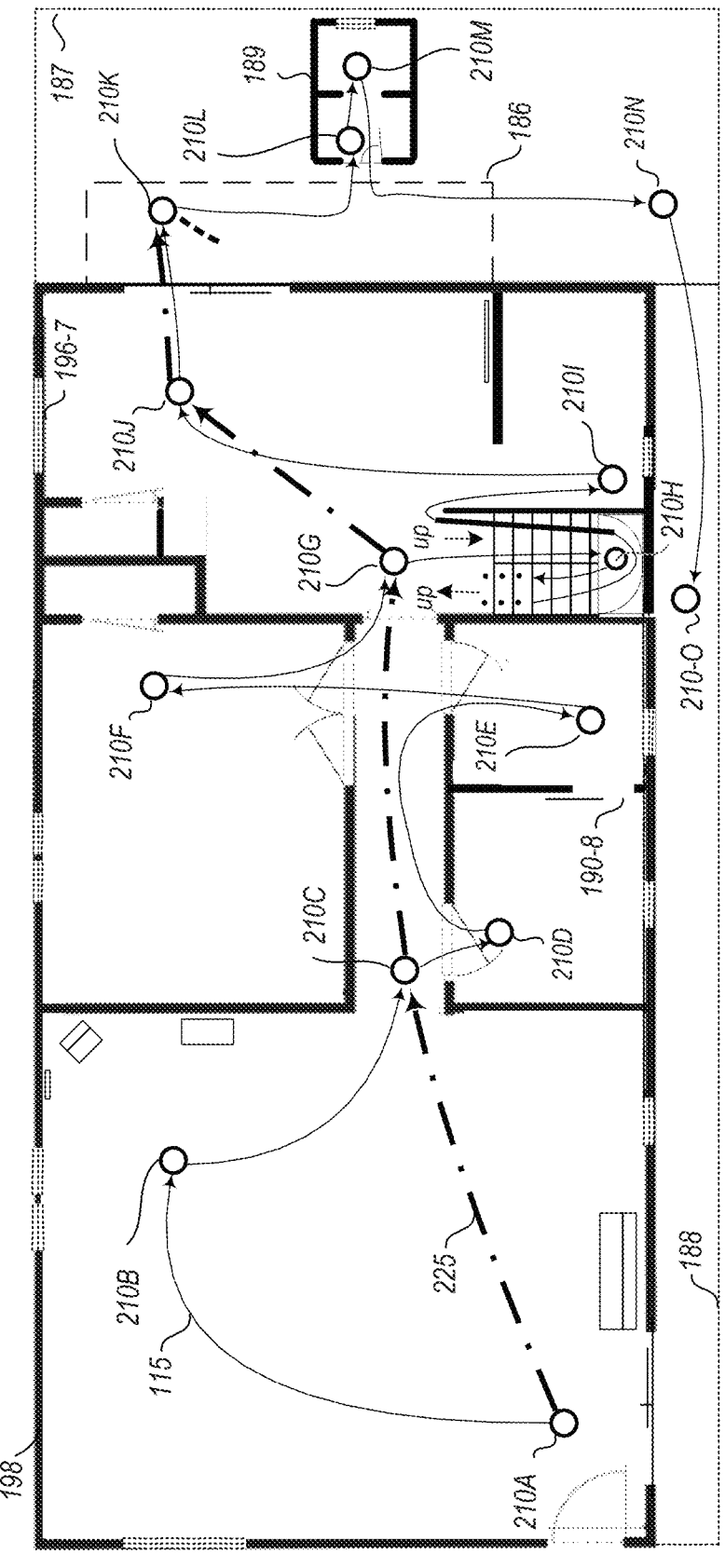
Figure 2P:
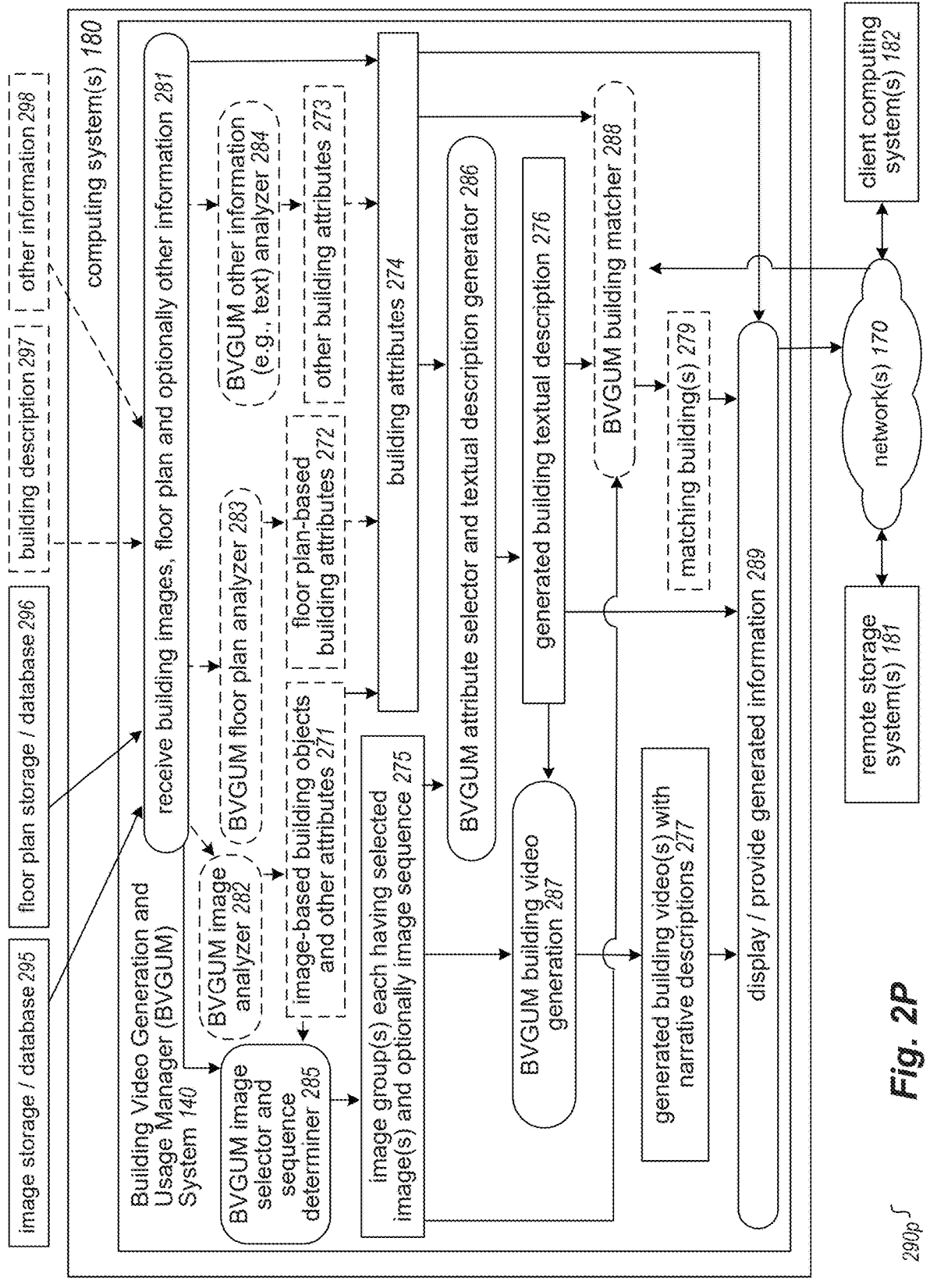

FIGS. 2A-2P illustrate examples of automatically generating videos with information about buildings from automated analysis of building images and other building information for subsequent use in one or more automated manners, such as for the building 198.

In particular, FIG. 2A illustrates an example image 250a, such as a non-panorama perspective image taken in a northeasterly direction from acquisition location 210B in the living room of house 198 of FIG. 1A (or a northeasterly facing subset view of a 360° panorama image taken from that acquisition location and formatted in a rectilinear manner)—the directional indicator 109a is further displayed in this example to illustrate the northeasterly direction in which the image is taken. In the illustrated example, the displayed image includes built-in elements (e.g., light fixture 130a, two windows 196-1, etc.), furniture (e.g., chair 192-1), and a picture 194-1 hanging on the north wall of the living room. No inter-room passages into or out of the living room (e.g., doorways or other wall openings) are visible in this image. However, multiple room borders are visible in the image 250a, including horizontal wall-ceiling and wall-floor borders between a visible portion of the north wall of the living room and the living room's ceiling and floor, horizontal wall-ceiling and wall-floor borders between a visible portion of the east wall of the living room and the living room's ceiling and floor, and the inter-wall vertical border 195-2 between the north and east walls.

FIG. 2B continues the example of FIG. 2A, and illustrates an additional perspective image 250b taken in a northwesterly direction from acquisition location 210B in the living room of house 198 of FIG. 1A—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

FIG. 2C continues the examples of FIGS. 2A-2B, and illustrates a third perspective image 250c taken in a southwesterly direction in the living room of house 198 of FIG. 1A, such as from acquisition location 210B—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates two inter-room passages for the living room, which in this example include a doorway 190-1 with a swinging door to enter and leave the living room (which FIG. 1A identifies as a door to the exterior of the house, such as the front yard), and a doorway 190-6 with a sliding door to move between the living room and side yard 188—as is shown in the information in FIG. 1A, an additional non-doorway wall opening 263a exists in the east wall of the living room to move between the living room and hallway, but is not visible in the images 250a-250c. It will be appreciated that a variety of other perspective images may be taken from acquisition location 210B and/or other acquisition locations and displayed in a similar manner.

FIG. 2D continues the examples of FIGS. 2A-2C, and illustrates a 360° panorama image 255d (e.g., taken from acquisition location 210B), which displays the entire living room in an equirectangular format-since the panorama image does not have a direction in the same manner as the perspective images of FIGS. 2A-2C, the directional indicator 109 is not displayed in FIG. 2D, although pose information for the panorama image may include one or more associated directions (e.g., a starting and/or ending direction for the panorama image, such as if acquired via rotation). A portion of the visual data of panorama image 255d corresponds to the first perspective image 250a (shown in approximately the center portion of the image 250d), while the left portion of the image 255d and the far-right portion of the image 255d contain visual data corresponding to those of the perspective images 250b and 250c-thus, for example, starting from image 255d, a series of perspective images may be rendered (e.g., for use in a video) that include some or all of images 250a-250c (and optionally a large quantity of intermediate images, such as to have, for example, 150 rendered perspective images to correspond to 5 seconds of panning and/or tilting within image 255d if a resulting video uses 30 frames per second). This example panorama image 255d includes windows 196-1, 196-2 and 196-3, furniture 191-193, doorways 190-1 and 190-6, and non-doorway wall opening 263a to the hallway room (with the opening showing part of a doorway 190-3 visible in the adjacent hallway). Image 255d further illustrates a variety of room borders in a manner similar to that of the perspective images, but with the horizontal borders being displayed in an increasingly curved manner the farther they are from a horizontal midline of the image—the visible borders include vertical inter-wall borders 195-1 through 195-4, vertical border 195-5 at the north/left side of the hallway opening, vertical borders at the south/right side of the hallway opening, and horizontal borders between the walls and the floor and between the walls and the ceiling.

FIG. 2D further illustrates information 260d that includes one example 230d of part of a 2D floor plan for the house 198 (e.g., corresponding to story 1 of the house), such as may be presented to an end-user in a GUI 260d, with the living room being the most westward room of the house (as reflected by directional indicator 209)—it will be appreciated that a 3D or 2.5D floor plan with rendered wall height information may be similarly generated and displayed in some embodiments, whether in addition to or instead of such a 2D floor plan. Various types of information are illustrated on the 2D floor plan 230d in this example. For example, such types of information may include one or more of the following: room labels added to some or all rooms (e.g., "living room" for the living room); room dimensions added for some or all rooms; visual indications of objects such as installed fixtures or appliances (e.g., kitchen appliances, bathroom items, etc.) or other built-in elements (e.g., a kitchen island) added for some or all rooms, optionally with associated labels and/or descriptive annotations (e.g., dual steel kitchen sink, kitchen island with red Corian surface, LED track lighting, white tile floor, etc.); visual indications added for some or all rooms of positions of additional types of associated and linked information (e.g., of other panorama images and/or perspective images that an end-user may select for further display; of audio or non-audio annotations that an end-user may select for further presentation, such as "the kitchen includes a Brand X refrigerator with features Y, a built-in stove/oven of Brand Z, etc."; of sound recordings that an end-user may select for further presentation, such as to hear the level of street noise from bedroom 1; etc.); visual indications added for some or all rooms of structural elements such as doors and windows; visual indications of visual appearance information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI such as 260d, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2D). In addition, in this example a user-selectable control 228 is added to indicate a current story that is displayed for the floor plan, and to allow the end-user to select a different story to be displayed—in some embodiments, a change in stories or other levels may also be made directly from the floor plan, such as via selection of a corresponding connecting passage in the illustrated floor plan (e.g., the stairs to story 2). It will be appreciated that a variety of other types of information may be added in some embodiments, that some of the illustrated types of information may not be provided in some embodiments, and that visual indications of and user selections of linked and associated information may be displayed and selected in other manners in other embodiments.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or VTFM, system that is generally directed to automated operations for generating a floor map or other floor plan of a building using video data acquired in and around the building); in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); and in U.S. Non-Provisional patent application Ser. No. 17/013,323, filed Sep. 4, 2020 and entitled "Automated Analysis Of Image Contents To Determine The Acquisition Location Of The Image" (which includes disclosure of an example MIGM system that is generally directed to automated operations for generating a floor map or other floor plan of a building using images acquired in and around the building, and an example ILMM system for determining the acquisition location of an image on a floor plan based at least in part on an analysis of the image's contents); each of which is incorporated herein by reference in its entirety.

FIGS. 2E and 2F continue the examples of FIGS. 2A-2D, with FIG. 2E illustrating information 255e that includes an image 250e1 of the southwest portion of the living room (in a manner similar to a portion of image 250c of FIG. 2C), and with additional information overlaid on the image to illustrate information determined about objects and other attributes in that portion of the room from automated analysis of visual data of the image, along with information about locations of those objects. In particular, in this example, the west window (element 196-2 of image 250c) has been identified as an object in the room, with the corresponding 'west window' label 246p2 having been determined for the object (whether automatically or based at least in part on information provided by one or more associated users), and an automatically determined location 199b of the object in the image being shown (which in this example is a bounding box for the object). The information 255e further illustrates a list 248p of objects and additional attributes of interest identified based at least in part on the visual data of image 250e1, which indicates that visual characteristics of the west window include its type (e.g., a picture window), type of latch hardware, information about a view through the window, and optionally various other attributes (e.g., size, orientation/direction it faces, etc.). The image 250e1 further indicates that the doorway 190-1 has been identified as an object in the room, with a 'front door' label 246p1 (whether determined automatically or based at least in part on information provided by one or more associated users) and automatically determined bounding box location 199a being shown. In addition, the information 248p indicates that further attributes include determined visual characteristics of the door such as a type of the door and information about door's doorknob and door hinges, which are further visually indicated 131p on the image 250p. FIG. 2F illustrates additional visual data that may be extracted from images 250e1 and/or 250e2 of FIG. 2E as part of determining objects and other attributes for the room, and in particular includes close-up example images 250f1, 250f2 and 250f3 corresponding to the front door for doorway 190-1 and its hardware 131p, such as for use in determining corresponding attributes for the front door—in some embodiments and situations, if image 250e1 is selected for use in a video for house 198 and the front door and its visual characteristics are determined to be of interest, visual data of image 250e1 (or of another image in the living room) may be selected for display that include such images 250f1, 250f2 and 250f3 (e.g., via zooming, panning, tilting, etc.) to highlight those objects and other attributes in the video while corresponding narration provides a description of those objects and other attributes. Other objects may similarly be identified, such as one or more ceiling light fixtures, furniture, walls and other surfaces, etc. (e.g., based at least in part on a list of defined types of objects that are expected or typical for rooms of type 'living room'), and optionally described via associated narration in a generated video, and with the selected visual data of corresponding image(s) showing such objects, optionally in a manner to highlight or otherwise emphasize them (e.g., by zooming in to prominently show the objects). In addition, a 'living room' label 246p3 for the room is also determined (whether automatically or based at least in part on information provided by one or more associated users) and shown. FIG. 2E further provides an alternative or additional image 250e2, which in this example is a panorama image with 360° of visual coverage of the living room (in a manner similar to image 255d of FIG. 2D)—such a panorama image may be used instead of or in addition to a perspective image such as image 250e1 for determining objects and other attributes and additional related information (e.g., locations, labels, annotations, etc.), as well as for assessing an overall layout of items in the room and/or expected traffic flow for the room, with the example panorama image 250e2 similarly showing the location bounding boxes 199a and 199b for the front door and west window objects, as well as additional location bounding boxes 199c for table 193, 199d for ceiling light 130b, and 199e for the east wall—it will be appreciated that a variety of other types of objects and/or other attributes may be determined in other embodiments, including for other walls and surfaces (e.g., the ceiling and floor) and other structural elements (e.g., windows 196-1 and 193, doorway 190-6, non-doorway wall opening 263a, etc.), other furniture (e.g., couch 191, chair 192, etc.), etc.

FIG. 2G continue the examples of FIGS. 2A-2F, and provide examples of additional data that may be determined about objects and other attributes for other rooms of the building based at least in part on analysis of one or more initial room-level images of those other rooms. In particular, FIG. 2G illustrates information 255g that includes an image 250g1, such as for bathroom 1. In a manner analogous to that of the images of FIG. 2E, image 250g1 includes indications 131v of objects in the bathroom that are identified and for which corresponding attribute data is determined (e.g., corresponding to visual characteristics of the objects), which in this example includes a tile floor, a sink countertop, a sink faucet and/or other sink hardware, a bathtub faucet and/or other bathtub hardware, a toilet, etc.—however, location information, labels and provided instructions are not illustrated in this example. In a similar manner, image 250g2 for the kitchen includes indications 131w of objects in the kitchen that are identified and for which corresponding attribute data is determined (e.g., corresponding to visual characteristics of the objects), which in this example includes a refrigerator, a stove on a kitchen island, a sink faucet and/or other sink hardware, a countertop and/or backsplash beside the sink, etc.—however, location information, labels and provided instructions are not illustrated in this example. It will be appreciated that various other types of objects and other attributes may be determined in these and other rooms, and further used to generate corresponding building description information, and that these types of data illustrated in FIGS. 2E-2G are non-exclusive examples provided for the purpose of illustration.

FIGS. 2H-2K continue the examples of FIGS. 2A-2G, and provide additional information related to analyzing floor plan information to determine additional attributes for the building. In particular, FIG. 2H illustrates information 260*h* that includes an example 2D floor plan 230*h* of the building, which includes determined information 222*h* about expected movement flow pattern attributes through the building, as indicated using corresponding labels 221*h*, and with such information 222*h* optionally displayed on the floor plan (e.g., overlaid on the floor plan). In a similar manner, FIG. 2I provides additional information 260*i* related to analyzing floor plan 230*i* to determine information about various types of subjective attributes for the building (e.g., wheelchair accessibility, accessibility for people with limited walking mobility, open floor plan, a typical layout, a modern style, etc.), as indicated using corresponding labels 221*i*, but without corresponding locations or other indications being shown on the floor plan in this example, although such corresponding locations may be determined and indicated in other embodiments and situations. FIG. 2J similarly provides additional information 260*j* related to analyzing floor plan 230*j* to determine information about areas of the building that correspond to public and private space attributes 222*j*, as indicated using corresponding labels 221*j*, and with such information 222*j* optionally displayed on the floor plan (e.g., overlaid on the floor plan). In addition, FIG. 2K provides additional information 260*k* related to analyzing floor plan 230*k* to determine information about room type and/or functionality attributes 222*k* of the building (e.g., bedroom, bathroom, kitchen, dining, family room, closet, etc.), as indicated using corresponding labels 221*k*, and with such information 222*k* optionally displayed on the floor plan (e.g., overlaid on the floor plan). It will be appreciated that particular attributes about rooms and/or the building as a whole may be determined from analysis of such a floor plan in various manners, and that the types of information illustrated in FIGS. 2H-2K are non-exclusive examples provided for the purpose of illustration, such that similar and/or other types of information may be determined in other manners in other embodiments.

FIG. 2L continues the examples of FIGS. 2A-2K, and illustrates information 260*l* that corresponds to building 198. In particular, while path 115 illustrates a sequence in which images are acquired at locations 210A through 210-O for the building, the BVGUM system may determine a different sequence 225 of images whose visual data will be included in a corresponding order in a video to be generated, optionally for a subset of the acquired images that are selected. In this example, a sequence of panorama images acquired at acquisition locations 210A, 210C, 210G, 210J, 210K, etc. are selected, such as to correspond to beginning at the entrance to the house but quickly proceeding to illustrate information about the kitchen (e.g., due to kitchens being determined to generally be of high interest, to be of high interest to a particular recipient for whom the video is being generated, to correspond to configuration settings or other instructions regarding generation of the video, based on an order in which one or more users acquire non-panorama images and/or other information in rooms of the building, etc.). While not illustrated in FIG. 2L, images acquired at additional acquisition locations may be selected for use in the same or different videos for house 198, such as to have different videos or later segments within the same video to show other types of information (e.g., one or more specific rooms, such as bathrooms and/or bedrooms; one or more groups of rooms, such as corresponding to different stories or to public or private spaces; etc.). In at least some embodiments, a group of one or more images selected for use in a video and/or a determined sequence of multiple such selected images may be determined using one or more trained machine learning models (e.g., one or more neural network models).

FIGS. 2M and 2N continue the examples of FIGS. 2A-2L, and illustrate information about selecting visual data of an image for inclusion in the visual portion of a video being generated. In particular, FIG. 2M illustrates image 255*m* in a manner similar to that of image 255*d*, but with various objects indicated to be noted in the video, including to select visual data of image 255*m* to include in the video that shows those objects. In this example, selected objects include the vaulted ceiling as indicated 299*f*, track lighting 130*b* as indicated 299*d*, front door 190-1 as indicated 299*a*, west picture window 196-2 as indicated 299*b*, south window 196-3 as indicated 299*g*, sliding door 190-6 as indicated 299*h*, east wall as indicated 299*e*, table 193 as indicated 299*c*, etc.—the arrow flow between those selected objects may, for example, indicate an order in which corresponding subsets of visual data of image 255*m* are successively shown in the video to highlight those objects (e.g., in the form of a DAG, or Directed Acyclic Graph). FIG. 2M further illustrates example textual information 265*m* that may be included as narration within the video about this room and the selected objects (e.g., audible narration in an audio portion of the video; textual narration, such as for use with closed captioning; etc.), such as to describe attributes corresponding to objects such as the vaulted ceiling, track lighting 130*b*, front door 190-1 (e.g., door type, door hardware, a description of where the door leads, etc.), west picture window 196-2 (e.g., window type, hardware, view, direction, etc.), south window 196-3, sliding door 190-6, east wall (e.g., color, type of surface material, etc.), table 193 (e.g., material, size, etc.), etc. FIG. 2N further illustrates a sequence 242 of visual data subsets (e.g., video frames) rendered from panorama image 255*m* that may be included in the video to be generated, such as to correspond to panning and/or tilting within the panorama image. In at least some embodiments, descriptions of objects and other attributes are generated using one or more trained language models.

As one non-exclusive example, the selected visual data subsets from a selected image may be from a single point of view and one or more viewing perspectives (e.g., the acquisition location of that image and in a determined direction with a determined level of zero or more zooming, such as with each frame of the video corresponding to a perspective image subset of the selected image corresponding to that viewing perspective), whether continuous or discontinuous. If multiple images are selected to be used in a video (e.g., in a determined sequence), the selected visual data from those multiple images may correspond to multiple points of view and one or more viewing perspectives for each such point of view (e.g., to select visual data from each image from its acquisition location and in one or more viewing perspective, such as with each frame of the video corresponding to a perspective image portion of a selected image, and with one or more perspective image portions used for each selected image), whether continuous or discontinuous. With respect to identifying objects to describe in the video, the BVGUM system may in at least some embodiments and situations create a graph (e.g., a GCN, or Graph Convolutional Network, that is used to learn a DAG having edges with directions and order) that includes information about one or more of the following: which objects and/or other attributes to describe, and optionally for how long; a sequence of the objects and/or other attributes to describe within an image; a determined sequence of multiple images to use; cinematographic transitions or other types of transitions between visual data of adjacent images in the determined sequence; etc.

With respect to generating the textual descriptions used for the video narration, the BVGUM system may in at least some embodiments and situations use one or more trained language models to conduct visual storytelling, image captioning, and text-image retrieval, with the text generated from the images or sequence of images being combined and/or summarized in at least some embodiments and situations (e.g., to manipulate the style, grammar, and/or modality, such as to deliver a rich and impactful recipient experience; to produce multiple generated texts; etc.), whether using multiple discrete models or be a single end-to-end model. In at least some embodiments and situations, the one or more trained language models may include one or more trained Vision and Language (VLM) models, such as large models that are trained to generate a description/caption for an input image using a large corpus of training tuples (e.g., Image, Caption tuples)—some benefits of VLM models include that there is no need to explicitly prompt the model regarding the entities you would like it to describe, which often results in descriptions that are more abstract and compelling. In at least some embodiments and situations, the one or more trained language models may further include at least one of pretrained language models, knowledge-enhanced language models, parsing and/or labeling and/or classification models (e.g., dependency parsers, constituency parsers, sentiments classifiers, semantic role labelers, etc.), algorithms used to control linguistic quality (e.g., tokenizers, lemmatizers, regular expression matching, etc.), multimodal vision and language models capable of autoregressive or masked decoding, etc.—such labeling and/or classification models may include, for example, semantic role labelers, sentiment classifiers, and semantic classifiers to identify semantic concepts related to the entire sequence of words and tokens or any of its components (e.g., identification of semantic roles of entities in the sequence such as patient or agent as well as classifying the overall sentiment or semantics of a sequence such as how positive or negative it is about the subject, how fluent the sequence is, or how well it encourages the reader to take some action). The one or more trained language models may, for example, perform an iterative generation (decoding) of words, subwords, and tokens conditioned on prompts, prefixes, control codes, and representations of contextual information such as features derived from visual/sensor information, knowledge bases and/or graphs-parsing models may further perform operations including analyzing the internal structure of a sequence of words and tokens to identify its components in accordance with one or more grammars (e.g., dependency, context free grammar, head-driven phrase structure grammar, etc.), such as to identify modifications that can be made to a sequence of words, subwords and/or tokens to further develop a desired linguistic quality. The one or more trained language models may, for example, be organized into a directed acyclic graph providing a structure in which inputs, outputs, data sources, and models interact, with the structure being aligned with the data sources, such as with respect to one or more of the following: spatial, where the context of text generation is related to a specific point in a building such as the location or room that a panorama was taken in so that the generated text will be aligned with this location; temporal, where the context of text generation is a temporal sequence of frames in a video sequence or slideshow so that the generated text will be aligned with this sequence of frames; etc. Inputs to the one or more trained language models may include, for example, one or more of the following: structured and/or unstructured data sources (e.g., publicly or privately available, such as property records, tax records, MLS records, Wikipedia articles, homeowners association and/or covenant documents, news articles, nearby or visible landmarks, etc.) that provide information regarding the building and/or associated physical space under analysis and its surroundings and/or that provide general and commonsense information about buildings and a real estate market (e.g., housing and associated elements, overall housing market information, information related to fair housing practices, bias associated with terms and phrases that may aid in language generation, etc.); information about objects and/or other attributes (e.g., fixture types and locations, surface material, surface color, surface texture, room size, degree of natural light present in a room, walking score, expected commute times, etc.); captured and/or synthesized visual and/or sensor information along with any derivatives, such as structured and unstructured sequences (including singletons) of images, panoramas, videos, depth maps, point clouds, and segmentation maps; etc. The one or more trained language models may further be designed and/or configured to, for example, implement one or more of the following: modality, to reflect the way in which language can express relationships to reality and truth (e.g., something that is prohibited, such as "you shouldn't go to school"; advice provided through subject auxiliary inversion, such as "shouldn't you go to school?"; etc.); fluency, to reflect a measure of the natural quality of language with respect to a set of grammar rules (e.g., "big smelly brown dog" instead of "smelly brown big dog"); style, to reflect patterns of word and grammatical construction selection (e.g., short descriptions that uses interesting and engaging language; informal style, such as used for texting; formal style, such as used for an English paper or conference submission; voice, to reflect the way in which subjects and objects are organized relative to a verb (e.g., active and passive voice); etc.

As one non-exclusive example of generating text 265m of FIG. 2M, the BVGUM system may use a pipeline of language models and algorithms, including one or more language models from a class called "knowledge enhanced natural language generation models" (KENLG)—KENLG models are provided with a source of knowledge, and a prompt regarding the entities within the source of knowledge to which the model should attend, with the KENLG model ingesting these inputs and generating a description of those entities accordingly. There are several sources of knowledge to which KENLG models can attend including knowledge bases (KB), knowledge graphs (KG), and unstructured text like a Wikipedia page, with a knowledge base being a collection of subject-predicate-object tuples that express a predicate relationship between entities (e.g., Living Room, HasA, Fireplace; Fireplace, MadeOf, Stucco; Kitchen Counter, HasProperty, Spacious; etc.), a knowledge graph being the translation of a knowledge base into a graph structure where the nodes of the graph represent entities and the edges of the graph represent predicate relationships, and with a prompt being a sequence of entities for which a description is to be generated. For example, using the example tuples above, if the model was given the prompt (Living Room), an expected output of the model would be "the living room has a lovely stucco fireplace"—in this way, information about a house or other building that is generated by any number of one or more upstream feature extraction models and data collection processes can be aggregated into a knowledge base and then into a knowledge graph over which a KENLG model can attend. Benefits of representing a building in terms of a knowledge graph in this manner include that it represents the building in a natural way, as the composition of interrelated spaces, points of view, and objects with attributes that (when combined with a KENLG model) can be used to generate a large variety of descriptions depending on the prompt provided. For a multi-sentence description like 265*m*, its generation may include (in part) determining a sequence of prompts to provide to the model for generation of its constituent clauses according to these entities, and then using the KENLG model to generate the text for those prompts. For example, a sequence of prompts can be identified as the entities that are visible within a sequence of points of view (e.g., 299*a-h* of FIG. 2M), and/or information about rooms and building layout as discussed further with respect to text 265*o* of FIG. 2-O. Following the generation of a sequence of clauses corresponding to a sequence of prompts (e.g., as derived from points of view 299*a-h*), one or more types of algorithms may be applied to perform linguistic modifications for the purpose of composing a compelling narrative, such as to include the construction of prepositional phrases to smoothly connect constituent clauses (e.g., "As you enter the living room . . . "), to make changes to each clause's style and modality (e.g., to express ability, such as "you will notice . . . "; to express obligation, such as "you have to see . . . "; etc.).

With respect to selecting objects and attributes to discuss in a video being generated, such as with visual data of images that show those objects or other attributes, the objects and attributes may be selected in various manners in various embodiments. As one non-exclusive example, a group of objects and other attributes may be predefined, such as based on input from users (e.g., people interested in buying or otherwise acquiring a building or access to some or all of a building, such as renting or leasing; based on tracked activities of users in requesting or viewing information about buildings, such as in viewing images and/or other information about buildings; based on tracked activities of users in purchasing or changing objects in a building, such as during remodels; etc.)—information about such a group of objects and other attributes may be stored in various manners (e.g., in a database), and may be used for training one or more models (e.g., one or more machine learning models used to select images and/or portions of images, one or more language models used to generate textual descriptions, etc.). In other embodiments and situations, a group of objects and other attributes may be determined in other manners, whether instead of or in addition to such predefinition, such as to be learned (e.g., based at least in part on analyzing professional photos or other images of buildings to identify objects that are the focus of or otherwise included in those images).

FIG. 2N further illustrates information about an example of synchronizing generated narration for a video (e.g., in an audio portion of the video) with corresponding visual data in a visual portion of the video, such as for the narration to occur concurrently with the corresponding visual data or to otherwise accompany the visual data (e.g., to introduce the visual data before it is shown). As previously noted, a sequence 242 of visual data subsets (e.g., video frames) that may be included in the video to be generated is shown, such as to display image 250*b* while accompanying narration occurs about the vaulted ceiling (e.g., around time 4.2 seconds into the narration), to display images 250*b* and/or 250*n*1 while accompanying narration occurs about the built-in track lighting (e.g., around time 8.3 seconds, such as to zoom in on the lighting in one or more images 250*n*1), to pan counterclockwise toward the front door in one or more intermediate images 250*n*2 (e.g., between approximately times 10 and 15 seconds), to display image 250*n*3 while accompanying narration occurs about the front door (e.g., around time 15.6 seconds, such as to zoom in on some or all of the door, not shown), to display image 250*n*4 while accompanying narration occurs about the west picture window (e.g., around time 20.4 seconds, such as to zoom in on some or all of the door, etc.).

With respect to synchronizing generated narration for a video, the synchronization may be performed in various manners in various embodiments. As one non-exclusive example, as visual data is shown in a video, the narration may be presented for one or more objects and other attributes shown in the visual data. In other embodiments and situations, additional activities may be performed to generate a smooth-flowing narrative over time, such as to optimize over a combination of visual continuity and smoothness of changes in narrative topics (e.g., based at least in part by learning from a set of narrated home tour videos).

FIG. 2O (referred to herein as "2-O" for clarity purposes) further illustrates information about an example of including visual data in the video corresponding to a transition between visual data of two selected images (in this example, image 255*m* acquired at acquisition location 210A, and an additional image acquired at acquisition location 210C, not shown). In the example of FIG. 2-O, the added visual data for the transition may include zooming from visual data shown in frame 250*o*1 to end in visual data shown in frame 250*o*2, such as using one or more intermediate frames (not shown) to correspond to the zooming illustrated shown with arrows 227 (with the arrows included for the benefit of the reader, but not shown in the generated video in at least some embodiments and situations), and then further transitioning (not shown) to the additional image acquired at acquisition location 210C, such as using one or more intermediate frames (not shown) to blend visual data of frame 250*o*2 to a frame including only visual data from the additional image acquired at acquisition location 210C. FIG. 2-O further illustrates an example of additional narration 265*o* (e.g., to be included in an audio portion of the video) that is synchronized with the visual data of the transition(s) in the video, such as is automatically generated to describe the transition between the images' acquisition locations. In other embodiments, narration 265*o* may be included in the video without any additional visual data corresponding to the transitions (e.g., to display frame 250*o*1 immediately followed by frame 250*o*2 at the same size), or visual data of the transition(s) may be shown in the visual portion of the video without any accompanying narration.

With respect to selecting an order for a sequence of images to include in a video, the order may be determined in various manners in various embodiments. As one non-exclusive example, some or all such images that are acquired in a building may be selected for the sequence in an order corresponding to an order in which the images were acquired, such as some or all images along the path 115 illustrated in FIG. 1A (e.g., as may be determined based at least in part on timestamps, overlapping visual data, IMU data, etc.). As another non-exclusive example, a different order 225 may be determined, such as in a manner discussed with respect to FIG. 2L. In situations in which different images are acquired at substantially different times (e.g., during multiple image acquisition sessions), images may be selected for some or all rooms on a room-by-room basis (e.g., after the images are localized within the rooms, such as may be reflected on a floor plan or other building model), whether instead of or in addition to the order in which the images were acquired and/or using a different order as noted above—the order of rooms may, for example, be determined in an order in which images were acquired in the rooms and/or in a different manner (e.g., as discussed with respect to FIG. 2L). When multiple images are selected within a room, the images may in other embodiments be selected in an order corresponding to, for example, one or more of the following: an order of priority of types of features or other information shown in the images; to minimize visual jumps (and improve visual transitions) between images within a room, etc.

FIG. 2P continues the examples of FIGS. 2A through 2-O, and illustrates information 290*p* showing example data flow interactions for at least some automated operations of the BVGUM system. In particular, an embodiment of the BVGUM system 140 is illustrated executing on one or more computing systems 180, and in this example embodiment receives information about a building to be analyzed that includes stored images from storage or database 295, a floor plan from storage or database 296, and optionally other building description information 297 (e.g., a listing) and/or other information 298 (e.g., other building information, such as labels, annotations, etc.; other configuration settings or instructions to control generation of the video, such as a length, type of information to include, etc. information about an intended recipient of a video to be generated, such as for use in personalizing the generated video to the recipient; etc.). The input information is received in step 281, with received image information optionally being forwarded to a BVGUM image analyzer component 282 for analysis (e.g., to identify objects and optionally other attributes, such as local attributes specific to a particular image and/or room), with received floor plan information optionally being forwarded to a BVGUM floor plan analyzer component 283 for analysis (e.g., to determine other building attributes, such as global attributes corresponding to some or all of the building as a whole), and with other received building information optionally being forwarded to a BVGUM other information analyzer component 284 for analysis (e.g., to determine other building attributes, such as from a textual description of the building), and with the output of the components 282 and/or 283 and/or 284 forming some or all of the determined building attributes 274 for the building—in other embodiments, information about some or all such objects and/or other attributes may instead be received (e.g., as part of other information 298) and included directly in building attribute information 274, and as discussed in greater detail elsewhere herein, operation of such components 282 and/or 283 and/or 284 may include or use one or trained machine learning models.

In addition, the received images are forwarded to a BVGUM image selector and optionally sequence determiner component 285 for analysis (e.g., to determine one or more image groups each having one or more selected images to use in a corresponding video to be generated, optionally with a determined image sequence if multiple images are selected for an image group), with output of the component 285 being one or more such image groups 275—as discussed in greater detail elsewhere herein, operation of such a component 285 may include or use one or trained machine learning models. The image groups 275 and determined building attributes 274 are then provided to a BVGUM attribute selector and textual description generator component 286, with output of the component 286 being generated building textual description information 276—as discussed in greater detail elsewhere herein, operation of such a component 286 may include or use one or trained language models as part of generating textual description information. In at least some embodiments, the component 286 may, for each image group, select some or all objects visible in the selected image(s) of that image group (e.g., using information from BVGUM component 282 and/or received in other information 298) to use as attributes of the building, and optionally further select other building attributes (e.g., attributes corresponding to visual characteristics of some or all of the selected objects, such as using information from BVGUM component 282 and/or received in other information 298; attributes corresponding to information about multiple rooms, optionally for a building as a whole or for a story or other subset of the building including with respect to a room layout for the building or building subset, and such as using information from BVGUM component 283 and/or received in other information 298; other attributes obtained from analysis of textual descriptions of the building or other building information, such as using information from BVGUM component 284 and/or received in other information 298; etc.). For the selected attributes for an image group, the BVGUM component 286 may then generate a textual description of each such attribute, and then combine the attribute descriptions to form an overall textual description of the building for use with that image group.

The image group(s) 275 and generated building textual description information 276 are then provided to a BVGUM building video generation component 287, with output of the component 287 being a generated building video having accompanying narrative descriptions 277 for each image group. In at least some embodiments, the component 287 may, for an image group, select visual data of the image(s) of that group to include in the video (e.g., to include according to the accompanying determined sequence, if any), such as to display visual data of objects in the selected attributes whose textual descriptions are part of the information 276 for that image group and optionally to otherwise display (e.g., highlight) visual data corresponding to other such selected attributes—as discussed in greater detail elsewhere herein, the visual data selected for a selected panorama or perspective image may be used in one or more frames of the video being generated, including to optionally use techniques such as panning, tilting, zooming, etc. and having corresponding series of groups of visual data used in successive frames, as well as to in some cases show a single group of visual data from an image (e.g., some or all of a selected perspective image, a subset of a selected panorama image, etc.) in multiple successive video frames (e.g., to show the same scene for one or more seconds). The component 287 may further select and use textual description information from the information 276 for that image group to generate narration to accompany the selected visual data of the video in a synchronized manner, such as audible narration for an audio portion of the video (e.g., using automated text-to-speech generation, obtaining and using manually supplied recording of the information for the narration, etc.), and/or textual narration to be shown visually (e.g., in a manner analogous to closed captioning). In addition, the component 287 may, for an image group having multiple selected images, add additional information corresponding to transitions between the visual data of different images, such as additional visual data using one or more types of cinematographic transitions and/or additional narration to describe the transition.

In some embodiments, the BVGUM system may further include a BVGUM building matcher component 288, such as to receive the determined building attributes 274 and/or the generated building description information 276 and/or information about the selected images of the image groups 275, and to use that information to identify that the current building and/or one or more generated videos for the building match one or more specified criteria (e.g., at a later time after the generation of the information 274-276 and optionally 277, such as upon receipt of corresponding criteria from one or more client computing systems 182 over one or more networks 170)—if so, the component 288 produces matching building information 279 that may include information about the building, such as one or more of the generated building videos 277 and optionally some or all of the building information 274 and/or 276. After one or more of these types of information 277, 274 and/or 276 are generated, the BVGUM system may further perform step 289 to display or otherwise provide some or all of the generated and/or determined information, such as to transmit such information over the networks 170 to one or more client computing systems 182 for display (e.g., to present a video 277, such as by displaying the visual portion of the video and optionally playing a synchronized audio portion of the video), to one or more remote storage systems 181 for storage, or otherwise to one or more other recipients for further use. Additional details are included elsewhere herein regarding operations of the various BVGUM system components, and of the corresponding types of information that is analyzed and generated.

Various details have been provided with respect to FIGS. 2A-2P, but it will be appreciated that the provided details are non-exclusive examples included for illustrative purposes, and other embodiments may be performed in other manners without some or all such details.

Figure 3:
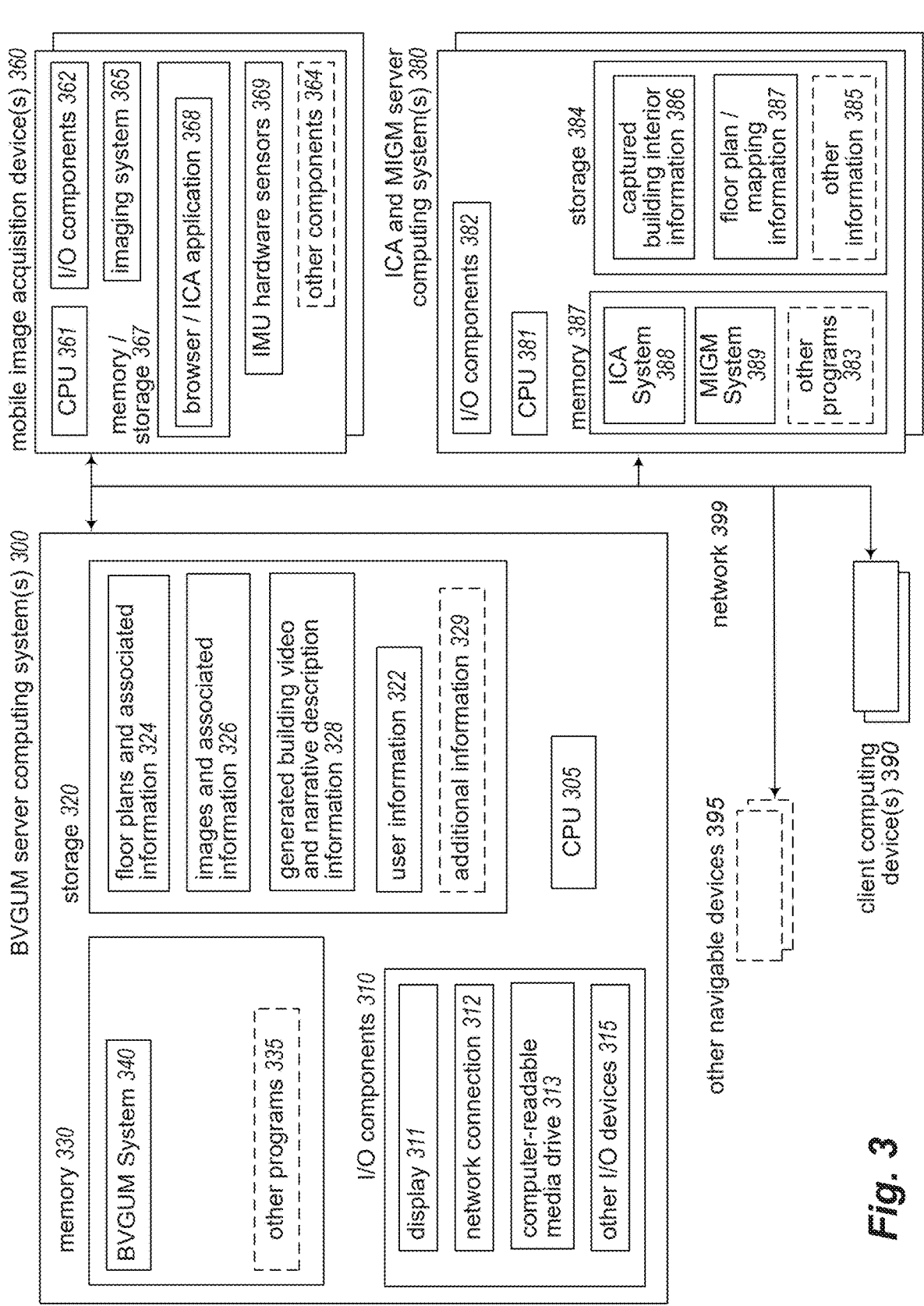
FIG. 3 is a block diagram illustrating computing systems suitable for executing an embodiment of a system that performs at least some of the techniques described in the present disclosure.

FIG. 3 is a block diagram illustrating an embodiment of one or more server computing systems 300 executing an implementation of a BVGUM system 340 (e.g., in a manner analogous to server computing system(s) 180 and BVGUM system 140 of FIG. 1A), and one or more server computing systems 380 executing an implementation of an ICA system 388 and an MIGM system 389—the server computing system(s) and BVGUM and/or ICA and/or MIGM systems may be implemented using a plurality of hardware components that form electronic circuits suitable for and configured to, when in combined operation, perform at least some of the techniques described herein. One or more computing systems and devices may also optionally be executing a building information access system (such as server computing system(s) 300) and/or optional other programs 335 and 383 (such as server computing system(s) 300 and 380, respectively, in this example), although such as building information access system is not illustrated in this example. In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 387, storage 384 and I/O components 382 are illustrated in this example for the sake of brevity.

The server computing system(s) 300 and executing BVGUM system 340, server computing system(s) 380 and executing ICA and MIGM systems 388-389, and optionally executing building information access system (not shown), may communicate with each other and with other computing systems and devices in this illustrated embodiment, such as via one or more networks 399 (e.g., the Internet, one or more cellular telephone networks, etc.), including to interact with user client computing devices 390 (e.g., used to view building information such as generated building videos, building descriptions, floor plans, images and/or other related information, such as by interacting with or executing a copy of the building information access system), and/or mobile image acquisition devices 360 (e.g., used to acquire images and/or other information for buildings or other environments to be modeled, such as in a manner analogous to computing device 185 of FIG. 1A), and/or optionally other navigable devices 395 that receive and use floor plans and optionally other generated information for navigation purposes (e.g., for use by semi-autonomous or fully autonomous vehicles or other devices). In other embodiments, some of the described functionality may be combined in less computing systems, such as to combine the BVGUM system 340 and a building information access system in a single system or device, to combine the BVGUM system 340 and the image acquisition functionality of device(s) 360 in a single system or device, to combine the ICA and MIGM systems 388-389 and the image acquisition functionality of device(s) 360 in a single system or device, to combine the BVGUM system 340 and one or both of the ICA and MIGM systems 388-389 in a single system or device, to combine the BVGUM system 340 and the ICA and MIGM systems 388-389 and the image acquisition functionality of device(s) 360 in a single system or device, etc.

In the illustrated embodiment, an embodiment of the BVGUM system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the BVGUM system may include one or more components, not shown, to each perform portions of the functionality of the BVGUM system, such as in a manner discussed elsewhere herein, and the memory may further optionally execute one or more other programs 335—as one specific example, a copy of the ICA and/or MIGM systems may execute as one of the other programs 335 in at least some embodiments, such as instead of or in addition to the ICA and/or MIGM systems 388-389 on the server computing system(s) 380, and/or a copy of a building information access system may execute as one of the other programs 335. The BVGUM system 340 may further, during its operation, store and/or retrieve various types of data on storage 320 (e.g., in one or more databases or other data structures), such as various types of user information 322, floor plans and other associated information 324 (e.g., generated and saved 2.5D and/or 3D models, building and room dimensions for use with associated floor plans, additional images and/or annotation information, etc.), images and associated information 326, generated building videos with narrative descriptions 328 and other generated building information (e.g., determined building attributes, generated attribute descriptions, generated building descriptions, etc.), and/or various types of optional additional information 329 (e.g., various analytical information related to presentation or other use of one or more building interiors or other environments).

In addition, embodiments of the ICA and MIGM systems 388-389 execute in memory 387 of the server computing system(s) 380 in the illustrated embodiment in order to perform techniques related to generating panorama images and floor plans for buildings, such as by using the processor(s) 381 to execute software instructions of the systems 388 and/or 389 in a manner that configures the processor(s) 381 and computing system(s) 380 to perform automated operations that implement those techniques. The illustrated embodiment of the ICA and MIGM systems may include one or more components, not shown, to each perform portions of the functionality of the ICA and MIGM systems, respectively, and the memory may further optionally execute one or more other programs 383. The ICA and/or MIGM systems 388-389 may further, during operation, store and/or retrieve various types of data on storage 384 (e.g., in one or more databases or other data structures), such as video and/or image information 386 acquired for one or more buildings (e.g., 360° video or images for analysis to generate floor plans, to provide to users of client computing devices 390 for display, etc.), floor plans and/or other generated mapping information 387, and optionally other information 385 (e.g., additional images and/or annotation information for use with associated floor plans, building and room dimensions for use with associated floor plans, various analytical information related to presentation or other use of one or more building interiors or other environments, etc.)— while not illustrated in FIG. 3, the ICA and/or MIGM systems may further store and use additional types of information, such as about other types of building information to be analyzed and/or provided to the BVGUM system, about ICA and/or MIGM system operator users and/or end-users, etc.

Some or all of the user client computing devices 390 (e.g., mobile devices), mobile image acquisition devices 360, optional other navigable devices 395 and other computing systems (not shown) may similarly include some or all of the same types of components illustrated for server computing system 300. As one non-limiting example, the mobile image acquisition devices 360 are each shown to include one or more hardware CPU(s) 361, I/O components 362, memory and/or storage 367, one or more imaging systems 365, IMU hardware sensors 369 (e.g., for use in acquisition of video and/or images, associated device movement data, etc.), and optionally other components. In the illustrated example, one or both of a browser and one or more client applications 368 (e.g., an application specific to the BVGUM system and/or to ICA system and/or to the MIGM system) are executing in memory 367, such as to participate in communication with the BVGUM system 340, ICA system 388, MIGM system 389 and/or other computing systems. While particular components are not illustrated for the other navigable devices 395 or other computing devices/systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BVGUM system 340 may in some embodiments be distributed in various components, some of the described functionality of the BVGUM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BVGUM system 340 executing on server computing systems 300, by a Building Information Access system executing on server computing systems 300 or other computing systems/devices, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIGS. 4A-4B illustrate an example embodiment of a flow diagram for a Building Video Generation and Usage Manager (BVGUM) System routine 400. The routine may be performed by, for example, execution of the BVGUM system 140 of FIG. 1A, the BVGUM system 340 of FIG. 3, and/or an BVGUM system as described with respect to FIGS. 2D-2P and elsewhere herein, such as to perform automated operations related to automatically generating building videos with accompanying automatically generated narration to describe selected building objects and optionally other attributes shown in visual data of the videos selected from building images, and to subsequently using the generated building videos in one or more automated manners. In the example embodiment of FIGS. 4A-4B, the indicated buildings may be houses or other buildings, and generation of building videos includes generating description information for selected building attributes and using them for narration of a video including visual data of images acquired for the building, but in other embodiments, other types of data structures and analyses may be used for other types of structures or for non-structure locations, and the generated building information may be used in other manners than those discussed with respect to routine 400, as discussed elsewhere herein.

The illustrated embodiment of the routine begins at block 405, where information or instructions are received. The routine continues to block 410 to determine whether the instructions or other information received in block 405 indicate to generate one or more videos for an indicated building based at least in part on images of the indicated building, and if so the routine continues to perform at least blocks 415-475 to do so, and otherwise continues to block 478. In block 415, the routine optionally obtains configuration settings and/or information specific to a recipient to use in the video generation (e.g., information received in block 405, stored information, etc.), such as corresponding to video length, types of information to include in the video (e.g., room types, object types, other attribute types, etc.). In block 420, the routine then determines whether existing building information (e.g., images, a floor plan with at least room shapes positioned relative to each other, a textual building description, lists or other indications of building objects and/or other building attributes, labels and/or descriptive annotations associated with images and/or rooms and/or objects, etc.) is available for the building, and if so proceeds to block 422 to retrieve such existing building information. If it is instead determined in block 420 that the building information is not available, the routine instead proceeds to perform blocks 425-440 to generate such images and a floor plan and associated information, including to optionally obtain available information about the building in block 425 (e.g., building dimensions and/or other information about the size and/or structure of the building; external images of the building, such as from overhead and/or from a nearby street; etc., such as from public sources), to initiate execution of an ICA system routine in block 430 to acquire images and optionally additional data for the building (with one example of such a routine illustrated in FIG. 5), and to initiate execution of a MIGM system routine in block 440 to use the acquired images from block 430 to generate a floor plan and optionally additional mapping-related building data (with one example of such a routine illustrated in FIGS. 6A-6B).

In blocks 442-475, the routine performs several activities as part of using the images and optionally other building information from blocks 430 and 440 or from block 422 to generate one or more videos for the building. In particular, in block 442, the routine includes, if such information is not already available from blocks 422 and/or 430, analyzing each image using one or more trained machine learning models (e.g., one or more trained classification neural networks) to identify structural elements and other objects, and to determine further attributes associated with such objects (e.g., color, surface material, style, locations, orientations, descriptive labels, etc.). In block 444, the routine then optionally analyzes other building information (e.g., a floor plan, textual descriptions, etc.) to determine further attributes for the building using one or more trained machine learning models (e.g., one or more trained classification neural networks), such as based at least in part on layout information (e.g., inter-connectedness and other adjacency information for groups of two or more rooms)—the determined attributes may, for example, include attributes that each classify the building floor plan according to one or more subjective factors (e.g., accessibility friendly, an open floor plan, an atypical floor plan, etc.), a type of room for some or all rooms in the building, types of inter-room connections and other adjacencies between some or all rooms (e.g., connected by a door or other opening, adjacent with an intervening wall but not otherwise connected, not adjacent, etc.), one or more objective attributes, etc.

In block 446, the routine then analyzes the images and optionally other building information to determine one or more image groups that each includes one or more selected videos and optionally a determined sequence of multiple selected images, such as using one or more trained machine learning models (e.g., one or more neural networks) and in accordance with any configuration settings and/or recipient information from block 415. After block 446, the routine continues to block 450 to select objects and optionally other attributes that correspond to the selected images to describe in the one or more videos being generated (e.g., to determine, for each of some or all of the selected images, objects visible in the image and optionally positions of the objects within the image, and to optionally select further building attributes determined in block 444 and/or obtained in block 422), such as in accordance with any configuration settings and/or recipient information from block 415, and optionally using one or more trained machine learning models (e.g., one or more neural networks), whether the same or different trained machine learning models used in block 446—in some embodiments and situations, the object and optionally other attribute selection may instead be performed in block 446 as part of the image selection. The routine in block 450 further includes generating textual descriptions for each of the selected objects and other attributes, such as in accordance with any configuration settings and/or recipient information from block 415, and optionally using one or more trained language models (e.g., one or more trained transformer-based machine learning models), and optionally combine the generated descriptions to generate an overall building textual description.

After block 450, the routine continues to block 455 to, for each image group, generate a visual portion of a video using the one or more selected images of the image group that includes visual data from each of the images (e.g., in an order corresponding to a determined sequence of images), in accordance with any configuration settings and/or recipient information from block 415, and such as with one or more frames for each image corresponding to one or more selected groups of visual data from that image (e.g., multiple groups of visual data from an image corresponding to one or more of panning, tilting, zooming, etc. within that image, and to include visual data corresponding to one or more selected objects or other selected attributes), and optionally further visual data to correspond to one or more transitions between visual data of different images—in other embodiments, visual data included in a generated video may include selected groups of visual data from a selected image in different locations within a video, such as with intervening visual data groups from one or more other selected images. In block 475, the routine then, for each image group, generates synchronized narration for the video of that image group (e.g., for an audible portion of the video) based at least in part on the generated textual descriptions for the selected objects or other selected attributes for the image group from block 450 and optionally to include further descriptive information (e.g., to correspond to one or more transitions between visual data of different images, to provide an introduction and/or summary, etc.), in accordance with any configuration settings and/or recipient information from block 415, and such as using one or more trained language models—in other embodiments, the narration for a video is instead generated before generation of the visual portion of the video, with the visual data included in the visual portion instead being selected to synchronize with the narration. After block 475, the routine continues to block 489 to store the generated video(s) and optionally some or all of the other generated building information from blocks 420-487, and optionally provides one or more generated videos and/or at least some of the other generated building information to one or more corresponding recipients (e.g., to a user or other entity recipient from which the information and/or instructions are received in block 405 or that is otherwise designated in such information and/or instructions).

If it is instead determined in block 410 that the instructions or other information received in block 405 are not to generate one or more building videos, the routine continues instead to block 476 to determine if the instructions or other information received in block 405 are to modify an existing building video. If so, the routine proceeds to block 478 to obtain modification instructions or other criteria related to how to perform the modification and information to indicate the video to be modified (e.g., an indication of a particular building), such as to be received in block 405, to retrieve the video, and to generate a new video by modifying the retrieved video in accordance with the modification instructions or other criteria. Such modification criteria may include, for example, one or more of the following: one or more indicated time lengths (e.g., a minimum time, a maximum time, a start and end time for a subset of the video, etc.), with the retrieved video being modified accordingly (e.g., to remove segments, such as based on associated priority; to remove a beginning and/or ending portion; etc.); indications of one or more rooms (e.g., based on one or more room types), with the retrieved video being modified to exclude information about such one or more rooms or to include only information about such one or more rooms; indications of one or more objects (e.g., based on one or more object types), with the retrieved video being modified to exclude information about such one or more objects or to include only information about such one or more objects; indications of one or more room groupings (e.g., a story, a multi-room apartment or condominium or town house of a larger building, a unit of a multiplex, etc.), with the retrieved video being modified to exclude information about such one or more room groupings or to include only information about such one or more room groupings; etc. The modification criteria may further be based in some embodiments and situations on a particular recipient, such as to personalize the modified video to that recipient, with corresponding criteria specific to the recipient being received or retrieved (e.g., from stored preference information for the recipient). After block 478, the routine continues to block 489 to store the generated modified video, and optionally provide the generated modified video to one or more corresponding recipients (e.g., to a user or other entity recipient from which the information and/or instructions are received in block 405 or that is otherwise designated in such information and/or instructions).

If it is instead determined in block 476 that the instructions or other information received in block 405 are not to modify an existing building video, the routine continues instead to block 482 to determine if the instructions or other information received in block 405 are to identify one or more generated building videos that satisfy indicated criteria (e.g., based on information about rooms and/or objects and/or other attributes described in the video, such as based at least in part on the narration accompanying the video) and/or to identify one or more target buildings having such generated building videos, and if not continues to block 490. Otherwise, the routine continues to block 484 to retrieve candidate building videos (e.g., building videos previously generated in blocks 442-478 for one or more indicated buildings) and to compare information about such videos to the specified criteria. In block 486, the routine then, for each candidate video and/or associated building, determines a degree of match of information for the candidate video/building to the criteria-if there are multiple indicated criteria, the determining of the degree of match may include combining the information for the multiple criteria in one or more manners (e.g., an average, a cumulative total, etc.). The routine further optionally rank orders the multiple candidate videos/buildings based on their degrees of match, and selects one or more best matches to use as identified target videos or buildings (e.g., all matches above a defined threshold, the single best match, etc., and optionally based on instructions or other information received in block 405), with those selected one or more best matches having the highest degrees of match to the specified criteria. In block 488, the routine then presents or otherwise provides information for the selected candidate video(s)/building(s) (e.g., provides one or more selected candidate videos for presentation, such as in sequence based on degree of match; provides information about one or more selected candidate buildings for presentation; etc.), such as via a building information access routine, with one example of such a routine discussed with respect to FIG. 7.

If it is instead determined in block 482 that the information or instructions received in block 405 are not to identify one or more other target generated videos and/or associated buildings using one or more specified criteria, the routine continues instead to block 490 to perform one or more other indicated operations as appropriate. Such other operations may include, for example, receiving and responding to requests for previously generated videos and/or other building information (e.g., requests for such information for display or other presentation on one or more client devices, requests for such information to provide it to one or more other devices for use in automated navigation, etc.), training one or more neural networks or other machine learning models (e.g., classification neural networks) to determine objects and associated attributes from analysis of visual data of images and/or other acquired environmental data, training one or more neural networks (e.g., classification neural networks) or other machine learning models to determine building attributes from analysis of building floor plans (e.g., according to one or more subjective factors, such as accessibility friendly, an open floor plan, an atypical floor plan, a non-standard floor plan, etc.), training one or more machine learning models (e.g., language models) to generate attribute description information for determined objects and optionally other indicated building attributes and/or to generate building description information for a building having multiple such objects and optionally other indicated building attributes, obtaining and storing information about users of the routine (e.g., search and/or selection preferences of a current user), etc.

After blocks 488 or 489 or 490, the routine continues to block 495 to determine whether to continue, such as until an explicit indication to terminate is received, or instead only if an explicit indication to continue is received. If it is determined to continue, the routine returns to block 405 to wait for additional instructions or information, and otherwise continues to block 499 and ends.

While not illustrated with respect to the automated operations shown in the example embodiment of FIGS. 4A-4B, in some embodiments human users may further assist in facilitating some of the operations of the BVGUM system, such as for operator users and/or end users of the BVGUM system to provide input of one or more types that is further used in subsequent automated operations. As non-exclusive examples, such human users may provide input of one or more types as follows: to provide input to assist with the identification of objects and/or other attributes from analysis images, floor plans and/or other building information, such as to provide input in blocks 442 and/or 444 that is used as part of the automated operations for the block(s); to provide input in block 446 that is used as part of subsequent automated operations, such as to assist in selecting images for an image group and/or determining a sequence of selected images; to provide input in block 450 that is used as part of subsequent automated operations, such as to assist in selecting objects and/or other attributes to describe in a video, and/or to assist in generating textual descriptions of objects and/or other attributes, and/or to assist in generating a textual description for a building based at least in part on generated textual descriptions of objects and/or other attributes; to provide input in block 455 that is used as part of subsequent automated operations, such as to assist in selecting one or more groups of visual data from a selected image, and/or to assist in specifying transitions to use between images; to provide input in block 475 that is used as part of subsequent automated operations, such as to assist in determining a narration for a video based on generated textual descriptions, and/or to produce an audible version of the narration; etc. Additional details are included elsewhere herein regarding embodiments in which human user(s) provide input used in additional automated operations of the BVGUM system.

FIG. 5 illustrates an example flow diagram of an embodiment of an ICA (Image Capture & Analysis) system routine 500. The routine may be performed by, for example, the ICA system 160 of FIG. 1, the ICA system 388 of FIG. 3, and/or an ICA system as described with respect to FIGS. 2A-2P and elsewhere herein, such as to acquire 360° panorama images and/or other images at acquisition locations within buildings or other structures, such as for use in subsequent generation of related floor plans and/or other mapping information. While portions of the example routine 500 are discussed with respect to acquiring particular types of images at particular acquisition locations, it will be appreciated that this or a similar routine may be used to acquire video (with video frame images) and/or other data (e.g., audio), whether instead of or in addition to such panorama images or other perspective images. In addition, while the illustrated embodiment acquires and uses information from the interior of a target building, it will be appreciated that other embodiments may perform similar techniques for other types of data, including for non-building structures and/or for information external to one or more target buildings of interest (e.g., on a property on which a target building is located, such as to show yards, decks, patios, accessory structures, etc.). Furthermore, some or all of the routine may be executed on a mobile device used by a user to acquire image information, and/or by a system remote from such a mobile device. In at least some embodiments, the routine 500 may be invoked from block 430 of routine 400 of FIGS. 4A-4B, with corresponding information from routine 500 provided to routine 400 as part of implementation of that block 430, and with processing control returned to routine 400 after blocks 577 and/or 599 in such situations—in other embodiments, the routine 400 may proceed with additional operations in an asynchronous manner without waiting for such processing control to be returned (e.g., to proceed with other processing activities while waiting for the corresponding information from the routine 500 to be provided to routine 400).

The illustrated embodiment of the routine begins at block 505, where instructions or information are received. At block 510, the routine determines whether the received instructions or information indicate to acquire visual data and/or other data representing a building interior (optionally in accordance with supplied information about one or more additional acquisition locations and/or other guidance acquisition instructions), and if not continues to block 590. Otherwise, the routine proceeds to block 512 to receive an indication to begin the image acquisition process at a first acquisition location (e.g., from a user of a mobile image acquisition device that will perform the acquisition process). After block 512, the routine proceeds to block 515 in order to perform acquisition location image acquisition activities for acquiring a 360° panorama image for the acquisition location in the interior of the target building of interest, such as via one or more fisheye lenses and/or non-fisheye rectilinear lenses on the mobile device and to provide horizontal coverage of at least 360° around a vertical axis, although in other embodiments other types of images and/or other types of data may be acquired. As one non-exclusive example, the mobile image acquisition device may be a rotating (scanning) panorama camera equipped with a fisheye lens (e.g., with 180° of horizontal coverage) and/or other lens (e.g., with less than 180° of horizontal coverage, such as a regular lens or wide-angle lens or ultrawide lens). The routine may also optionally obtain annotation and/or other information from the user regarding the acquisition location and/or the surrounding environment, such as for later use in presentation of information regarding that acquisition location and/or surrounding environment.

After block 515 is completed, the routine continues to block 520 to determine if there are more acquisition locations at which to acquire images, such as based on corresponding information provided by the user of the mobile device and/or received in block 505—in some embodiments, the ICA routine will acquire only a single image and then proceed to block 577 to provide that image and corresponding information (e.g., to return the image and corresponding information to the BVGUM system and/or MIGM system for further use before receiving additional instructions or information to acquire one or more next images at one or more next acquisition locations). If there are more acquisition locations at which to acquire additional images at the current time, the routine continues to block 522 to optionally initiate the capture of linking information (e.g., acceleration data) during movement of the mobile device along a travel path away from the current acquisition location and towards a next acquisition location within the building interior. The captured linking information may include additional sensor data (e.g., from one or more IMU, or inertial measurement units, on the mobile device or otherwise carried by the user) and/or additional visual information (e.g., images, video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues (e.g., to the user) regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 524, the routine determines that the mobile device has arrived at the next acquisition location (e.g., based on an indication from the user, based on forward movement of the mobile device stopping for at least a predefined amount of time, etc.), for use as the new current acquisition location, and returns to block 515 to perform the acquisition location image acquisition activities for the new current acquisition location.

Figure 6A:
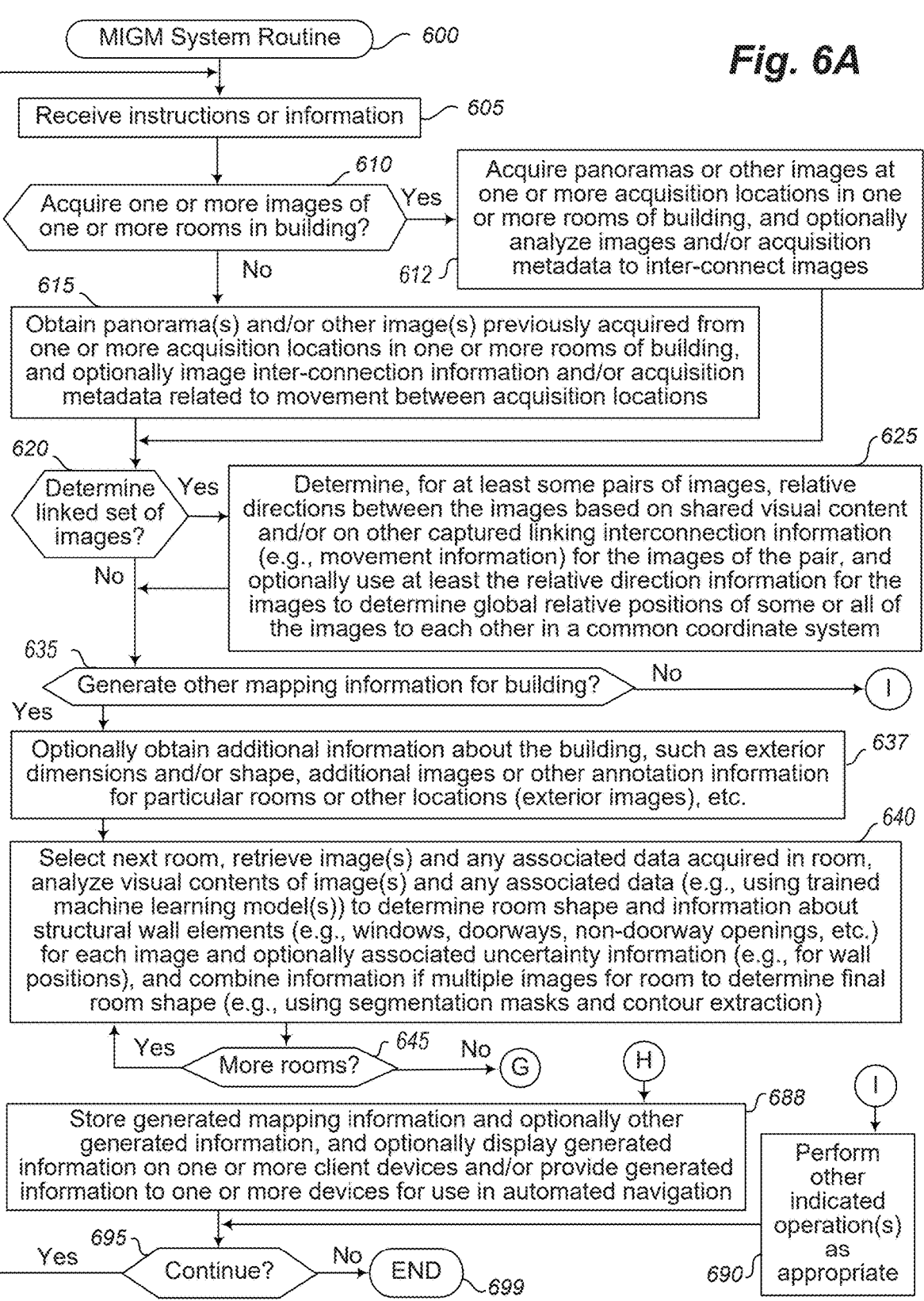

If it is instead determined in block 520 that there are not any more acquisition locations at which to acquire image information for the current building or other structure at the current time, the routine proceeds to block 545 to optionally preprocess the acquired 360° panorama images before their subsequent use (e.g., for generating related mapping information, for providing information about structural elements or other objects of rooms or other enclosing areas, etc.), such as to produce images of a particular type and/or in a particular format (e.g., to perform an equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline). In block 577, the images and any associated generated or obtained information is stored for later use, and optionally provided to one or more recipients (e.g., to block 430 of routine 400 if invoked from that block). FIGS. 6A-6B illustrate one example of a routine for generating a floor plan representation of a building interior from the generated panorama information.

If it is instead determined in block 510 that the instructions or other information received in block 505 are not to acquire images and other data representing a building interior, the routine continues instead to block 590 to perform any other indicated operations as appropriate, such as to configure parameters to be used in various operations of the system (e.g., based at least in part on information specified by a user of the system, such as a user of a mobile device who captures one or more building interiors, an operator user of the ICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to generate and store inter-panorama image connections between panorama images for a building or other structure (e.g., for each panorama image, to determine directions within that panorama image toward one or more other acquisition locations of one or more other panorama images, such as to enable later display of an arrow or other visual representation with a panorama image for each such determined direction from the panorama image to enable an end-user to select one of the displayed visual representations to switch to a display of the other panorama image at the other acquisition location to which the selected visual representation corresponds), to obtain and store other information about users of the system, to perform any housekeeping tasks, etc.

Following blocks 577 or 590, the routine proceeds to block 595 to determine whether to continue, such as until an explicit indication to terminate is received, or instead only if an explicit indication to continue is received. If it is determined to continue, the routine returns to block 505 to await additional instructions or information, and if not proceeds to step 599 and ends.

While not illustrated with respect to the automated operations shown in the example embodiment of FIG. 5, in some embodiments human users may further assist in facilitating some of the operations of the ICA system, such as for operator users and/or end users of the ICA system to provide input of one or more types that is further used in subsequent automated operations. As non-exclusive examples, such human users may provide input of one or more types as follows: to provide input to assist with determination of acquisition locations, such as to provide input in blocks 512 and/or 524 that is used as part of the automated operations for that block; to perform activities in block 515 related to image acquisition (e.g., to participate in the image acquisition, such as to activate the shutter, implement settings on a camera and/or associated sensor or component, rotate a camera as part of capturing a panorama image, etc.; to set the location and/or orientation of one or more camera devices and/or associated sensors or components; etc.); to provide input in blocks 515 and/or 522 that is used as part of subsequent automated operations, such as labels, annotations or other descriptive information with respect to particular images, surrounding rooms and/or objects in the rooms; etc. Additional details are included elsewhere herein regarding embodiments in which one or more human users provide input that is further used in additional automated operations of the ICA system.

FIGS. 6A-6B illustrate an example embodiment of a flow diagram for a MIGM (Mapping Information Generation Manager) system routine 600. The routine may be performed by, for example, execution of the MIGM system 160 of FIG. 1, the MIGM system 389 of FIG. 3, and/or a MIGM system as described with respect to FIGS. 2A-2P and elsewhere herein, such as to determine a room shape for a room (or other defined area) by analyzing information from one or more images acquired in the room (e.g., one or more 360° panorama images), to generate a partial or complete floor plan for a building or other defined area based at least in part on one or more images of the area and optionally additional data captured by a mobile computing device and using determined room shapes, and/or to generate other mapping information for a building or other defined area based at least in part on one or more images of the area and optionally additional data captured by a mobile computing device. In the example of FIGS. 6A-6B, the determined room shape for a room may be a 2D room shape to represent the locations of the walls of the room or a 3D fully closed combination of planar surfaces to represent the locations of walls and ceiling and floor of the room, and the generated mapping information for a building (e.g., a house) may include a 2D floor plan and/or 3D computer model floor plan, but in other embodiments, other types of room shapes and/or mapping information may be generated and used in other manners, including for other types of structures and defined areas, as discussed elsewhere herein. In at least some embodiments, the routine 600 may be invoked from block 440 of routine 400 of FIGS. 4A-4B, with corresponding information from routine 600 provided to routine 400 as part of implementation of that block 440, and with processing control returned to routine 400 after blocks 688 and/or 699 in such situations—in other embodiments, the routine 400 may proceed with additional operations in an asynchronous manner without waiting for such processing control to be returned (e.g., to proceed to block 445 once the corresponding information from routine 600 is provided to routine 400, to proceed with other processing activities while waiting for the corresponding information from the routine 600 to be provided to routine 400, etc.).

The illustrated embodiment of the routine begins at block 605, where information or instructions are received. The routine continues to block 610 to determine whether image information is already available to be analyzed for one or more rooms (e.g., for some or all of an indicated building, such as based on one or more such images received in block 605 as previously generated by the ICA routine), or if such image information instead is to be currently acquired. If it is determined in block 610 to currently acquire some or all of the image information, the routine continues to block 612 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein-implementation of block 612 may, for example, include invoking an ICA system routine to perform such activities, with FIG. 5 providing one example embodiment of an ICA system routine for performing such image acquisition. If it is instead determined in block 610 not to currently acquire the images, the routine continues instead to block 615 to obtain one or more existing panoramas or other images from one or more acquisition locations in one or more rooms (e.g., multiple images acquired at multiple acquisition locations that include at least one image and acquisition location in each room of a building), optionally along with metadata information regarding the acquisition and/or interconnection information related to movement between the acquisition locations, such as may in some situations have been supplied in block 605 along with the corresponding instructions.

After blocks 612 or 615, the routine continues to block 620, where it determines whether to generate mapping information that includes an inter-linked set of target panorama images (or other images) for a building or other group of rooms (referred to at times as a 'virtual tour', such as to enable an end user to move from any one of the images of the linked set to one or more other images to which that starting current image is linked, including in some embodiments via selection of a user-selectable control for each such other linked image that is displayed along with a current image, optionally by overlaying visual representations of such user-selectable controls and corresponding inter-image directions on the visual data of the current image, and to similarly move from that next image to one or more additional images to which that next image is linked, etc.), and if so continues to block 625. The routine in block 625 selects pairs of at least some of the images (e.g., based on the images of a pair having overlapping visual content), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 625 may further optionally use at least the relative direction information for the pairs of images to determine global relative positions of some or all of the images to each other in a common coordinate system, and/or generate the inter-image links and corresponding user-selectable controls as noted above. Additional details are included elsewhere herein regarding creating such a linked set of images.

After block 625, or if it is instead determined in block 620 that the instructions or other information received in block 605 are not to determine a linked set of images, the routine continues to block 635 to determine whether the instructions received in block 605 indicate to generate other mapping information for an indicated building (e.g., a floor plan), and if so the routine continues to perform some or all of blocks 637-685 to do so, and otherwise continues to block 690. In block 637, the routine optionally obtains additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations external to the building (e.g., surrounding the building and/or for other structures on the same property, from one or more overhead locations, etc.), additional images and/or annotation information acquired corresponding to particular locations within the building (optionally for locations different from acquisition locations of the acquired panorama images or other images), etc.

After block 637, the routine continues to block 640 to select the next room (beginning with the first) for which one or more images (e.g., 360° panorama images) acquired in the room are available, and to analyze the visual data of the image(s) for the room to determine a room shape (e.g., by determining at least wall locations), optionally along with determining uncertainty information about walls and/or other parts of the room shape, and optionally including identifying other wall and floor and ceiling elements (e.g., wall structural elements/objects, such as windows, doorways and stairways and other inter-room wall openings and connecting passages, wall borders between a wall and another wall and/or ceiling and/or floor, etc.) and their positions within the determined room shape of the room. In some embodiments, the room shape determination may include using boundaries of the walls with each other and at least one of the floor or ceiling to determine a 2D room shape (e.g., using one or trained machine learning models), while in other embodiments the room shape determination may be performed in other manners (e.g., by generating a 3D point cloud of some or all of the room walls and optionally the ceiling and/or floor, such as by analyzing at least visual data of the panorama image and optionally additional data captured by an image acquisition device or associated mobile computing device, optionally using one or more of SfM (Structure from Motion) or SLAM (Simultaneous Location And Mapping) or MVS (Multi-View Stereo) analysis). In addition, the activities of block 645 may further optionally determine and use initial pose information for each of those panorama images (e.g., as supplied with acquisition metadata for the panorama image), and/or obtain and use additional metadata for each panorama image (e.g., acquisition height information of the camera device or other image acquisition device used to acquire a panorama image relative to the floor and/or the ceiling). Additional details are included elsewhere herein regarding determining room shapes and identifying additional information for the rooms. After block 640, the routine continues to block 645, where it determines whether there are more rooms for which to determine room shapes based on images acquired in those rooms, and if so returns to block 640 to select the next such room for which to determine a room shape.

If it is instead determined in block 645 that there are not more rooms for which to generate room shapes, the routine continues to block 660 to determine whether to further generate at least a partial floor plan for the building (e.g., based at least in part on the determined room shape(s) from block 640, and optionally further information regarding how to position the determined room shapes relative to each other). If not, such as when determining only one or more room shapes without generating further mapping information for a building (e.g., to determine the room shape for a single room based on one or more images acquired in the room by the ICA system), the routine continues to block 688. Otherwise, the routine continues to block 665 to retrieve one or more room shapes (e.g., room shapes generated in block 645) or otherwise obtain one or more room shapes (e.g., based on human-supplied input) for rooms of the building, whether 2D or 3D room shapes, and then continues to block 670. In block 670, the routine uses the one or more room shapes to create an initial floor plan (e.g., an initial 2D floor plan using 2D room shapes and/or an initial 3D floor plan using 3D room shapes), such as a partial floor plan that includes one or more room shapes but less than all room shapes for the building, or a complete floor plan that includes all room shapes for the building. If there are multiple room shapes, the routine in block 670 further determines positioning of the room shapes relative to each other, such as by using visual overlap between images from multiple acquisition locations to determine relative positions of those acquisition locations and of the room shapes surrounding those acquisition locations, and/or by using other types of information (e.g., using connecting inter-room passages between rooms, optionally applying one or more constraints or optimizations, etc.). In at least some embodiments, the routine in block 670 further refines some or all of the room shapes by generating a binary segmentation mask that covers the relatively positioned room shape(s), extracting a polygon representing the outline or contour of the segmentation mask, and separating the polygon into the refined room shape(s). Such a floor plan may include, for example, relative position and shape information for the various rooms without providing any actual dimension information for the individual rooms or building as a whole, and may further include multiple linked or associated submaps (e.g., to reflect different stories, levels, sections, etc.) of the building. The routine further optionally associates positions of the doors, wall openings and other identified wall elements on the floor plan.

After block 670, the routine optionally performs one or more steps 680-685 to determine and associate additional information with the floor plan. In block 680, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blueprints, etc. may be generated from the floor plan. After block 680, the routine continues to block 683 to optionally associate further information with the floor plan (e.g., with particular rooms or other locations within the building), such as additional existing images with specified positions and/or annotation information. In block 685, if the room shapes from block 645 are not 3D room shapes, the routine further optionally estimates heights of walls in some or all rooms, such as from analysis of images and optionally sizes of known objects in the images, as well as height information about a camera when the images were acquired, and uses that height information to generate 3D room shapes for the rooms. The routine further optionally uses the 3D room shapes (whether from block 640 or block 685) to generate a 3D computer model floor plan of the building, with the 2D and 3D floor plans being associated with each other—in other embodiments, only a 3D computer model floor plan may be generated and used (including to provide a visual representation of a 2D floor plan if so desired by using a horizontal slice of the 3D computer model floor plan).

After block 685, or if it is instead determined in block 660 not to determine a floor plan, the routine continues to block 688 to store the determined room shape(s) and/or generated mapping information and/or other generated information, to optionally provide some or all of that information to one or more recipients (e.g., to block 440 of routine 400 if invoked from that block), and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of images and/or about additional information determined about contents of rooms and/or passages between rooms, etc.

If it is instead determined in block 635 that the information or instructions received in block 605 are not to generate mapping information for an indicated building, the routine continues instead to block 690 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square foot- age, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is deter- mined to continue, the routine returns to block 605 to wait for and receive additional instructions or information, and otherwise continues to block 699 and ends.

While not illustrated with respect to the automated opera- tions shown in the example embodiment of FIGS. 6A-6B, in some embodiments human users may further assist in facili- tating some of the operations of the MIGM system, such as for operator users and/or end users of the MIGM system to provide input of one or more types that is further used in subsequent automated operations. As non-exclusive examples, such human users may provide input of one or more types as follows: to provide input to assist with the linking of a set of images, such as to provide input in block 625 that is used as part of the automated operations for that block (e.g., to specify or adjust initial automatically deter- mined directions between one or more pairs of images, to specify or adjust initial automatically determined final global positions of some or all of the images relative to each other, etc.); to provide input in block 637 that is used as part of subsequent automated operations, such as one or more of the illustrated types of information about the building; to provide input with respect to block 640 that is used as part of subsequent automated operations, such as to specify or adjust initial automatically determined element locations and/or estimated room shapes and/or to manually combine information from multiple estimated room shapes for a room (e.g., separate room shape estimates from different images acquired in the room) to create a final room shape for the room and/or to specify or adjust initial automatically deter- mined information about a final room shape, etc.; to provide input with respect to block 670, that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 680 and 683 and 685 that is used as part of subsequent operations, such as to specify or adjust initial automatically determined information of one or more types discussed with respect to those blocks; and/or to specify or adjust initial automatically determined pose information (whether initial pose information or subsequent updated pose information) for one or more of the panorama images; etc. Additional details are included elsewhere herein regard- ing embodiments in which human user(s) provide input that is further used in additional automated operations of the MIGM system.

Figure 7:
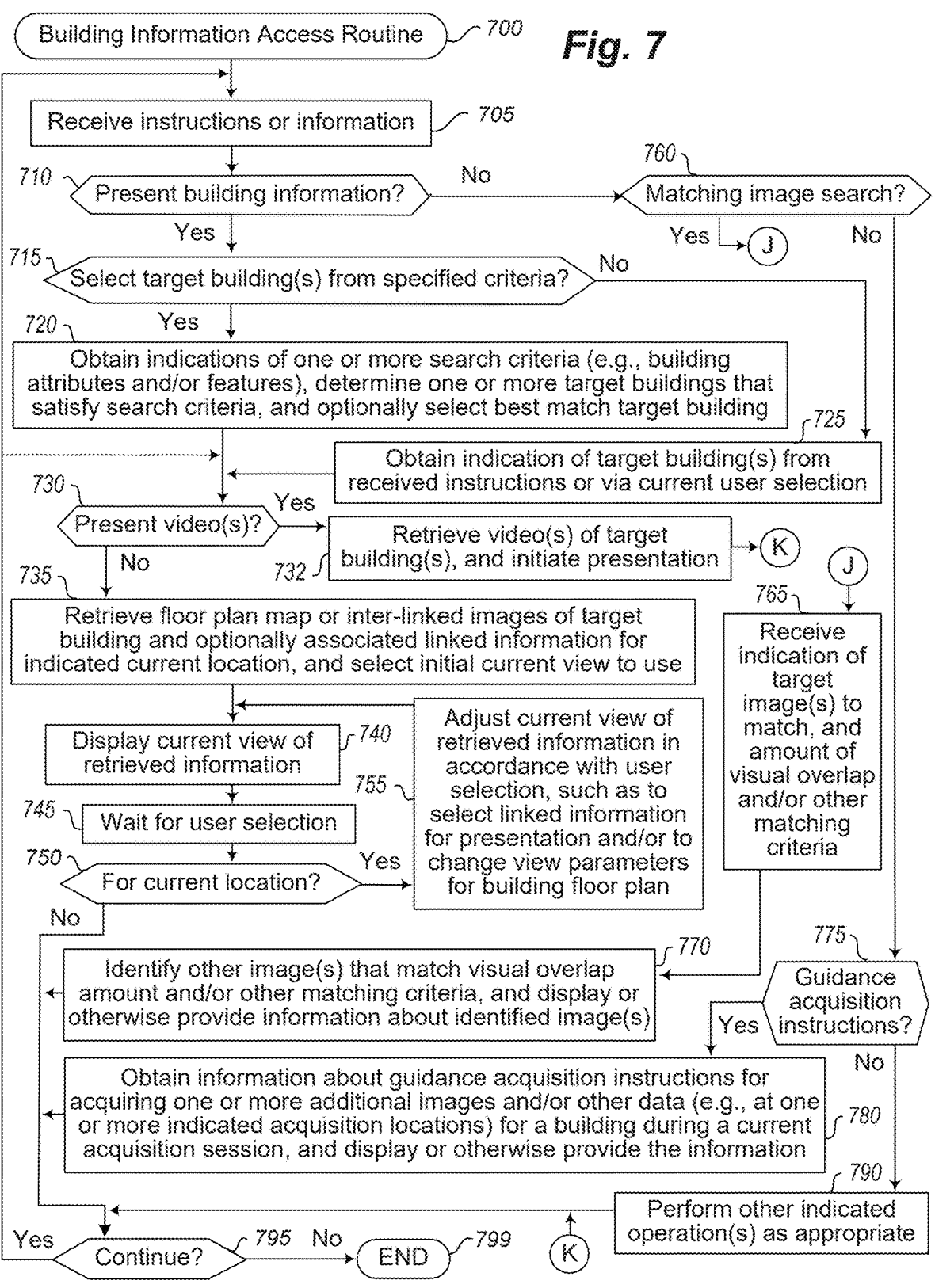
FIG. 7 illustrates an example embodiment of a flow diagram for a Building Information Access system routine in accordance with an embodiment of the present disclosure.

FIG. 7 illustrates an example embodiment of a flow diagram for a Building Information Access system routine 700. The routine may be performed by, for example, execu- tion of a building information access client computing device 175 and its software system(s) (not shown) of FIG. 1, a client computing device 390 of FIG. 3, and/or a building information access viewer or presentation system as described elsewhere herein, such as to receive and present building information (e.g., videos; individual images; floor plans and/or other mapping-related information, such as determined room structural layouts/shapes, a virtual tour of inter-linked images, etc.; generated building description information; etc.), to obtain and display information about images matching one or more indicated target images, to obtain and display guidance acquisition instructions (e.g., with respect to other images acquired during an acquisition session and/or for an associated building, such as part of a displayed GUI), etc. In the example of FIG. 7, the presented information is for one or more buildings (such as an interior of a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information in block 705 are to present determined information for one or more target buildings, and if so continues to block 715 to determine whether the received instructions or information in block 705 are to select one or more target buildings using specified criteria (e.g., based at least in part on an indicated building), and if not continues to block 720 to obtain an indication of a target building to use from the user (e.g., based on a current user selection, such as from a displayed list or other user selec- tion mechanism; based on information received in block 705; etc.). Otherwise, if it is determined in block 715 to select one or more target buildings from specified criteria, the routine continues instead to block 725, where it obtains indications of one or more search criteria to use, such as from current user selections or as indicated in the informa- tion or instructions received in block 705, and then searches stored information about buildings (e.g., floor plans, videos, generated textual descriptions, etc.) to determine one or more of the buildings that satisfy the search criteria or otherwise obtains indications of one or more such matching target buildings, such as information that is currently or previously generated by the BVGUM system (with one example of operations of such a system being further discussed with respect to FIGS. 4A-4B, and with the BVGUM system optionally invoked in block 720 to obtain such information). In the illustrated embodiment, the routine then further optionally selects a best match target building from the one or more determined target buildings (e.g., the target building with the highest similarity or other matching rating for the specified criteria, or using another selection technique indicated in the instructions or other information received in block 705), while in other embodiments the routine may instead present information for multiple target buildings that satisfy the search criteria (e.g., in a ranked order based on degree of match; in a sequential manner, such as to present one or more videos for each of multiple buildings in a sequence; etc.) and receive a user selection of the best match target building from the multiple candidate target buildings.

After blocks 720 or 725, the routine continues to block 730 to determine whether the instructions or other informa- tion received in block 705 indicate to present one or more generated videos for each of one or more target buildings, and if so continues to block 732 to do so, including to retrieve one or more existing generated videos for each target building (e.g., one or more existing generated videos that match criteria specified in the information of block 705 or otherwise determined, such as using preference informa- tion or other information specific to a recipient), or alterna- tively in some embodiments and situations to request a dynamically generated video (e.g., by interacting with the BVGUM system to cause such generation, whether by newly generating a video or by modifying an existing video, and optionally supplying one or more criteria to use in such generation, such as using preference information or other information specific to a recipient), and to initiate presentation of the retrieved and/or dynamically generated video(s) (e.g., to transmit video(s) to client device(s) for presentation on those devices). After block 732, the routine continues to block 795.

If it is instead determined in block 730 that the instructions or other information received in block 705 do not indicate to present one or more generated videos, the routine continues to block 735 to retrieve information for the target building for display (e.g., a floor plan; other generated mapping information for the building, such as a group of inter-linked images for use as part of a virtual tour; generated building description information; etc.), and optionally indications of associated linked information for the building interior and/or a surrounding location external to the building, and/or information about one or more generated explanations or other descriptions of the target building, and selects an initial view of the retrieved information (e.g., a view of the floor plan, a particular room shape, a particular image, some or all of the generated building description information, etc.). In block 740, the routine then displays or otherwise presents the current view of the retrieved information, and waits in block 745 for a user selection. After a user selection in block 745, if it is determined in block 750 that the user selection corresponds to adjusting the current view for the current target building (e.g., to change one or more aspects of the current view), the routine continues to block 755 to update the current view in accordance with the user selection, and then returns to block 740 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location, such as to overlay the associated linked information over at least some of the previous display; a particular other image linked to a current image and selected from the current image using a user-selectable control overlaid on the current image to represent that other image; etc.), and/or changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.). If it is instead determined in block 750 that the user selection is not to display further information for the current target building (e.g., to display information for another building, to end the current display operations, etc.), the routine continues instead to block 795, and returns to block 705 to perform operations for the user selection if the user selection involves such further operations.

If it is instead determined in block 710 that the instructions or other information received in block 705 are not to present information representing a building, the routine continues instead to block 760 to determine whether the instructions or other information received in block 705 indicate to identify other images (if any) corresponding to one or more indicated target images, and if so continues to blocks 765-770 to perform such activities. In particular, the routine in block 765 receives the indications of the one or more target images for the matching (such as from information received in block 705 or based on one or more current interactions with a user) along with one or more matching criteria (e.g., an amount of visual overlap), and in block 770 identifies one or more other images (if any) that match the indicated target image(s), such as by interacting with the ICA and/or MIGM systems to obtain the other image(s). The routine then displays or otherwise provides information in block 770 about the identified other image(s), such as to provide information about them as part of search results, to display one or more of the identified other image(s), etc. If it is instead determined in block 760 that the instructions or other information received in block 705 are not to identify other images corresponding to one or more indicated target images, the routine continues instead to block 775 to determine whether the instructions or other information received in block 705 correspond to obtaining and providing guidance acquisition instructions during an image acquisition session with respect to one or more indicated target images (e.g., a most recently acquired image), and if so continues to block 780, and otherwise continues to block 790. In block 780, the routine obtains information about guidance acquisition instructions of one or more types, such as by interacting with the ICA system, and displays or otherwise provides information in block 780 about the guidance acquisition instructions, such as by overlaying the guidance acquisition instructions on a partial floor plan and/or recently acquired image in manners discussed in greater detail elsewhere herein.

In block 790, the routine continues instead to perform other indicated operations as appropriate, such as to configure parameters to be used in various operations of the system (e.g., based at least in part on information specified by a user of the system, such as a user of a mobile device who acquires one or more building interiors, an operator user of the BVGUM and/or MIGM systems, etc., including for use in personalizing information display for a particular recipient user in accordance with his/her preferences or other information specific to that recipient), to obtain and store other information about users of the system (e.g., preferences or other information specific to that user), to respond to requests for generated and stored information, to perform any housekeeping tasks, etc.

Following blocks 732, 770 or 780 or 790, or if it is determined in block 750 that the user selection does not correspond to the current building, the routine proceeds to block 795 to determine whether to continue, such as until an explicit indication to terminate is received, or instead only if an explicit indication to continue is received. If it is determined to continue (including if the user made a selection in block 745 related to a new building to present), the routine returns to block 705 to await additional instructions or information (or to continue directly on to block 735 if the user made a selection in block 745 related to a new building to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

obtaining, by one or more computing devices, data about a house with multiple rooms, including a plurality of images acquired at the house, and a floor plan for the house that includes a room layout with at least two-dimensional room shapes and relative positions of the multiple rooms;

generating, by the one or more computing devices, description information for the house based on the obtained data, including:

analyzing, by the one or more computing devices and using one or more trained first neural networks models, the plurality of images to identify multiple objects inside the house and to determine attributes of the multiple objects;

analyzing, by the one or more computing devices and using one or more trained second neural network models, the floor plan to determine further attributes of the house each corresponding to a characteristic of the room layout;

generating, by the one or more computing devices and using one or more trained language models, textual descriptions of each of the attributes and further attributes, and combining the generated textual descriptions to create the attribute description information for the house;

generating, by the one or more computing devices, a video that describes the house using narration based on the generated description information, including:

determining, by the one or more computing devices and using one or more trained third neural network models, a group of multiple images to use in a determined sequence for the video that are a subset of the plurality of images, wherein the multiple images include at least one image in each of the multiple rooms and further include one or more panorama images;

generating, by the one or more computing devices, a visual portion of the video, including selecting, for each of the multiple images, at least some visual data of that image to include at a position in the visual portion corresponding to the determined sequence, and further including inserting additional visual data in the visual portion to provide one or more transitions between selected visual data of adjacent images in the determined sequence, wherein the selecting of the at least some visual data of each of the one or more panorama images includes selecting multiple subsets of the visual data of that panorama image that are to be shown in succession and that correspond to at least one of panning or tilting within that panorama image; and generating, by the one or more computing devices, an audio portion of the video, including:

for each of the multiple images, determining one or more of the objects that are visible in the image, and using the textual descriptions for one or more of the attributes of those one or more objects to include audible narrated information in the audio portion that is about those one or more attributes and that occurs concurrent with selected visual data of that image in the visual portion;

adding, for each of the one or more transitions, additional audible narrated information in the audio portion about that transition and that occurs concurrent with the additional visual data in the visual portion for that transition; and adding, concurrent with at least one of a beginning or an ending of the visual portion of the video, further audible narrated information in the audio portion based on the textual descriptions for each of the further attributes corresponding to a characteristic of the room layout;

receiving, by the one or more computing devices, one or more search criteria; and presenting, by the one or more computing devices and in response to determining that the house matches the one or more search criteria based at least in part on the narration for the video, search results that indicate the house and include the generated video that describes the house.

2. The computer-implemented method of claim 1 wherein the analyzing of the plurality of images further includes determining positions of the multiple objects within the multiple rooms, wherein the selecting of the at least some visual data for the multiple images includes selecting visual data to show the determined positions of the multiple objects, wherein including of audible narrated information in the audio portion about attributes of objects further includes indicating those objects and the determined positions of those objects, wherein the search criteria further include indications of one or more positions of the one or more types of objects, wherein the determining that the house matches the one or more search criteria is further based on the determined positions of one or more identified objects of the one or more types, and wherein the presenting of the search results further includes transmitting, by the one or more computing devices over one or more computer networks to a client device from which the search criteria are received, the search results to cause the client device to display the visual portion of the generated video and to audibly play the audio portion of the generated video.

3. The computer-implemented method of claim 1 wherein the identified multiple objects in the house include at least appliances and fixtures and structural elements, wherein the determined attributes of the multiple objects include colors and types of surface materials, wherein the determined further attributes of the house include both objective attributes about the house that are able to be independently verified and subjective attributes for the house that are predicted by the one or more trained second neural network models, wherein the search criteria include indications of one or more colors and one or more types of surface materials and one or more types of objects, and wherein the determining that the house matches the one or more search criteria is based on one or more of the identified multiple objects and on one or more of the determined attributes of the multiple objects and on one or more subjective attributes of the determined further attributes.

4. A computer-implemented method comprising:

obtaining, by one or more computing devices, data for an indicated building with multiple rooms, including a plurality of images acquired at the indicated building;

generating, by the one or more computing devices and based on the obtained data, a video for the indicated building that describes at least some of the multiple rooms, including:

determining, by the one or more computing devices, multiple attributes for the indicated building based on objects in the indicated building and visible characteristics of the objects, including analyzing the plurality of images to identify the objects and to determine the visible characteristics;

selecting, by the one or more computing devices, a group of at least two images to use for the video that are a subset of the plurality of images, and determining a sequence in which to include visual data of the at least two images in the video, wherein the at least two images include at least one image in each of the at least some rooms and further include one or more panorama images;

generating, by the one or more computing devices, a visual portion of the video, including selecting, for each of the at least two images, at least some visual data of that image to include at a position in the visual portion based on the determined sequence, wherein the selecting of the at least some visual data of each of the one or more panorama images includes selecting multiple subsets of the visual data of that panorama image that are to be shown in succession and that correspond to at least one of panning or tilting within that panorama image;

generating, by the one or more computing devices, and for each of the at least two images, a textual description of at least one of the multiple attributes that is visible in the visual data of that image;

generating, by the one or more computing devices, an audio portion of the video, including using, for each of the at least two images, the textual description of the at least one attribute visible in the visual data of that image to produce audible narrated information in the audio portion that is about that at least one attribute and occurs concurrently with selected visual data of that image in the visual portion; and presenting, by the one or more computing devices, at least some of the generated video about the indicated building.

5. The computer-implemented method of claim 4 wherein the analyzing of the plurality of images to identify the objects and to determine the visible characteristics includes using one or more trained first neural networks, wherein the selecting of the group of at least two images and the determining of the sequence includes using one or more trained second neural networks that further reject at least one of the plurality of images from inclusion in the subset of the at least two images, wherein the generating of the textual description of the at least one attribute for each of the at least two images includes using one or more trained language models, and wherein the method further comprises, before the generating of the video, training the one or more first neural networks to identify objects in images and determine visual characteristics of those objects, training the one or more second neural networks to select images to include in videos and to determine sequences of those images, and training the one or more language models to generate textual descriptions of attributes of buildings.

6. The computer-implemented method of claim 4 further comprising receiving one or more search criteria, and determining that the indicated building matches the one or more search criteria based at least in part on the narrated information for the generated video, and wherein the presenting of the at least some of the generated video includes transmitting, by the one or more computing devices and over one or more computer networks to one or more client devices, search results that include the generated video for presentation on the one or more client devices.

7. The computer-implemented method of claim 4 wherein the obtained data further includes a floor plan for the indicated building indicating a room layout with at least two-dimensional room shapes and relative positions of the multiple rooms, wherein the multiple attributes for the indicated building further include one or more building attributes that are identified from analyzing the floor plan and that each corresponds to a characteristic of the room layout, and wherein the generating of the audio portion of the video further includes producing additional audible narrated information in the audio portion based on additional textual description that is generated to describe the one or more building attributes.

8. A system comprising:

one or more hardware processors of one or more computing devices; and one or more memories with stored instructions that, when executed by at least one of the one or more hardware processors, cause at least one of the one or more computing devices to perform automated operations including at least:

obtaining data for an indicated building with multiple rooms, including a plurality of images acquired at the indicated building, and information about multiple attributes for the indicated building that are based at least in part on objects in the indicated building;

generating, for each of at least some of the multiple attributes, a textual description of that attribute;

generating a video for the indicated building that is based on the obtained data and describes at least some of the multiple rooms, including:

selecting a group of at least two images having visual data of the at least some rooms;

generating a visual portion of the video, including selecting, for each of the at least two images, at least some visual data of that image to include in the visual portion; and

generating an audio portion of the video, including, for each of the at least two images, and for at least one attribute of the at least some attributes that is visible in that image, using the generated textual description of that at least one attribute to produce narrated information in the audio portion that is about that at least one attribute and is synchronized with selected visual data of that image in the visual portion; and providing information about the indicated building that includes the generated video.

9. The system of claim 8 wherein the at least one computing device includes a server computing device and wherein the one or more computing devices further include a client computing device of a user, and wherein the stored instructions include software instructions that, when executed by the one or more computing devices, cause the one or more computing devices to perform further automated operations including:

receiving, by the server computing device, one or more search criteria from the client computing device;

determining, by the server computing device, search results for the search criteria that include the indicated building based at least in part on the generated video;

performing, by the server computing device, the providing of the information about the indicated building by transmitting the information about the indicated building over one or more computer networks to the client computing device, the transmitted information including the determined search results; and receiving, by the client computing device, the transmitted information including the determined search results, and displaying the determined search results on the client computing device to enable presentation of the generated video on the client computing device.

10. The system of claim 8 wherein the obtaining of the information about the multiple attributes includes analyzing visual data of the plurality of images to identify the objects in the indicated building, and wherein the at least some of the multiple attributes are at least some of the objects.

11. The system of claim 8 wherein the selecting of the group of at least two images includes selecting a subset of the plurality of images to include in the group based at least in part on images of the subset being acquired in at least some rooms, and further includes excluding at least one of the plurality of images from the subset.

12. The system of claim 8 wherein one or more images of the at least two images are panorama images, and wherein the selecting of at least some visual data of each of the at least two images includes, for each of the one or more images, selecting multiple subsets of the visual data of that image that are to be shown in succession and that correspond to at least one of panning or tilting within that image.

13. The system of claim 8 wherein the selecting of at least some visual data of each of the at least two images includes, for one of the at least two images, performing zooming within that one image to show information corresponding to one or more of the at least one attributes visible in that one image.

14. The system of claim 8 wherein the generating of the visual portion of the video further includes adding further visual data in the visual portion to provide one or more transitions between selected visual data of the at least two images, and wherein the generating of the audio portion of the video further includes, for each of the one or more transitions, producing additional narrated information in the audio portion that describes that transition and that is synchronized with further visual data for that transition.

15. The system of claim 8 wherein the at least two images of the group include images in all of the multiple rooms and the generated video further describes all of the multiple rooms, wherein the automated operations further include, after the generating of the video, revising the video to satisfy one or more indicated criteria by removing some of the visual portion and audio portion, and wherein the providing of the information about the indicated building includes providing the revised video.

16. The system of claim 15 wherein the generating of the video further includes generating multiple video segments within the video that each corresponds to at least one of one or more of the multiple rooms or one or more of the objects, wherein the indicated criteria include at least one of an indication of a video length or an indication corresponding to at least one room of the multiple rooms or an indication corresponding to at least one object of the objects, and wherein the revising of the video includes removing at least one of the multiple video segments.

17. The system of claim 15 wherein the indicated criteria are specific to an indicated recipient, wherein the revising of the video is performed to personalize the revised video for the indicated recipient, and wherein the providing of the revised video includes presenting the revised video to an indicated recipient.

18. The system of claim 8 wherein the generating of the video further includes generating multiple videos that each corresponds to at least one of one or more of the multiple rooms or one or more of the objects, and wherein the providing of the information about the indicated building includes selecting and providing one of the multiple videos that satisfies one or more indicated criteria.

19. The system of claim 8 wherein the automated operations further include receiving one or more criteria specific to an indicated user, wherein the generating of the video is further performed to personalize the generated video for the indicated user by satisfying the one or more criteria, and wherein the providing of the information about the indicated building includes providing the video to the indicated user.

20. The system of claim 8 wherein the generating of the textual description of each of the at least some attributes using one or more trained language models, wherein the selecting of the group of at least two images includes using one or more trained neural networks that further reject at least one of the plurality of images from inclusion in the group, and wherein the automated operations further include, before the generating of the video, training the one or more language models to generate textual descriptions of attributes of buildings, and training the one or more neural networks to select images to include in videos.

21. The system of claim 8 wherein the obtained data further includes a floor plan for the indicated building indicating a room layout with at least two-dimensional room shapes and relative positions of the multiple rooms, wherein the multiple attributes for the indicated building further include one or more building attributes that are identified from analyzing the floor plan and that each corresponds to a characteristic of the room layout, and wherein the generating of the audio portion of the video further includes producing additional narrated information in the audio portion that is generated to describe the one or more building attributes.

22. The system of claim 8 wherein the obtained data includes a floor plan of the indicated building, wherein the at least some attributes include at least one of one or more subjective attributes generated from analyzing of the floor plan that include at least one of an open floor plan or an accessible floor plan or a non-standard floor plan, or of one or more global attributes generated from the analyzing of the floor plan and is associated with all of the indicated building, or of one or more local attributes generated from analyzing of the plurality of images and each associated with one of the multiple rooms.

23. The system of claim 8 wherein the objects include at least appliances and fixtures and structural elements that are determined from analyzing of the plurality of images, and wherein the at least some attributes include colors and types of surface materials for the objects that are determined from the analyzing of the plurality of images.

24. The system of claim 8 wherein the obtained data further includes additional building information including at least one of a textual description of the building, or labels associated with the objects, or labels associated with the rooms, or descriptive textual annotations associated with the objects, or descriptive textual annotations associated with the rooms, or a group of inter-connections that link at least some of the plurality of images, and wherein the automated operations further include analyzing the additional building information to determine some or all of the at least some attributes.

25. The system of claim 8 wherein the generating of the audio portion of the video includes using one or more language models that are trained to use, as input, information about the at least some attributes, and about locations in the building corresponding to the at least some attributes, and about timing and/or a sequence for the at least some attributes, wherein the one or more language models include at least one of a Vision and Language Model (VLM) that is trained using image/caption tuples, or a Knowledge Enhanced Natural Language Generation (VENLG) model that is trained using one or more defined knowledge sources, or a language model that uses a knowledge graph in which nodes represent entities and edges represent predicate relationships.

26. A non-transitory computer-readable medium having stored contents that cause one or more computing devices to perform automated operations, the automated operations including at least:

obtaining, by the one or more computing devices, data for an indicated building with multiple rooms, including a plurality of images acquired at the indicated building;

generating, by the one or more computing devices and based on the obtained data, a video for the indicated building, including:

determining, by the one or more computing devices, multiple attributes for the indicated building that include objects in the indicated building, including analyzing the plurality of images to identify the objects;

selecting, by the one or more computing devices, a group of one or more images to use for the video that are a subset of the plurality of images and that include at least one panorama image;

generating, by the one or more computing devices, a visual portion of the video, including selecting, for each of the one or more images, at least some visual data of that image to include in the visual portion, including selecting multiple subsets of the visual data of each of the at least one panorama images that are to be shown in succession and that correspond to at least one of panning or tilting within that panorama image;

generating, by the one or more computing devices, textual descriptions of two or more attributes of the multiple attributes that are visible in the visual data of the one or more images;

generating, by the one or more computing devices, an audio portion of the video, including using the generated textual descriptions of the two or more attributes to produce audible narrated information in the audio portion that is about the two or more attributes and accompanies selected visual data in the visual portion in which the two or more attributes are visible; and providing, by the one or more computing devices, the generated video for the indicated building.

27. The non-transitory computer-readable medium of claim 26 wherein the stored contents include software instructions that, when executed by the one or more computing devices, cause the one or more computing devices to perform further automated operations including:

receiving, by the one or more computing devices, one or more search criteria from a client computing device;

determining, by the one or more computing devices, search results for the search criteria that include the indicated building based at least in part on the generated video; and performing, by the one or more computing devices, the providing of the generated video as part of transmitting, over one or more computer networks to the client computing device, the determined search results to enable presentation of the generated video on the client computing device.

28. The non-transitory computer-readable medium of claim 26 wherein the stored contents include software instructions that, when executed, cause the one or more computing devices to acquire the plurality of images at a plurality of acquisition locations inside the indicated building, wherein the selecting of the group of one or more images to use for the video includes selecting two or more images to be used in a determined sequence in the video, and wherein the generating of the audio portion of the video further includes, for each of the two or more images, and for each of at least one of the two or more attributes that is visible in that image, using a generated textual description of that attribute to produce a portion of the audible narrated information that occurs concurrently with selected visual data of that image in the visual portion.

29. The non-transitory computer-readable medium of claim 28 wherein the generating of the visual portion of the video further includes adding further visual data in the visual portion to provide one or more transitions between selected visual data of adjacent images in the determined sequence, and wherein the generating of the audio portion of the video further includes, for each of the one or more transitions, producing additional audible narrated information in the audio portion that describes that transition and that occurs concurrently with further visual data for that transition.

30. The non-transitory computer-readable medium of claim 26 wherein the obtained data further includes a floor plan for the indicated building indicating a room layout with at least two-dimensional room shapes and relative positions of the multiple rooms, wherein the multiple attributes for the indicated building further include one or more building attributes that are identified from analyzing the floor plan and that each corresponds to a characteristic of the room layout, and wherein the generating of the audio portion of the video further includes producing additional audible narrated information in the audio portion that is generated to describe the one or more building attributes.

31. The non-transitory computer-readable medium of claim 26 wherein the stored contents include one or more data structures, the one or more data structures including at least one of one or more first trained machine learning models used for the analyzing of the plurality of images to identify the objects, or of one or more second trained machine learning models used for the selecting of the group of one or more images to use for the video, or of one or more trained language models used for the generating of the textual descriptions of the two or more attributes.

\*    \*    \*    \*    \*